United States Patent
Ma et al.

(10) Patent No.: US 11,848,411 B2
(45) Date of Patent: Dec. 19, 2023

(54) CATHODE AND LITHIUM-AIR BATTERY INCLUDING THE CATHODE

(71) Applicant: Samsung Electronics Co., Ltd., Suwon-si (KR)

(72) Inventors: Sangbok Ma, Suwon-si (KR); Hyukjae Kwon, Suwon-si (KR); Hyunpyo Lee, Seoul (KR); Myungjin Lee, Seoul (KR); Donghwa Seo, Burlington, MA (US); Dongmin Im, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 870 days.

(21) Appl. No.: 16/594,821

(22) Filed: Oct. 7, 2019

(65) Prior Publication Data

US 2020/0119391 A1 Apr. 16, 2020

Related U.S. Application Data

(60) Provisional application No. 62/744,622, filed on Oct. 11, 2018.

(30) Foreign Application Priority Data

Oct. 12, 2018 (KR) .................. 10-2018-0122040

(51) Int. Cl.
*H01M 10/0525* (2010.01)
*H01M 4/131* (2010.01)

(52) U.S. Cl.
CPC ....... *H01M 10/0525* (2013.01); *H01M 4/131* (2013.01)

(58) Field of Classification Search
CPC .................. H01M 10/0525; H01M 4/131
See application file for complete search history.

(56) References Cited

U.S. PATENT DOCUMENTS 6,183,910 B1* 2/2001 Praas .................. H01M 4/505
429/231.1
6,372,384 B1* 4/2002 Fujimoto ............ C01G 23/005
429/231.95

(Continued)

FOREIGN PATENT DOCUMENTS

CN 107069046 A * 8/2017 ............ H01M 12/06
DE 102015210752 A1 * 12/2016
(Continued)

OTHER PUBLICATIONS

English machine translation of Jin et al. (WO 2017147793 A1) (Year: 2017).*

(Continued)

*Primary Examiner* — Sarah A. Slifka
(74) *Attorney, Agent, or Firm* — CANTOR COLBURN LLP

(57) ABSTRACT

A cathode configured to use oxygen as a cathode active material, the cathode comprising a lithium-containing metal oxide comprising at least one of:
a spinel compound represented by Formula 1

$Li_{1\pm x}M_{2\pm y}O_{4-\delta}$  Formula 1 wherein, in Formula 1, M is at least one metal element belonging to Group 2 to Group 16 of the periodic table of the elements, $0<x<1$, $0<y<1$, $0<\delta 1\leq 1$, $0<a<2$, $0.3<b<5$, and $0<\delta\leq 3$;
a spinel compound represented by Formula 2

$Li_{4\pm a}M_{5\pm b}O_{12-\delta}$  Formula 2 wherein, in Formula 2, M is at least one metal element belonging to Group 2 to Group 16 of the periodic table of the elements, $0<x<1$, $0<y<1$, $0<\delta 1\leq 1$, $0<a<2$, $0.3<b<5$, and $0<\theta\leq 3$; or
a perovskite compound represented by Formula 3

$Li_x A_y G_z O_{3-\delta}$.  Formula 3

22 Claims, 7 Drawing Sheets

(56) References Cited

U.S. PATENT DOCUMENTS

| | | | |
|---|---|---|---|
| 7,592,090 | B2 | 9/2009 | Seabaugh et al. |
| 9,356,295 | B2 | 5/2016 | Lee et al. |
| 2009/0017341 | A1 | 1/2009 | Ingram et al. |
| 2011/0262836 | A1* | 10/2011 | Kumar ............... H01M 4/9016 429/482 |
| 2014/0011100 | A1* | 1/2014 | Lee ..................... H01M 4/62 429/189 |
| 2015/0010822 | A1* | 1/2015 | Nakahara ........... H01M 4/0438 429/231.95 |
| 2016/0141617 | A1* | 5/2016 | Verma ................. H01M 4/625 252/182.1 |
| 2016/0322645 | A1 | 11/2016 | Chen et al. |
| 2016/0344079 | A1 | 11/2016 | Kim et al. |
| 2017/0362717 | A1 | 12/2017 | Hattori et al. |
| 2018/0083290 | A1 | 3/2018 | Hattori et al. |
| 2019/0074543 | A1* | 3/2019 | Houjyou ........... H01M 10/0585 |

FOREIGN PATENT DOCUMENTS

| | | | | |
|---|---|---|---|---|
| JP | 1980159568 | A | 12/1980 | |
| KR | 101508128 | B1 | 3/2015 | |
| KR | 20160135589 | A | 11/2016 | |
| KR | 101844637 | B1 | 3/2018 | |
| WO | WO-2016132932 | A1 * | 8/2016 | ............. B01J 23/32 |
| WO | WO-2017147793 | A1 * | 9/2017 | ............ H01M 12/08 |

OTHER PUBLICATIONS

English machine translation of Habazaki et al. (WO 2016132932 A1) (Year: 2016).*

English machine translation of Dong et al. (CN 107069046 A1) (Year: 2016).*

Lin, Chunfu, et al. "Spinel Li4-2 x Co3 x Ti5-x O12 (0≤x≤ 0.5) for Lithium-Ion Batteries: Crystal Structures, Material Properties, and Battery Performances." The Journal of Physical Chemistry C 118.26 (2014): 14246-14255. (Year: 2014).*

English machine translation of Godbole et al. (DE 102015210752 A1). (Year: 2016).*

Xia, Chenyang, et al. "One-step synthesis of carbon-coated Li 4 Ti 4.95 Nd 0.05 O 12 by modified citric acid sol-gel method for lithium-ion battery." Journal of Sol-Gel Science and Technology 75 (2015): 38-44. (Year: 2015).*

Fang, Minhua, et al. "The investigation of lithium doping perovskite oxide LiMnO3 as possible LIB anode material." Ceramics International 44.7 (2018): 8223-8231. (Year: 2018).*

Korean Office Action for Korean Patent Application No. 10-2018-0122040 dated Sep. 15, 2023.

* cited by examiner

CATHODE AND LITHIUM-AIR BATTERY INCLUDING THE CATHODE

CROSS-REFERENCE TO RELATED APPLICATION

This application claims the benefit of U.S. Provisional Patent Application No. 62/744,622, filed on Oct. 11, 2018, in the U.S. Patent and Trademark Office, and Korean Patent Application No. 10-2018-0122040, filed on Oct. 12, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode and a lithium-air battery including the cathode.

2. Description of the Related Art

A lithium-air battery uses lithium metal as an anode active material and does not need to store air as a cathode active material in the battery, and thus a battery having high specific energy may be provided.

The lithium-air battery has a high theoretical specific energy of 3,500 Wh/kg, which is about ten times greater than that of lithium-ion batteries.

A cathode of a lithium-air battery may be manufactured by mixing a carbonaceous conducting agent, a binder, and the like. However, the carbonaceous conducting agent and the binder may easily decompose due to the generation of a radical accompanying an electrochemical reaction during charge and discharge of the lithium-air battery. Accordingly, the lithium-air battery including such a cathode is prone to deterioration.

Therefore, there is a need for a cathode that is chemically stable against the radicals generated in the electrochemical reaction.

SUMMARY

Provided is a chemically stable cathode.

Provided is a lithium-air battery including the cathode.

Additional aspects will be set forth in part in the description which follows and, in part, will be apparent from the description, or may be learned by practice of the presented embodiments.

According to an aspect of an embodiment, there is provided a cathode configured to use oxygen as a cathode active material, the cathode including a lithium-containing metal oxide comprising at least one of:

a spinel compound represented by Formula 1

 Formula 1 wherein, in Formula 1, M is at least one metal element belonging to Group 2 to Group 16 of the periodic table of the elements, $0<x<1$, $0<y<1$, $0<\delta1\leq1$, $0<a<2$, $0.3<b<5$, and $0<\delta\leq3$;

a spinel compound represented by Formula 2

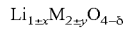
 Formula 2 wherein, in Formula 2, M is at least one metal element belonging to Group 2 to Group 16 of the periodic table of the elements, $0<x<1$, $0<y<1$, $0<\delta1\leq1$, $0<a<2$, $0.3<b<5$, and $0<\delta\leq3$; or a perovskite compound represented by Formula 3

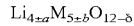
 Formula 3 wherein, in Formula 3, A and G are each independently at least one metal element belonging to Group 2 to Group 16 of the periodic table of the elements, $0<x<1$, $0<y<1$, $0<x+y\leq1$, $0<z\leq1.5$, and $0<\delta\leq1.5$.

According to an aspect of another embodiment, a lithium-air battery includes: the cathode; an anode including lithium; and an electrolyte between the cathode and the anode.

In an aspect, disclosed is a method of manufacturing an air battery cathode, the method comprising: providing a precursor mixture; and heat-treating the mixture to provide the cathode of claim 1.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
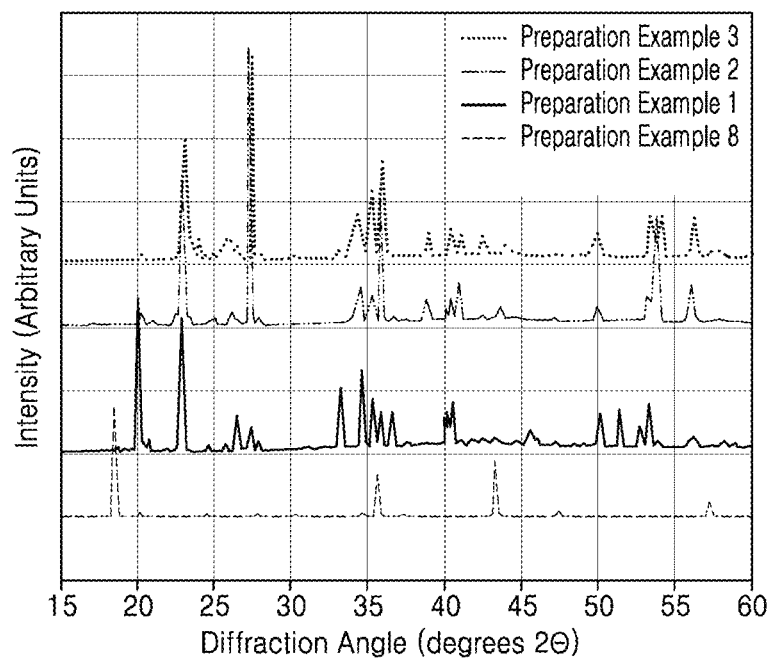
FIG. 1 is a graph of intensity (arbitrary units) versus diffraction angle (degrees 2θ) and illustrates the results of X-ray diffraction (XRD) analysis of the spinel compounds prepared in Preparation Examples 1 to 3 and 8.

The present inventive concept will now be described more fully with reference to the accompanying drawings, in which example embodiments are shown. The present inventive concept may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items. "Or" means "and/or."

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

"At least one of" means that the list is inclusive of each element individually, as well as combinations of two or more elements of the list, and combinations of at least one element of the list with like elements not named.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a cathode and a lithium-air battery including the cathode will be described in greater detail.

According to an aspect, there is provided a cathode using oxygen as a cathode active material and including a lithium-containing metal oxide.

The lithium-containing metal oxide included in the cathode may be structurally and chemically stable. The cathode including the lithium-containing metal oxide may be suppressed from being decomposed by such as radicals accompanied by electrochemical reaction, unlike a cathode including a carbonaceous conducting agent. Accordingly, a lithium-air battery including the cathode according to an embodiment as described above may have improved charge and discharge characteristics. The lithium-containing metal oxide may be an oxide of at least one metal which is not lithium.

The lithium-containing metal oxide may be, for example, a crystalline lithium ion conductor. The lithium-containing metal oxide including lithium and having crystallinity may provide a migration path for lithium ions. Accordingly, the lithium-containing metal oxide may be a lithium ion conductor. Since the lithium-containing metal oxide is a lithium ion conductor, the cathode may not further include an electrolyte.

The lithium-containing metal oxide may include, for example, at least one of a spinel compound, a perovskite compound, a layered compound, a garnet compound, a NASICON compound, a LISOCON compound, a phosphate compound, a tavorite compound, a triplite compound, an anti-perovskite compound, a silicate compound, or a borate compound. Due to the inclusion of these compounds as the lithium-containing metal oxide, the decomposition of the cathode by such as radicals accompanied by chemical reaction may be more effectively suppressed.

The lithium-containing metal oxide may include at least one spinel compound of spinel compounds represented by Formula 1 and Formula 2, respectively.

$$Li_{1\pm x}M_{2\pm y}O_{4-\delta} \quad \text{Formula 1}$$

$$Li_{4\pm a}M_{5\pm b}O_{12-\delta} \quad \text{Formula 2}$$

In Formulae 1 and 2, each M may independently be at least one metal element belonging to Group 2 to Group 16 of the periodic table of the elements, 0<x<1, 0<y<1, 0<a<2, 0.3<b<5, δ in Formula 1 may be 0≤δ2≤3 and δ in Formula 2 may be 0≤δ23.

The at least one spinel compound may include a compound having a spinel crystal structure or a spinel-type crystal structure. A "spinel-type" structure means that the compound is isostructural with spinel, i.e., $MgAl_2O_4$.

For example, in Formulas 1 and 2, M may each independently be at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb; 0<x<1, 0<y<1, 0<a<2, and 0.3<b<5, and in Formula 1, 0≤δ≤1 and in Formula 2, 0≤δ≤3.

The at least one spinel compound may be represented by Formula 4.

$$Li_{4\pm a}Ti_{5-b}M_cO_{12-\delta} \quad \text{Formula 4}$$

In Formula 4, M may be at least one of Cr, Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te; and $0.3<a<2$, $0.3<b<2$, $0.3<c<2$, and $0<\delta\leq3$.

$\delta$ may represent a content of an oxygen vacancy. For example, $0<\delta\leq2.5$, $0<\varsigma\leq2$, $0<\delta\leq1.5$, $0<\delta\leq1$, or $0<\delta\leq0.5$.

For example, in X-ray diffraction (XRD) spectra of the spinel compound of Formula 4, a ratio ($I_a/I_b$) of a peak intensity ($I_a$) of the (111) crystal plane at a diffraction angle (2θ) of about 18°±2.5° to a peak intensity ($I_b$) at a diffraction angle (2θ) of about 23.5°±2.5° may be about 0.001 to about 1, and in some embodiments, about 0.001 to about 0.9, 0.001 to about 0.8, 0.001 to about 0.7, 0.001 to about 0.6, 0.001 to about 0.5, or 0.001 to about 0.4. When a peak intensity ratio of the spinel compound of Formula 1, Formula 2, and Formula 4 is within these ranges, the spinel compound may have further improved electronic conductivity and ionic conductivity.

For example, the spinel compound may further include other phases, in addition to a phase having a spinel-like crystal structure. For example, a mixed conductor, i.e., a material providing both suitable electronic conductivity and suitable ionic conductivity, may include a phase having a spinel-type crystal structure, e.g., a structure belonging to a Fd-3m space group, and at least one other phase, e.g., at least one of $Li_2TiO_3$, $Gd_2Ti_2O_7$, $GdTiO_3$, $LiNbO_3$, or $Nb_2O_5$. Due to polycrystallinity and having a plurality of different phases, the mixed conductor may have further improved electronic conductivity and ionic conductivity.

A band gap between valence and conduction bands of the lithium-containing metal oxides of the cathode, e.g., the spinel compounds of Formula 1, Formula 2, and Formula 4 may be, for example, about 0.01 electron volts (eV) to about 2.0 eV, about 0.01 eV to about 1.8 eV, about 0.01 eV to about 1.6 eV, about 0.01 eV to about 1.4 eV, or about 0.01 eV to about 1.2 eV. When a band gap between the valence and conduction bands of the mixed conductor has such a low value within these ranges, migration of electrons from the valence band to the conduction band may be facilitated, and the spinel compound may have improved electronic conductivity.

In the spinel compound of Formula 4, titanium (Ti) may have at least one oxidation number of +3 and +4. For example, as Ti in the mixed conductor has a mixed valence state with multiple different oxidation numbers, a new state density function near the Fermi energy (Ef) is provided, and the band gap between the valence and conduction bands may be reduced. As a result, the spinel compound may have further improved electronic conductivity.

For example, in the spinel compound of Formula 4, M in Formula 4 may have an oxidation number different from at least one of the oxidation numbers of Ti. For example, due to the additional inclusion of M having an oxidation number different from that of Ti in the mixed conductor, an additional new state density function may be observed near the Fermi energy (Ef), and the band gap between the valance and conduction bands may be reduced. As a result, the spinel compound may have further improved electronic conductivity.

The spinel compound of Formula 4 may provide further improved ionic conductivity through the inclusion of an oxygen vacancy. For example, due to the inclusion of an oxygen vacancy in the mixed conductor, the position of the state density function may be shifted closer to the Fermi energy (Ef), and the band gap between the valance and conduction bands may be reduced. As a result, the spinel compound may have further improved electronic conductivity.

For example, the at least one spinel compound of Formula 4 may include at least one of $Li_{4\pm x}Ti_{5-y}Mg_zO_{12-\delta}$ (wherein $0.4<x\leq1$, $0.4<y\leq1$, $0.4<z\leq1$, and $0<\delta\leq3$), $Li_{4\pm x}Ti_{5-y}Ca_zO_{12-\delta}$ (wherein $0.4<x\leq1$, $0.4<y\leq1$, $0.4<z\leq1$, and $0<\delta\leq3$), $Li_{4\pm x}Ti_{5-y}Sr_zO_{12-\delta}$ (wherein $0.4<x\leq1$, $0.4<y\leq1$, $0.4<z\leq1$, and $0<\delta\leq3$), $Li_{4\pm x}Ti_{5-y}Sc_zO_{12-\delta}$ (wherein $0.4<x\leq1$, $0.4<y\leq1$, $0.4<z\leq1$, and $0<\delta\leq3$), $Li_{4\pm x}Ti_{5-y}Y_zO_{12-\delta}$ (wherein $0.4<x\leq1$, $0.4<y\leq1$, $0.4<z\leq1$, and $0<\delta\leq3$), $Li_{4\pm x}Ti_{5-y}La_zO_{12-\delta}$ (wherein $0.4<x\leq1$, $0.4<y\leq1$, $0.4<z\leq1$, and $0<\delta\leq3$), $Li_{4\pm x}Ti_{5-y}Ce_zO_{12-\delta}$ (wherein $0.4<x\leq1$, $0.4<y\leq1$, $0.4<z\leq1$, and $0<\delta\leq3$), $Li_{4\pm x}Ti_{5-y}Pr_zO_{12-\delta}$ (wherein $0.4<x\leq1$, $0.4<y\leq1$, $0.4<z\leq1$, and $0<\delta\leq3$), $Li_{4\pm x}Ti_{5-y}Nd_zO_{12-\delta}$ (wherein $0.4<x\leq1$, $0.4<y\leq1$, $0.4<z\leq1$, and $0<\delta\leq3$), $Li_{4\pm x}Ti_{5-y}Sm_zO_{12-\delta}$ (wherein $0.4<x\leq1$, $0.4<y\leq1$, $0.4<z\leq1$, and $0<\delta\leq3$), $Li_{4\pm x}Ti_{5-y}Eu_zO_{12-\delta}$ (wherein $0.4<x\leq1$, $0.4<y\leq1$, $0.4<z\leq1$, and $0<\delta\leq3$), $Li_{4\pm x}Ti_{5-y}Gd_zO_{12-\delta}$ (wherein $0.4<x\leq1$, $0.4<y\leq1$, $0.4<z\leq1$, and $0<\delta\leq3$), $Li_{4\pm x}Ti_{5-y}Tb_zO_{12-\delta}$ (wherein $0.4<x\leq1$, $0.4<y\leq1$, $0.4<z\leq1$, and $0<\delta\leq3$), $Li_{4\pm x}Ti_{5-y}Dy_zO_{12-\delta}$ (wherein $0.4<x\leq1$, $0.4<y\leq1$, $0.4<z\leq1$, and $0<\delta\leq3$), $Li_{4\pm x}Ti_{5-y}Ho_zO_{12-\delta}$ (wherein $0.4<x\leq1$, $0.4<y\leq1$, $0.4<z\leq1$, and $0<\delta\leq3$), $Li_{4\pm x}Ti_{5-y}Er_zO_{12-\delta}$ (wherein $0.4<x\leq1$, $0.4<y\leq1$, $0.4<z\leq1$, and $0<\delta\leq3$), $Li_{4\pm x}Ti_{5-y}Tm_zO_{12-\delta}$ (wherein $0.4<x\leq1$, $0.4<y\leq1$, $0.4<z\leq1$, and $0<\delta\leq3$), $Li_{4\pm x}Ti_{5-y}Yb_zO_{12-\delta}$ (wherein $0.4<x\leq1$, $0.4<y\leq1$, $0.4<z\leq1$, and $0<\delta\leq3$), $Li_{4\pm x}Ti_{5-y}Lu_zO_{12-\delta}$ (wherein $0.4<x\leq1$, $0.4<y\leq1$, $0.4<z\leq1$, and $0<\delta\leq3$), $Li_{4\pm x}Ti_{5-y}Zr_zO_{12-\delta}$ (wherein $0.4<x\leq1$, $0.4<y\leq1$, $0.4<z\leq1$, and $0<\delta\leq3$), $Li_{4\pm x}Ti_{5-y}Hf_zO_{12-\delta}$ (wherein $0.4<x\leq1$, $0.4<y\leq1$, $0.4<z\leq1$, and $0<\delta\leq3$), $Li_{4\pm x}Ti_{5-y}V_zO_{12-\delta}$ (wherein $0.4<x\leq1$, $0.4<y\leq1$, $0.4<z\leq1$, and $0<\delta\leq3$), $Li_{4\pm x}Ti_{5-y}Nb_zO_{12-\delta}$ (wherein $0.4<x\leq1$, $0.4<y\leq1$, $0.4<z\leq1$, and $0<\delta\leq3$), $Li_{4\pm x}Ti_{5-y}Ta_zO_{12-\delta}$ (wherein $0.4<x\leq1$, $0.4<y\leq1$, $0.4<z\leq1$, and $0<\delta\leq3$), $Li_{4\pm x}Ti_{5-y}Mo_zO_{12-\delta}$ (wherein $0.4<x\leq1$, $0.4<y\leq1$, $0.4<z\leq1$, and $0<\delta\leq3$), $Li_{4\pm x}Ti_{5-y}W_zO_{12-\delta}$ (wherein $0.4<x\leq1$, $0.4<y\leq1$, $0.4<z\leq1$, and $0<\delta\leq3$), $Li_{4\pm x}Ti_{5-y}Mn_zO_{12-\delta}$ (wherein $0.4<x\leq1$, $0.4<y\leq1$, $0.4<z\leq1$, and $0<\delta\leq3$), $Li_{4\pm x}Ti_{5-y}Tc_zO_{12-\delta}$ (wherein $0.4<x\leq1$, $0.4<y\leq1$, $0.4<z\leq1$, and $0<\delta\leq3$), $Li_{4\pm x}Ti_{5-y}Re_zO_{12-\delta}$ (wherein $0.4<x\leq1$, $0.4<y\leq1$, $0.4<z\leq1$, and $0<\delta\leq3$), $Li_{4\pm x}Ti_{5-y}Fe_zO_{12-\delta}$ (wherein $0.4<x\leq1$, $0.4<y\leq1$, $0.4<z\leq1$, and $0<\delta\leq3$), $Li_{4\pm x}Ti_{5-y}Ru_zO_{12-\delta}$ (wherein $0.4<x\leq1$, $0.4<y\leq1$, $0.4<z\leq1$, and $0<\delta\leq3$), $Li_{4\pm x}Ti_{5-y}Os_zO_{12-\delta}$ (wherein $0.4<x\leq1$, $0.4<y\leq1$, $0.4<z\leq1$, and $0<\delta\leq3$), $Li_{4\pm x}Ti_{5-y}Co_zO_{12-\delta}$ (wherein $0.4<x\leq1$, $0.4<y\leq1$, $0.4<z\leq1$, and $0<\delta\leq3$), $Li_{4\pm x}Ti_{5-y}Rh_zO_{12-\delta}$ (wherein $0.4<x\leq1$, $0.4<y\leq1$, $0.4<z\leq1$, and $0<\delta\leq3$), $Li_{4\pm x}Ti_{5-y}Ir_zO_{12-\delta}$ (wherein $0.4<x\leq1$, $0.4<y\leq1$, $0.4<z\leq1$, and $0<\delta\leq3$), $Li_{4\pm x}Ti_{5-y}Ni_zO_{12-\delta}$ (wherein $0.4<x\leq1$, $0.4<y\leq1$, $0.4<z\leq1$, and $0<\delta\leq3$), $Li_{4\pm x}Ti_{5-y}Pd_zO_{12-\delta}$ (wherein $0.4<x\leq1$, $0.4<y\leq1$, $0.4<z\leq1$, and $0<\delta\leq3$), $Li_{4\pm x}Ti_{5-y}Pt_zO_{12-\delta}$ (wherein $0.4<x\leq1$, $0.4<y\leq1$, $0.4<z\leq1$, and $0<\delta\leq3$), $Li_{4\pm x}Ti_{5-y}Cu_zO_{12-\delta}$ (wherein $0.4<x\leq1$, $0.4<y\leq1$, $0.4<z\leq1$, and $0<\delta\leq3$), $Li_{4\pm x}Ti_{5-y}Ag_zO_{12-\delta}$ (wherein $0.4<x\leq1$, $0.4<y\leq1$, $0.4<z\leq1$, and $0<\delta\leq3$), $Li_{4\pm x}Ti_{5-y}Au_zO_{12-\delta}$ (wherein $0.4<x\leq1$, $0.4<y\leq1$, $0.4<z\leq1$, and $0<\delta\leq3$), $Li_{4\pm x}Ti_{5-y}Zn_zO_{12-\delta}$ (wherein $0.4<x\leq1$, $0.4<y\leq1$, $0.4<z\leq1$, and $0<\delta\leq3$), $Li_{4\pm x}Ti_{5-y}Cd_zO_{12-\delta}$ (wherein $0.4<x\leq1$, $0.4<y\leq1$, $0.4<z\leq1$, and $0<\delta\leq3$), $Li_{4\pm x}Ti_{5-y}Hg_zO_{12-\delta}$ (wherein $0.4<x\leq1$, $0.4<y\leq1$, $0.4<z\leq1$, and $0<\delta\leq3$), $Li_{4\pm x}Ti_{5-y}Al_zO_{12-\delta}$ (wherein $0.4<x\leq1$, $0.4<y\leq1$, $0.4<z\leq1$, and $0<\delta\leq3$), $Li_{4\pm x}Ti_{5-y}Ga_zO_{12-\delta}$ (wherein $0.4<x\leq1$, $0.4<y\leq1$, $0.4<z\leq1$, and $0<53$), $Li_{4\pm x}Ti_{5-y}In_zO_{12-\delta}$ (wherein $0.4<x\leq1$, $0.4<y\leq1$, $0.4<z\leq1$, and $0<\delta\leq3$), $Li_{4\pm x}Ti_{5-y}Tl_zO_{12-\delta}$ (wherein $0.4<x\leq1$, $0.4<y\leq1$, $0.4<z\leq1$, and $0<\delta\leq3$), $Li_{4\pm x}Ti_{5-y}Ge_zO_{12-\delta}$ (wherein $0.4<x\leq1$, $0.4<y\leq1$, $0.4<z\leq1$, and $0<\delta\leq3$), $Li_{4\pm x}$ $Ti_{5-y}Sn_zO_{12-\delta}$ (wherein $0.4<x\leq1$, $0.4<y\leq1$, $0.4<z\leq1$, and $0<\delta\leq3$), $Li_{4\pm x}Ti_{5-y}Pb_zO_{12-\delta}$ (wherein $0.4<x\leq1$, $0.4<y\leq1$, $0.4<z\leq1$, and $0<\delta\leq3$), $Li_{4\pm x}Ti_{5-y}Sb_zO_{12-\delta}$ (wherein $0.4<x\leq1$, $0.4<y\leq1$, $0.4<z\leq1$, and $0<\delta\leq3$), $Li_{4\pm x}Ti_{5-y}Bi_zO_{12-\delta}$ (wherein $0.4<x\leq1$, $0.4<y\leq1$, $0.4<z\leq1$, and $0<\delta\leq3$), $Li_{4\pm x}Ti_{5-y}Po_zO_{12-\delta}$ (wherein $0.4<x\leq1$, $0.4<y\leq1$, $0.4<z\leq1$, and $0<\delta\leq3$), $Li_{4\pm x}Ti_{5-y}As_zO_{12-\delta}$ (wherein $0.4<x\leq1$, $0.4<y\leq1$, $0.4<z\leq1$, and $0<\delta\leq3$), $Li_{4\pm x}Ti_{5-y}Se_zO_{12-\delta}$ (wherein $0.4<x\leq1$, $0.4<y\leq1$, $0.4<z\leq1$, and $0<\delta\leq3$), or $Li_{4\pm x}Ti_{5-y}Te_zO_{12-\delta}$ (wherein $0.4<x\leq1$, $0.4<y\leq1$, $0.4<z\leq1$, and $0<\delta\leq3$).

For example, the at least one spinel compound may be $LiMn_2O_{4-\delta}$, $LiTiNbO_{4-\delta}$, $Li_4Ti_5O_{12-\delta}$, $Li_4Mn_5O_{12-\delta}$, or $Li_{4.5}Ti_{4.5}Gd_{0.5}O_{12-\delta}$. However, embodiments are not limited thereto. Any suitable lithium-containing compound available as a spinel compound in the art may be used.

For example, the at least one spinel compound may have an electronic conductivity of about $1.0\times10^{-9}$ S/cm or greater, e.g., about $10^{-3}$ S/cm and an ionic conductivity of about $1.0\times10^{-8}$ S/cm or greater at room temperature, e.g., at 25° C.

The at least one spinel compound may have an electronic conductivity of, for example, about $5.0\times10^{-9}$ S/cm or greater, e.g., about to $10^{-3}$ S/cm, about $1.0\times10^{-8}$ S/cm or greater, about $5.0\times10^{-8}$ S/cm or greater, about $1.0\times10^{-7}$ S/cm or greater, about $5.0\times10^{-7}$ S/cm or greater, about $1.0\times10^{-6}$ S/cm or greater, about $5.0\times10^{-6}$ S/cm or greater, about $1.0\times10^{-5}$ S/cm or greater, about $5.0\times10^{-5}$ S/cm or greater, about $1.0\times10^{-4}$ S/cm or greater, about $5.0\times10^{-4}$ S/cm or greater, or about $1.0\times10^{-3}$ S/cm or greater at room temperature, e.g., at 25° C. The at least one spinel compound may have an electronic conductivity of, for example, $5.0\times10^{-9}$ S/cm to 1.0 S/cm, $1.0\times10^{-8}$ S/cm to 1.0 S/cm, $5.0\times10^{-8}$ S/cm to 1.0 S/cm, $1.0\times10^{-7}$ S/cm to 1.0 S/cm, $5.0\times10^{-7}$ S/cm to 1.0 S/cm, $1.0\times10^{-6}$ S/cm to 1.0 S/cm, $5.0\times10^{-6}$ S/cm to 1.0 S/cm, $1.0\times10^{-5}$ S/cm to $1.0\times10^{-1}$ S/cm, $5.0\times10^{-5}$ S/cm to 1.0 S/cm, $1.0\times10^{-4}$ S/cm to $1.0\times10^{-1}$ S/cm, $5.0\times10^{-4}$ S/cm to 1.0 S/cm, or $1.0\times10^{-3}$ S/cm to 1.0 S/cm at room temperature, e.g., at 25° C. The at least one spinel compound may have an electronic conductivity of, for example, $5.0\times10^{-9}$ S/cm to $1.0\times10^{-1}$ S/cm, $5.0\times10^{-9}$ S/cm to $1.0\times10^{-2}$ S/cm, or $5.0\times10^{-9}$ S/cm to $1.0\times10^{-3}$ S/cm at room temperature, e.g., at 25° C. When the spinel compound has an electronic conductivity within these ranges, a cathode and a lithium-air battery each including the spinel compound may have reduced internal resistance.

The at least one spinel compound may have an ionic conductivity of, for example, about $5.0\times10^{-8}$ S/cm or greater, e.g., about $10^{-3}$ S/cm, about $1.0\times10^{-7}$ S/cm or greater, about $5.0\times10^{-7}$ S/cm or greater, about $1.0\times10^{-6}$ S/cm or greater, about $5.0\times10^{-6}$ S/cm or greater, or about $1.0\times10^{-5}$ S/cm or greater at room temperature, e.g., at 25° C. The at least one spinel compound may have an ionic conductivity of, for example, $5.0\times10^{-8}$ S/cm to $1.0\times10^{-1}$ S/cm, $1.0\times10^{-7}$ S/cm to $1.0\times10^{-1}$ S/cm, $5.0\times10^{-7}$ S/cm to $1.0\times10^{-1}$ S/cm, $1.0\times10^{-6}$ S/cm to $1.0\times10^{-1}$ S/cm, $5.0\times10^{-6}$ S/cm to $1.0\times10^{-1}$ S/cm, or $1.0\times10^{-5}$ S/cm to $1.0\times10^{-1}$ S/cm at room temperature, e.g., at 25° C. The at least one spinel compound may have an ionic conductivity of, for example, $5.0\times10^{-8}$ S/cm to $1.0\times10^{-2}$ S/cm, $5.0\times10^{-8}$ S/cm or to $1.0\times10^{-3}$ S/cm, or $5.0\times10^{-8}$ S/cm to $1.0\times10^{-4}$ S/cm at room temperature, e.g., at 25° C. When the spinel compound has a high ionic conductivity within these ranges, a cathode and a lithium-air battery each including the spinel compound may have further reduced internal resistance.

In an embodiment, the lithium-containing metal oxide of the cathode may include a perovskite compound represented by Formula 3.

$$Li_xA_yG_zO_{3-\delta} \quad \text{Formula 3}$$

In Formula 3, A and G may each independently be at least one metal element belonging to Group 2 to Group 16 of the periodic table of the elements, $0<x<1$, $0<y<1$, $0<x+y\leq1$, $0<z\leq1.5$, and $0\leq\delta\leq1.5$. $\delta$ may represent a content of an oxygen vacancy. For example, $0<\delta\leq1$, $0<\varsigma\leq0.8$, $0<\delta\leq0.6$, $0<\delta\leq0.4$, or $0<\delta\leq0.3$ The perovskite compound may be a compound having a perovskite crystal structure or a perovskite-type crystal structure.

For example, in Formula 3, A may be at least one of H, Na, K, Rb, Cs, Ca, Sr, Ba, Y, La, Ce, Pr, Nd, Pm, Sm, Gd, Tb, Dy, Ho, or Er; G may be at least one of Ti, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb; and $0.2<x\leq0.7$, $0<y\leq0.7$, $0<x+y<1$, $0<z\leq1.2$, and $0\leq\delta\leq1.2$.

For example, in Formula 3, A may be at least one of La, Ce, Pr, Gd, Ca, Sr, or Ba; M may be at least one of Ti, Mn, Ni, Ru, Cr, Co, Ti, Ru, Ir, Fe, Pd, Pb, Rh, Sn, V, Re, Ge, W, Zr, Mo, Nb, Ta, Hf, or Bi; and $0.2<x\leq0.5$, $0.4<y\leq0.7$, $0<x+y<1$, $0.8<z\leq1.2$, and $0<\delta\leq1.0$.

For example, the perovskite compound may have an $ABO_3$ phase in which there are vacancies and lithium is arranged at some A sites, and may have an orthorhombic, cubic, monoclinic or triclinic crystalline phase or a combination thereof with oxygen defects. The perovskite compound may have improved lithium ion conductivity due to an optimized lithium concentration at the A sites, and an increased electronic conductivity by introduction of a metal M having a low oxygen vacancy formation energy into the B sites.

For example, the perovskite compound may have a structure including corner-sharing $MO_6$ octahedra in which six oxygen atoms may form vertices, M may be located at the center of the octahedra, and the vertices of the octahedra are connected to form a space in which for example lanthanum (La), lithium (Li), and vacancies are randomly distributed in a composition ratio. In the perovskite compound, lithium ions may be conducted through a lanthanum (La) vacant layers, and electrons may be conducted through a metal (M) ion layer.

Figure 2:
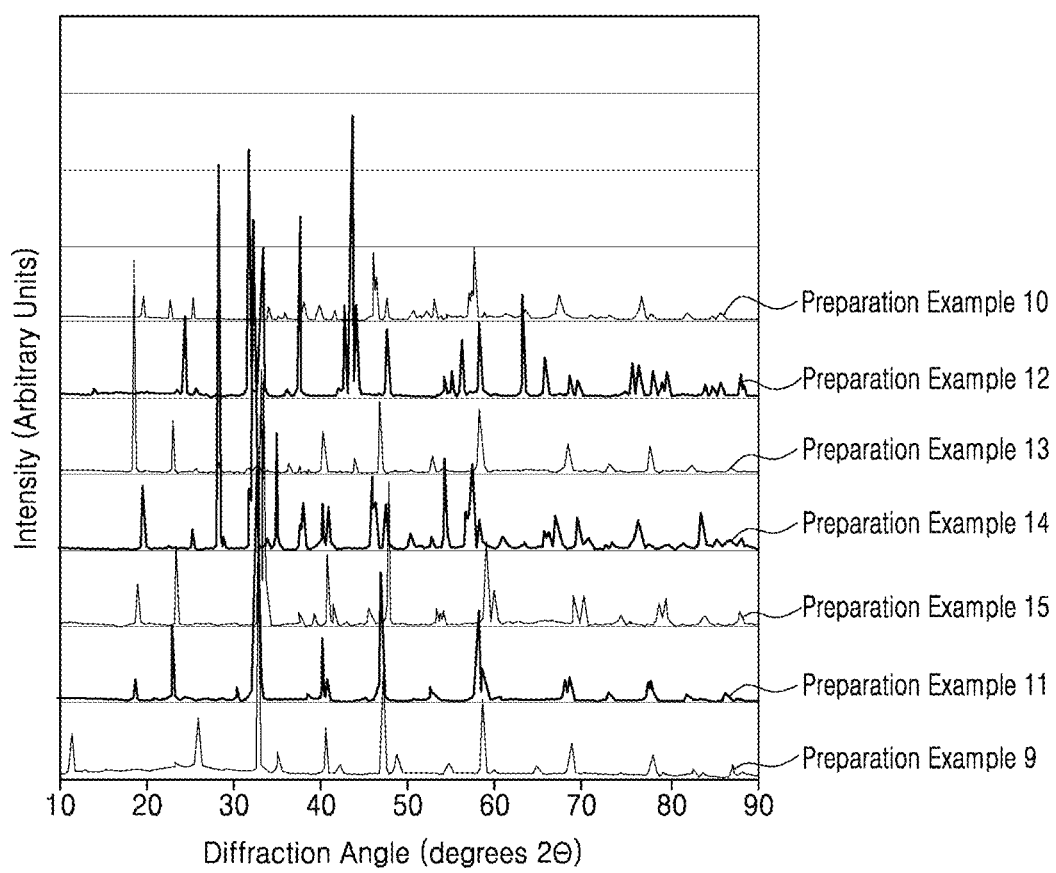
FIG. 2 is a graph of intensity (arbitrary units) versus diffraction angle (degrees 2θ) and illustrates the results of XRD spectra of perovskite compounds prepared in Preparation Examples 9 to 15.

For example, as shown in FIG. 2, the perovskite compound may exhibit a peak near an X-ray diffraction (XRD) angle (2θ) of about 23°, for example, at 23°±2.5°, due to a random distribution of La in each layer.

For example, X-ray diffraction analysis my show that the perovskite compound may have a main peak at a diffraction angle (2θ) of 32.5°±2.5°, and a minor peak(s) at a diffraction angle (2θ) of 46.5°±2.5° and/or a diffraction angle (2θ) of 57.5°±2.5°. The main peak refers to the peak with the highest intensity, and the minor peak refers to a peak with a lower intensity than the main peak.

For example, a ratio ($I_b/I_a$) of a peak intensity (I(46.5°±2.5°):$I_b$) at a diffraction angle (2θ) of 46.5°±2.5° to a peak intensity (I(32.5°±2.5°):$I_a$) at a diffraction angle (2θ) of 32.5°±2.5° in an XRD spectra of the perovskite compound may be about 0.1 or greater, e.g., about 1, for example, about 0.1 to about 0.9, for example, about 0.2 to about 0.6. In an embodiment, a ratio ($I_c/I_a$) of a peak intensity (I(57.5°±2.5°):$I_c$) at a diffraction angle (2θ) of 57.5°±2.5° to a peak intensity (I(32.5°±2.5°):$I_a$) at a diffraction angle (2θ) of 32.5°±2.5° in an XRD spectra of the perovskite compound may be about 0.1 or greater, for example, about 0.1 to about 0.9, for example, about 0.2 to about 0.8, for example, about 0.2 to about 0.4.

For example, the perovskite compound may include at least one of $Li_{0.34}La_{0.55}TiO_{3-\delta}$ (wherein $0\leq\delta\leq1.0$), $Li_{0.34}La_{0.55}MnO_{3-\delta}$ (wherein $0\leq\delta\leq1.0$), $Li_{0.34}La_{0.55}NiO_{3-\delta}$ (wherein $0\leq\delta\leq1.0$), $Li_{0.34}La_{0.55}CrO_{3-\delta}$ (wherein $0\leq\delta\leq1.0$), $Li_{0.34}La_{0.55}CoO_{3-\delta}$ (wherein $0\leq\delta\leq1.0$), $Li_{0.34}La_{0.55}IrO_{3-\delta}$ (wherein $0\leq\delta\leq1.0$), $Li_{0.34}La_{0.55}RuO_{3-\delta}$ (wherein $0\leq\delta\leq1.0$), $Li_{0.34}La_{0.55}TiO_{3-\delta}$ (wherein $0\leq\delta\leq1.0$), $Li_{0.34}La_{0.55}FeO_{3-\delta}$ (wherein $0\leq\delta\leq1.0$), $Li_{0.34}La_{0.55}PdO_{3-\delta}$ (wherein $0\leq\delta\leq1.0$), $Li_{0.34}La_{0.55}PbO_{3-\delta}$ (wherein $0\leq\delta\leq1.0$), $Li_{0.34}La_{0.55}RhO_{3-\delta}$ (wherein $0\leq\delta\leq1.0$), $Li_{0.34}La_{0.55}SnO_{3-\delta}$ (wherein $0\leq\delta\leq1.0$), $Li_{0.34}La_{0.55}VO_{3-\delta}$ (wherein $0\leq\delta\leq1.0$), $Li_{0.34}La_{0.55}ReO_{3-\delta}$ (wherein $0\leq\delta\leq1.0$), $Li_{0.34}La_{0.55}GeO_{3-\delta}$ (wherein $0\leq\delta\leq1.0$), $Li_{0.34}La_{0.55}WO_{3-\delta}$ (wherein $0\leq\delta\leq1.0$), $Li_{0.34}La_{0.55}ZrO_{3-\delta}$ (wherein $0\leq\delta\leq1.0$), $Li_{0.34}La_{0.55}MoO_{3-\delta}$ (wherein $0\leq\delta\leq1.0$), $Li_{0.34}La_{0.55}NbO_{3-\delta}$ (wherein $0\leq\delta\leq1.0$), $Li_{0.34}La_{0.55}TaO_{3-\delta}$ (wherein $0\leq\delta\leq1.0$), $Li_{0.34}La_{0.55}HfO_{3-\delta}$ (wherein $0\leq\delta\leq1.0$), $Li_{0.34}La_{0.55}BiO_{3-\delta}$ (wherein $0\leq\delta\leq1.0$), $Li_{0.10}La_{0.63}TiO_{3-\delta}$ (wherein $0\leq\delta\leq1.0$), $Li_{1.10}La_{0.63}MnO_{3-\delta}$ (wherein $0\leq\delta\leq1.0$), $Li_{0.10}La_{0.63}NiO_{3-\delta}$ (wherein $0\leq\delta\leq1.0$), $Li_{0.10}La_{0.63}CrO_{3-\delta}$ (wherein $0\leq\delta\leq1.0$), $Li_{0.10}La_{0.63}CoO_{3-\delta}$ (wherein $0\leq\delta\leq1.0$), $Li_{0.10}La_{0.63}IrO_{3-\delta}$ (wherein $0\leq\delta\leq1.0$), $Li_{0.10}La_{0.63}RuO_{3-\delta}$ (wherein $0\leq\delta\leq1.0$), $Li_{0.10}La_{0.63}TiO_{3-\delta}$ (wherein $0\leq\delta\leq1.0$), $Li_{0.10}La_{0.63}FeO_{3-\delta}$ (wherein $0\leq\delta\leq1.0$), $Li_{0.10}La_{0.63}PdO_{3-\delta}$ (wherein $0\leq\delta\leq1.0$), $Li_{0.10}La_{0.63}PbO_{3-\delta}$ (wherein $0\leq\delta\leq1.0$), $Li_{0.10}La_{0.63}RhO_{3-\delta}$ (wherein $0\leq\delta\leq1.0$), $Li_{0.10}La_{0.63}SnO_{3-\delta}$ (wherein $0\leq\delta\leq1.0$), $Li_{0.10}La_{0.63}VO_{3-\delta}$ (wherein $0\leq\delta\leq1.0$), $Li_{0.10}La_{0.63}ReO_{3-\delta}$ (wherein $0\leq\delta\leq1.0$), $Li_{0.10}La_{0.63}GeO_{3-\delta}$ (wherein $0\leq\delta\leq1.0$), $Li_{0.10}La_{0.63}WO_{3-\delta}$ (wherein $0\leq\delta\leq1.0$), $Li_{0.10}La_{0.63}ZrO_{3-\delta}$ (wherein $0\leq\delta\leq1.0$), $Li_{0.10}La_{0.63}MoO_{3-\delta}$ (wherein $0\leq\delta\leq1.0$), $Li_{0.10}La_{0.63}NbO_{3-\delta}$ (wherein $0\leq\delta\leq1.0$), $Li_{0.10}La_{0.63}TaO_{3-\delta}$ (wherein $0\leq\delta\leq1.0$), $Li_{1.10}La_{0.63}HfO_{3-\delta}$ (wherein $0\leq\delta\leq1.0$), $Li_{0.10}La_{0.6}3BiO_{3-\delta}$ (wherein $0\leq\delta\leq1.0$), $Li_{0.20}La_{0.60}TiO_{3-\delta}$ (wherein $0\leq\delta\leq1.0$), $Li_{0.20}La_{0.60}MnO_{3-\delta}$ (wherein $0\leq\delta\leq1.0$), $Li_{0.20}La_{0.60}NiO_{3-\delta}$ (wherein $0\leq\delta\leq1.0$), $Li_{0.20}La_{0.60}CrO_{3-\delta}$ (wherein $0\leq\delta\leq1.0$), $Li_{0.20}La_{0.60}CoO_{3-\delta}$ (wherein $0\leq\delta\leq1.0$), $Li_{0.20}La_{0.60}IrO_{3-\delta}$ (wherein $0\leq\delta\leq1.0$), $Li_{0.20}La_{0.60}RuO_{3-\delta}$ (wherein $0\leq\delta\leq1.0$), $Li_{0.20}La_{0.60}TiO_{3-\delta}$ (wherein $0\leq\delta\leq1.0$), $Li_{0.20}La_{0.60}FeO_{3-\delta}$ (wherein $0\leq\delta\leq1.0$), $Li_{0.20}La_{0.60}PdO_{3-\delta}$ (wherein $0\leq\delta\leq1.0$), $Li_{0.20}La_{0.60}PbO_{3-\delta}$ (wherein $0\leq\delta\leq1.0$), $Li_{0.20}La_{0.60}RhO_{3-\delta}$ (wherein $0\leq\delta\leq1.0$), $Li_{0.20}La_{0.60}SnO_{3-\delta}$ (wherein $0\leq\delta\leq1.0$), $Li_{0.20}La_{0.60}VO_{3-\delta}$ (wherein $0\leq\delta\leq1.0$), $Li_{0.20}La_{0.60}ReO_{3-\delta}$ (wherein $0\leq\delta\leq1.0$), $Li_{0.20}La_{0.60}GeO_{3-\delta}$ (wherein $0\leq\delta\leq1.0$), $Li_{0.20}La_{0.60}WO_{3-\delta}$ (wherein $0\leq\delta\leq1.0$), $Li_{0.20}La_{0.60}ZrO_{3-\delta}$ (wherein $0\leq\delta\leq1.0$), $Li_{0.20}La_{0.60}MoO_{3-\delta}$ (wherein $0\leq\delta\leq1.0$), $Li_{0.20}La_{0.60}NbO_{3-\delta}$ (wherein $0\leq\delta\leq1.0$), $Li_{0.20}La_{0.60}TaO_{3-\delta}$ (wherein $0\leq\delta\leq1.0$), $Li_{0.20}La_{0.60}HfO_{3-\delta}$ (wherein $0\leq\delta\leq1.0$), $Li_{0.20}La_{0.60}BiO_{3-\delta}$ (wherein $0\leq\delta\leq1.0$), $Li_{0.30}La_{0.57}TiO_{3-\delta}$ (wherein $0\leq\delta\leq1.0$), $Li_{0.30}La_{0.57}MnO_{3-\delta}$ (wherein $0\leq\delta\leq1.0$), $Li_{0.30}La_{0.57}NiO_{3-\delta}$ (wherein $0\leq\delta\leq1.0$), $Li_{0.30}La_{0.57}CrO_{3-\delta}$ (wherein $0\leq\delta\leq1.0$), $Li_{0.30}La_{0.57}CoO_{3-\delta}$ (wherein $0\leq\delta\leq1.0$), $Li_{0.30}La_{0.57}IrO_{3-\delta}$ (wherein $0\leq\delta\leq1.0$), $Li_{0.30}La_{0.57}RuO_{3-\delta}$ (wherein $0\leq\delta\leq1.0$), $Li_{0.30}La_{0.57}TiO_{3-\delta}$ (wherein $0\leq\delta\leq1.0$), $Li_{0.30}La_{0.57}FeO_{3-\delta}$ (wherein $0\leq\delta\leq1.0$), $Li_{0.30}La_{0.57}PdO_{3-\delta}$ (wherein $0\leq\delta\leq1.0$), $Li_{0.30}La_{0.57}PbO_{3-\delta}$ (wherein $0\leq\delta\leq1.0$), $Li_{0.30}La_{0.57}RhO_{3-\delta}$ (wherein $0\leq\delta\leq1.0$), $Li_{0.30}La_{0.57}SnO_{3-\delta}$ (wherein $0\leq\delta\leq1.0$), $Li_{0.30}La_{0.57}VO_{3-\delta}$ (wherein $0\leq\delta\leq1.0$), $Li_{0.30}La_{0.57}ReO_{3-\delta}$ (wherein $0\leq\delta\leq1.0$), $Li_{0.30}La_{0.57}GeO_{3-\delta}$ (wherein $0\leq\delta\leq1.0$), $Li_{0.30}La_{0.57}WO_{3-\delta}$ (wherein $0\leq\delta\leq1.0$), $Li_{0.30}La_{0.57}ZrO_{3-\delta}$ (wherein $0\leq\delta\leq1.0$), $Li_{0.30}La_{0.57}MoO_{3-\delta}$ (wherein $0\leq\delta\leq1.0$), $Li_{0.30}La_{0.57}NbO_{3-\delta}$ (wherein $0\leq\delta\leq1.0$), $Li_{0.30}La_{0.57}TaO_{3-\delta}$ (wherein $0\leq\delta\leq1.0$), $Li_{0.30}La_{0.57}HfO_{3-\delta}$ (wherein $0\leq\delta\leq1.0$), $Li_{0.30}La_{0.57}BiO_{3-\delta}$ (wherein $0\leq\delta\leq1.0$), $Li_{0.40}La_{0.53}TiO_{3-\delta}$ (wherein $0\leq\delta\leq1.0$), $Li_{0.40}La_{0.53}MnO_{3-\delta}$ (wherein $0\leq\delta\leq1.0$), $Li_{0.40}La_{0.53}NiO_{3-\delta}$ (wherein $0\leq\delta\leq1.0$), $Li_{0.40}La_{0.53}CrO_{3-\delta}$ (wherein $0\leq\delta\leq1.0$), $Li_{0.40}La_{0.53}CoO_{3-\delta}$ (wherein $0\leq\delta\leq1.0$), $Li_{0.40}La_{0.53}IrO_{3-\delta}$ (wherein $0\leq\delta\leq1.0$), $Li_{0.40}La_{0.53}RuO_{3-\delta}$ (wherein $0\leq\delta\leq1.0$), $Li_{0.40}La_{0.53}TiO_{3-\delta}$ (wherein $0\leq\delta\leq1.0$), $Li_{0.40}La_{0.53}FeO_{3-\delta}$ (wherein $0\leq\delta\leq1.0$), $Li_{0.40}La_{0.53}PdO_{3-\delta}$ (wherein $0\leq\delta\leq1.0$), $Li_{0.40}La_{0.53}PbO_{3-\delta}$ (wherein $0\leq\delta\leq1.0$), $Li_{0.40}La_{0.53}RhO_{3-\delta}$ (wherein $0\leq\delta\leq1.0$), $Li_{0.40}La_{0.53}SnO_{3-\delta}$ (wherein $0\leq\delta\leq1.0$), $Li_{0.40}La_{0.53}VO_{3-\delta}$ (wherein $0\leq\delta\leq1.0$), $Li_{0.40}La_{0.53}ReO_{3-\delta}$ (wherein $0\leq\delta\leq1.0$), $Li_{0.40}La_{0.53}GeO_{3-\delta}$ (wherein $0\leq\delta\leq1.0$), $Li_{0.40}La_{0.53}WO_{3-\delta}$ (wherein $0\leq\delta\leq1.0$), $Li_{0.40}La_{0.53}ZrO_{3-\delta}$ (wherein $0\leq\delta\leq1.0$), $Li_{0.40}La_{0.53}MoO_{3-\delta}$ (wherein $0\leq\delta\leq1.0$), $Li_{0.40}La_{0.53}NbO_{3-\delta}$ (wherein $0\leq\delta\leq1.0$), $Li_{0.40}La_{0.53}TaO_{3-\delta}$ (wherein $0\leq\delta\leq1.0$), $Li_{0.40}La_{0.53}HfO_{3-\delta}$ (wherein $0\leq\delta\leq1.0$), $Li_{0.40}La_{0.53}BiO_{3-\delta}$ (wherein $0\leq\delta\leq1.0$), $Li_{0.45}La_{0.52}TiO_{3-\delta}$ (wherein $0\leq\delta\leq1.0$), $Li_{0.45}La_{0.52}MnO_{3-\delta}$ (wherein $0\leq\delta\leq1.0$), $Li_{0.45}La_{0.52}NiO_{3-\delta}$ (wherein $0\leq\delta\leq1.0$), $Li_{0.45}La_{0.52}CrO_{3-\delta}$ (wherein $0\leq\delta\leq1.0$), $Li_{0.45}La_{0.52}CoO_{3-\delta}$ (wherein $0\leq\delta\leq1.0$), $Li_{0.45}La_{0.52}IrO_{3-\delta}$ (wherein $0\leq\delta\leq1.0$), $Li_{0.45}La_{0.52}RuO_{3-\delta}$ (wherein $0\leq\delta\leq1.0$), $Li_{0.45}La_{0.52}TiO_{3-\delta}$ (wherein $0\leq\delta\leq1.0$), $Li_{0.45}La_{0.52}FeO_{3-\delta}$ (wherein $0\leq\delta\leq1.0$), $Li_{0.45}La_{0.52}PdO_{3-\delta}$ (wherein $0\leq\delta\leq1.0$), $Li_{0.45}La_{0.52}PbO_{3-\delta}$ (wherein $0\leq\delta\leq1.0$), $Li_{0.45}La_{0.52}RhO_{3-\delta}$ (wherein $0\leq\delta\leq1.0$), $Li_{0.45}La_{0.52}SnO_{3-\delta}$ (wherein $0\leq\delta\leq1.0$), $Li_{0.45}La_{0.52}VO_{3-\delta}$ (wherein $0\leq\delta\leq1.0$), $Li_{0.45}La_{0.52}ReO_{3-\delta}$ (wherein $0\leq\delta\leq1.0$), $Li_{0.45}La_{0.52}GeO_{3-\delta}$ (wherein $0\leq\delta\leq1.0$), $Li_{0.45}La_{0.52}WO_{3-\delta}$ (wherein $0\leq\delta\leq1.0$), $Li_{0.45}La_{0.52}ZrO_{3-\delta}$ (wherein $0\leq\delta\leq1.0$), $Li_{0.45}La_{0.52}MoO_{3-\delta}$ (wherein $0\leq\delta\leq1.0$), $Li_{0.45}La_{0.52}NbO_{3-\delta}$ (wherein $0\leq\delta\leq1.0$), $Li_{0.45}La_{0.52}TaO_{3-\delta}$ (wherein $0\leq\delta\leq1.0$), $Li_{0.45}La_{0.52}HfO_{3-\delta}$ (wherein $0\leq\delta\leq1.0$), $Li_{0.45}La_{0.52}BiO_{3-\delta}$ (wherein $0\leq\delta\leq1.0$), $Li_{0.34}Ce_{0.55}TiO_{3-\delta}$ (wherein $0\leq\delta\leq1.0$), $Li_{0.34}Ce_{0.55}MnO_{3-\delta}$ (wherein $0\leq\delta\leq1.0$), $Li_{0.34}Ce_{0.55}NiO_{3-\delta}$ (wherein $0\leq\delta\leq1.0$), $Li_{0.34}Ce_{0.55}CrO_{3-\delta}$ (wherein $0\leq\delta\leq1.0$), $Li_{0.34}Ce_{0.55}CoO_{3-\delta}$ (wherein $0\leq\delta\leq1.0$), $Li_{0.34}Ce_{0.55}IrO_{3-\delta}$ (wherein $0\leq\delta\leq1.0$), $Li_{0.34}Ce_{0.55}RuO_{3-\delta}$ (wherein $0\leq\delta\leq1.0$), $Li_{0.34}Ce_{0.55}TiO_{3-\delta}$ (wherein $0\leq\delta\leq1.0$), $Li_{0.34}Ce_{0.55}FeO_{3-\delta}$ (wherein $0\leq\delta\leq1.0$), $Li_{0.34}Ce_{0.55}PdO_{3-\delta}$ (wherein $0\leq\delta\leq1.0$), $Li_{0.34}Ce_{0.55}PbO_{3-\delta}$ (wherein $0\leq\delta\leq1.0$), $Li_{0.34}Ce_{0.55}RhO_{3-\delta}$ (wherein $0\leq\delta\leq1.0$), $Li_{0.34}Ce_{0.55}SnO_{3-\delta}$ (wherein $0\leq\delta\leq1.0$), $Li_{0.34}Ce_{0.55}VO_{3-\delta}$ (wherein $0\leq\delta\leq1.0$), $Li_{0.34}Ce_{0.55}ReO_{3-\delta}$ (wherein $0\leq\delta\leq1.0$), $Li_{0.34}Ce_{0.55}GeO_{3-\delta}$ (wherein $0\leq\delta\leq1.0$), $Li_{0.34}Ce_{0.55}WO_{3-\delta}$ (wherein $0\leq\delta\leq1.0$), $Li_{0.34}Ce_{0.55}ZrO_{3-\delta}$ (wherein $0\leq\delta\leq1.0$), $Li_{0.34}Ce_{0.55}MoO_{3-\delta}$ (wherein $0\leq\delta\leq1.0$), $Li_{0.34}Ce_{0.55}NbO_{3-\delta}$ (wherein $0\leq\delta\leq1.0$), $Li_{0.34}Ce_{0.55}TaO_{3-\delta}$ (wherein $0\leq\delta\leq1.0$), $Li_{0.34}Ce_{0.55}HfO_{3-\delta}$ (wherein $0\leq\delta\leq1.0$), $Li_{0.34}Ce_{0.55}BiO_{3-\delta}$ (wherein $0\leq\delta\leq1.0$), $Li_{0.10}Ce_{0.63}TiO_{3-\delta}$ (wherein $0\leq\delta\leq1.0$), $Li_{0.10}Ce_{0.63}MnO_{3-\delta}$ (wherein $0\leq\delta\leq1.0$), $Li_{0.10}Ce_{0.63}NiO_{3-\delta}$ (wherein $0\leq\delta\leq1.0$), $Li_{0.10}Ce_{0.63}CrO_{3-\delta}$ (wherein $0\leq\delta\leq1.0$), $Li_{0.10}Ce_{0.63}CoO_{3-\delta}$ (wherein $0\leq\delta\leq1.0$), $Li_{0.10}Ce_{0.63}IrO_{3-\delta}$ (wherein $0\leq\delta\leq1.0)_3$, $Li_{0.10}Ce_{0.63}RuO_{3-\delta}$ (wherein $0\leq\delta\leq1.0$), $Li_{0.10}Ce_{0.63}TiO_{3-\delta}$ (wherein $0\leq\delta\leq1.0$), $Li_{0.10}Ce_{0.63}FeO_{3-\delta}$ (wherein $0\leq\delta\leq1.0$), $Li_{0.10}Ce_{0.63}PdO_{3-\delta}$ (wherein $0\leq\delta\leq1.0$), $Li_{0.10}Ce_{0.63}PbO_{3-\delta}$ (wherein $0\leq\delta\leq1.0$), $Li_{0.10}Ce_{0.63}RhO_{3-\delta}$ (wherein $0\leq\delta\leq1.0$), $Li_{0.10}Ce_{0.63}SnO_{3-\delta}$ (wherein $0\leq\delta\leq1.0$), $Li_{0.10}Ce_{0.63}VO_{3-\delta}$ (wherein $0\leq\delta\leq1.0$), $Li_{0.10}Ce_{0.63}ReO_{3-\delta}$ (wherein $0\leq\delta\leq1.0$), $Li_{0.10}Ce_{0.63}GeO_{3-\delta}$ (wherein $0\leq\delta\leq1.0$), $Li_{0.10}Ce_{0.63}WO_{3-\delta}$ (wherein $0\leq\delta\leq1.0$), $Li_{0.10}Ce_{0.63}ZrO_{3-\delta}$ (wherein $0\leq\delta\leq1.0$), $Li_{0.10}Ce_{0.63}MoO_{3-\delta}$ (wherein $0\leq\delta\leq1.0$), $Li_{0.10}Ce_{0.63}NbO_{3-\delta}$ (wherein $0\leq\delta\leq1.0$), $Li_{0.10}Ce_{0.63}TaO_{3-\delta}$ (wherein $0\leq\delta\leq1.0$), $Li_{0.10}Ce_{0.63}HfO_{3-\delta}$ (wherein $0\leq\delta\leq1.0$), $Li_{0.10}Ce_{0.63}BiO_{3-\delta}$ (wherein $0\leq\delta\leq1.0$), $Li_{0.20}Ce_{0.60}TiO_{3-\delta}$ (wherein $0\leq\delta\leq1.0$), $Li_{0.20}Ce_{0.60}MnO_{3-\delta}$ (wherein $0\leq\delta\leq1.0$), $Li_{0.20}Ce_{0.60}NiO_{3-\delta}$ (wherein $0\leq\delta\leq1.0$), $Li_{0.20}Ce_{0.60}CrO_{3-\delta}$ (wherein $0\leq\delta\leq1.0$), $Li_{0.20}Ce_{0.60}CoO_{3-\delta}$ (wherein $0\leq\delta\leq1.0$), $Li_{0.20}Ce_{0.60}IrO_{3-\delta}$ (wherein $0\leq\delta\leq1.0$), $Li_{0.20}Ce_{0.60}RuO_{3-\delta}$ (wherein $0\leq\delta\leq1.0$), $Li_{0.20}Ce_{0.60}TiO_{3-\delta}$ (wherein $0\leq\delta\leq1.0$), $Li_{0.20}Ce_{0.60}FeO_{3-\delta}$ (wherein $0\leq\delta\leq1.0$), $Li_{0.20}Ce_{0.60}PdO_{3-\delta}$ (wherein $0\leq\delta\leq1.0$), $Li_{0.20}Ce_{0.60}PbO_{3-\delta}$ (wherein $0\leq\delta\leq1.0$), $Li_{0.20}Ce_{0.60}RhO_{3-\delta}$ (wherein $0\leq\delta\leq1.0$), $Li_{0.20}Ce_{0.60}SnO_{3-\delta}$ (wherein $0\leq\delta\leq1.0$), $Li_{0.20}Ce_{0.60}VO_{3-\delta}$ (wherein $0\leq\delta\leq1.0$), $Li_{0.20}Ce_{0.60}ReO_{3-\delta}$ (wherein $0\leq\delta\leq1.0$), $Li_{0.20}Ce_{0.60}GeO_{3-\delta}$ (wherein $0\leq\delta\leq1.0$), $Li_{0.20}Ce_{0.60}WO_{3-\delta}$ (wherein $0\leq\delta\leq1.0$), $Li_{0.20}Ce_{0.60}ZrO_{3-\delta}$ (wherein $0\leq\delta\leq1.0$), $Li_{0.20}Ce_{0.60}MoO_{3-\delta}$ (wherein $0\leq\delta\leq1.0$), $Li_{0.20}Ce_{0.60}NbO_{3-\delta}$ (wherein $0\leq\delta\leq1.0$), $Li_{0.20}Ce_{0.60}TaO_{3-\delta}$ (wherein $0\leq\delta\leq1.0$), $Li_{0.20}Ce_{0.60}HfO_{3-\delta}$ (wherein $0\leq\delta\leq1.0$), $Li_{0.20}Ce_{0.60}BiO_{3-\delta}$ (wherein $0\leq\delta\leq1.0$), $Li_{0.30}Ce_{0.57}TiO_{3-\delta}$ (wherein $0\leq\delta\leq1.0$), $Li_{0.30}Ce_{0.57}MnO_{3-\delta}$ (wherein $0\leq\delta\leq1.0$), $Li_{0.30}Ce_{0.57}NiO_{3-\delta}$ (wherein $0\leq\delta\leq1.0$), $Li_{0.30}Ce_{0.57}CrO_{3-\delta}$ (wherein $0\leq\delta\leq1.0$), $Li_{0.30}Ce_{0.57}CoO_{3-\delta}$ (wherein $0\leq\delta\leq1.0$), $Li_{0.30}Ce_{0.57}IrO_{3-\delta}$ (wherein $0\leq\delta\leq1.0$), $Li_{0.30}Ce_{0.57}RuO_{3-\delta}$ (wherein $0\leq\delta\leq1.0$), $Li_{0.30}Ce_{0.57}TiO_{3-\delta}$ (wherein $0\leq\delta\leq1.0$), $Li_{0.30}Ce_{0.57}FeO_{3-\delta}$ (wherein $0\leq\delta\leq1.0$), $Li_{0.30}Ce_{0.57}PdO_{3-\delta}$ (wherein $0\leq\delta\leq1.0$), $Li_{0.30}Ce_{0.57}PbO_{3-\delta}$ (wherein $0\leq\delta\leq1.0$), $Li_{0.30}Ce_{0.57}RhO_{3-\delta}$ (wherein $0\leq\delta\leq1.0$), $Li_{0.30}Ce_{0.57}SnO_{3-\delta}$ (wherein $0\leq\delta\leq1.0$), $Li_{0.30}Ce_{0.57}VO_{3-\delta}$ (wherein $0\leq\delta\leq1.0$), $Li_{0.30}Ce_{0.57}ReO_{3-\delta}$ (wherein $0\leq\delta\leq1.0$), $Li_{0.30}Ce_{0.57}GeO_{3-\delta}$ (wherein $0\leq\delta\leq1.0$), $Li_{0.30}Ce_{0.57}WO_{3-\delta}$ (wherein $0\leq\delta\leq1.0$), $Li_{0.30}Ce_{0.57}ZrO_{3-\delta}$ (wherein $0\leq\delta\leq1.0$), $Li_{0.30}Ce_{0.57}MoO_{3-\delta}$ (wherein $0\leq\delta\leq1.0$), $Li_{0.30}Ce_{0.57}NbO_{3-\delta}$ (wherein $0\leq\delta\leq1.0$), $Li_{0.30}Ce_{0.57}TaO_{3-\delta}$ (wherein $0\leq\delta\leq1.0$), $Li_{0.30}Ce_{0.57}HfO_{3-\delta}$ (wherein $0\leq\delta\leq1.0$), $Li_{0.30}Ce_{0.57}BiO_{3-\delta}$ (wherein $0\leq\delta\leq1.0$), $Li_{0.40}Ce_{0.53}TiO_{3-\delta}$ (wherein $0\leq\delta\leq1.0$), $Li_{0.40}Ce_{0.53}MnO_{3-\delta}$ (wherein $0\leq\delta\leq1.0$), $Li_{0.40}Ce_{0.53}NiO_{3-\delta}$ (wherein $0\leq\delta\leq1.0$), $Li_{0.40}Ce_{0.53}CrO_{3-\delta}$ (wherein $0\leq\delta\leq1.0$), $Li_{0.40}Ce_{0.53}CoO_{3-\delta}$ (wherein $0\leq\delta\leq1.0$), $Li_{0.40}Ce_{0.53}IrO_{3-\delta}$ (wherein $0\leq\delta\leq1.0$), $Li_{0.40}Ce_{0.53}RuO_{3-\delta}$ (wherein $0\leq\delta\leq1.0$), $Li_{0.40}Ce_{0.53}TiO_{3-\delta}$ (wherein $0\leq\delta\leq1.0$), $Li_{0.40}Ce_{0.53}FeO_{3-\delta}$ (wherein $0\leq\delta\leq1.0$), $Li_{0.40}Ce_{0.53}PdO_{3-\delta}$ (wherein $0\leq\delta\leq1.0$), $Li_{0.40}Ce_{0.53}PbO_{3-\delta}$ (wherein $0\leq\delta\leq1.0$), $Li_{0.40}Ce_{0.53}RhO_{3-\delta}$ (wherein $0\leq\delta\leq1.0$), $Li_{0.40}Ce_{0.53}SnO_{3-\delta}$ (wherein $0\leq\delta\leq1.0$), $Li_{0.40}Ce_{0.53}VO_{3-\delta}$ (wherein $0\leq\delta\leq1.0$), $Li_{0.40}Ce_{0.53}ReO_{3-\delta}$ (wherein $0\leq\delta\leq1.0$), $Li_{0.40}Ce_{0.53}GeO_{3-\delta}$ (wherein $0\leq\delta\leq1.0$), $Li_{0.40}Ce_{0.53}WO_{3-\delta}$ (wherein $0\leq\delta\leq1.0$), $Li_{0.40}Ce_{0.53}ZrO_{3-\delta}$ (wherein $0\leq\delta\leq1.0$), $Li_{0.40}Ce_{0.53}MoO_{3-\delta}$ (wherein $0\leq\delta\leq1.0$), $Li_{0.40}Ce_{0.53}NbO_{3-\delta}$ (wherein $0\leq\delta\leq1.0$), $Li_{0.40}Ce_{0.53}TaO_{3-\delta}$ (wherein $0\leq\delta\leq1.0$), $Li_{0.40}Ce_{0.53}HfO_{3-\delta}$ (wherein $0\leq\delta\leq1.0$), $Li_{0.40}Ce_{0.53}BiO_{3-\delta}$ (wherein $0\leq\delta\leq1.0$), $Li_{0.45}Ce_{0.52}TiO_{3-\delta}$ (wherein $0\leq\delta\leq1.0$), $Li_{0.45}Ce_{0.52}MnO_{3-\delta}$ (wherein $0\leq\delta\leq1.0$), $Li_{0.45}Ce_{0.52}NiO_{3-\delta}$ (wherein $0\leq\delta\leq1.0$), $Li_{0.45}Ce_{0.52}CrO_{3-\delta}$ (wherein $0\leq\delta\leq1.0$), $Li_{0.45}Ce_{0.52}CoO_{3-\delta}$ (wherein $0\leq\delta\leq1.0$), $Li_{0.45}Ce_{0.52}IrO_{3-\delta}$ (wherein $0\leq\delta\leq1.0$), $Li_{0.45}Ce_{0.52}RuO_{3-\delta}$ (wherein $0\leq\delta\leq1.0$), $Li_{0.45}Ce_{0.52}TiO_{3-\delta}$ (wherein $0\leq\delta\leq1.0$), $Li_{0.45}Ce_{0.52}FeO_{3-\delta}$ (wherein $0\leq\delta\leq1.0$), $Li_{0.45}Ce_{0.52}PdO_{3-\delta}$ (wherein $0\leq\delta\leq1.0$), $Li_{0.45}Ce_{0.52}PbO_{3-\delta}$ (wherein $0\leq\delta\leq1.0$), $Li_{0.45}Ce_{0.52}RhO_{3-\delta}$ (wherein $0\leq\delta\leq1.0$), $Li_{0.45}Ce_{0.52}SnO_{3-\delta}$ (wherein $0\leq\delta\leq1.0$), $Li_{0.45}Ce_{0.52}VO_{3-\delta}$ (wherein $0\leq\delta\leq1.0$), $Li_{0.45}Ce_{0.52}ReO_{3-\delta}$ (wherein $0\leq\delta\leq1.0$), $Li_{0.45}Ce_{0.52}GeO_{3-\delta}$ (wherein $0\leq\delta\leq1.0$), $Li_{0.45}Ce_{0.52}WO_{3-\delta}$ (wherein $0\leq\delta\leq1.0$), $Li_{0.45}Ce_{0.52}ZrO_{3-\delta}$ (wherein $0\leq\delta\leq1.0$), $Li_{0.45}Ce_{0.52}MoO_{3-\delta}$ (wherein $0\leq\delta\leq1.0$), $Li_{0.45}Ce_{0.52}NbO_{3-\delta}$ (wherein $0\leq\delta\leq1.0$), $Li_{0.45}Ce_{0.52}TaO_{3-\delta}$ (wherein $0\leq\delta\leq1.0$), $Li_{0.45}Ce_{0.52}HfO_{3-\delta}$ (wherein $0\leq\delta\leq1.0$), $Li_{0.45}Ce_{0.52}BiO_{3-\delta}$ (wherein $0\leq\delta\leq1.0$), $Li_{0.34}Pr_{0.55}TiO_{3-\delta}$ (wherein $0\leq\delta\leq1.0$), $Li_{0.34}Pr_{0.55}MnO_{3-\delta}$ (wherein $0\leq\delta\leq1.0$), $Li_{0.34}Pr_{0.55}NiO_{3-\delta}$ (wherein $0\leq\delta\leq1.0$), $Li_{0.34}Pr_{0.55}CrO_{3-\delta}$ (wherein $0\leq\delta\leq1.0$), $Li_{0.34}Pr_{0.55}CoO_{3-\delta}$ (wherein $0\leq\delta\leq1.0$), $Li_{0.34}Pr_{0.55}IrO_{3-\delta}$ (wherein $0\leq\delta\leq1.0$), $Li_{0.34}Pr_{0.55}RuO_{3-\delta}$ (wherein $0\leq\delta\leq1.0$), $Li_{0.34}Pr_{0.55}TiO_{3-\delta}$ (wherein $0\leq\delta\leq1.0$), $Li_{0.34}Pr_{0.55}FeO_{3-\delta}$ (wherein $0\leq\delta\leq1.0$), $Li_{0.34}Pr_{0.55}PdO_{3-\delta}$ (wherein $0\leq\delta\leq1.0$), $Li_{0.34}Pr_{0.55}PbO_{3-\delta}$ (wherein $0\leq\delta\leq1.0$), $Li_{0.34}Pr_{0.55}RhO_{3-\delta}$ (wherein $0\leq\delta\leq1.0$), $Li_{0.34}Pr_{0.55}SnO_{3-\delta}$ (wherein $0\leq\delta\leq1.0$), $Li_{0.34}Pr_{0.55}VO_{3-\delta}$ (wherein $0\leq\delta\leq1.0$), $Li_{0.34}Pr_{0.55}ReO_{3-\delta}$ (wherein $0\leq\delta\leq1.0$), $Li_{0.34}Pr_{0.55}GeO_{3-\delta}$ (wherein $0\leq\delta\leq1.0$), $Li_{0.34}Pr_{0.55}WO_{3-\delta}$ (wherein $0\leq\delta\leq1.0$), $Li_{0.34}Pr_{0.55}ZrO_{3-\delta}$ (wherein $0\leq\delta\leq1.0$), $Li_{0.34}Pr_{0.55}MoO_{3-\delta}$ (wherein $0\leq\delta\leq1.0$), $Li_{0.34}Pr_{0.55}NbO_{3-\delta}$ (wherein $0\leq\delta\leq1.0$), $Li_{0.34}Pr_{0.55}TaO_{3-\delta}$ (wherein $0\leq\delta\leq1.0$), $Li_{0.34}Pr_{0.55}HfO_{3-\delta}$ (wherein $0\leq\delta\leq1.0$), $Li_{0.34}Pr_{0.55}BiO_{3-\delta}$ (wherein $0\leq\delta\leq1.0$), $Li_{0.10}Pr_{0.63}TiO_{3-\delta}$ (wherein $0\leq\delta\leq1.0$), $Li_{0.10}Pr_{0.63}MnO_{3-\delta}$ (wherein $0\leq\delta\leq1.0$), $Li_{0.10}Pr_{0.63}NiO_{3-\delta}$ (wherein $0\leq\delta\leq1.0$), $Li_{0.10}Pr_{0.63}CrO_{3-\delta}$ (wherein $0\leq\delta\leq1.0$), $Li_{0.10}Pr_{0.63}CoO_{3-\delta}$ (wherein $0\leq\delta\leq1.0$), $Li_{0.10}Pr_{0.63}IrO_{3-\delta}$ (wherein $0\leq\delta\leq1.0$), $Li_{0.10}Pr_{0.63}RuO_{3-\delta}$ (wherein $0\leq\delta\leq1.0$), $Li_{0.10}Pr_{0.63}TiO_{3-\delta}$ (wherein $0\leq\delta\leq1.0$), $Li_{0.10}Pr_{0.63}FeO_{3-\delta}$ (wherein $0\leq\delta\leq1.0$), $Li_{0.10}Pr_{0.63}PdO_{3-\delta}$ (wherein $0\leq\delta\leq1.0$), $Li_{0.10}Pr_{0.63}PbO_{3-\delta}$ (wherein $0\leq\delta\leq1.0$), $Li_{0.10}Pr_{0.63}RhO_{3-\delta}$ (wherein $0\leq\delta\leq1.0$), $Li_{0.10}Pr_{0.63}SnO_{3-\delta}$ (wherein $0\leq\delta\leq1.0$), $Li_{0.10}Pr_{0.63}VO_{3-\delta}$ (wherein $0\leq\delta\leq1.0$), $Li_{0.10}Pr_{0.63}ReO_{3-\delta}$ (wherein $0\leq\delta\leq1.0$), $Li_{0.10}Pr_{0.63}GeO_{3-\delta}$ (wherein $0\leq\delta\leq1.0$), $Li_{0.10}Pr_{0.63}WO_{3-\delta}$ (wherein $0\leq\delta\leq1.0$), $Li_{0.10}Pr_{0.63}ZrO_{3-\delta}$ (wherein $0\leq\delta\leq1.0$), $Li_{0.10}Pr_{0.63}MoO_{3-\delta}$ (wherein $0\leq\delta\leq1.0$), $Li_{0.10}Pr_{0.63}NbO_{3-\delta}$ (wherein $0\leq\delta\leq1.0$), $Li_{0.10}Pr_{0.63}TaO_{3-\delta}$ (wherein $0\leq\delta\leq1.0$), $Li_{0.10}Pr_{0.63}HfO_{3-\delta}$ (wherein $0\leq\delta\leq1.0$), $Li_{0.10}Pr_{0.63}BiO_{3-\delta}$ (wherein $0\leq\delta\leq1.0$), $Li_{0.20}Pr_{0.60}TiO_{3-\delta}$ (wherein $0\leq\delta\leq1.0$), $Li_{0.20}Pr_{0.60}MnO_{3-\delta}$ (wherein $0\leq\delta\leq1.0$), $Li_{0.20}Pr_{0.60}NiO_{3-\delta}$ (wherein $0\leq\delta\leq1.0$), $Li_{0.20}Pr_{0.60}CrO_{3-\delta}$ (wherein $0\leq\delta\leq1.0$), $Li_{0.20}Pr_{0.60}CoO_{3-\delta}$ (wherein $0\leq\delta\leq1.0$), $Li_{0.20}Pr_{0.60}IrO_{3-\delta}$ (wherein $0\leq\delta\leq1.0$), $Li_{0.20}Pr_{0.60}RuO_{3-\delta}$ (wherein $0\leq\delta\leq1.0$), $Li_{0.20}Pr_{0.60}TiO_{3-\delta}$ (wherein $0\leq\delta\leq1.0$), $Li_{0.20}Pr_{0.60}FeO_{3-\delta}$ (wherein $0\leq\delta\leq1.0$), $Li_{0.20}Pr_{0.60}PdO_{3-\delta}$ (wherein $0\leq\delta\leq1.0$), $Li_{0.20}Pr_{0.60}PbO_{3-\delta}$ (wherein $0\leq\delta\leq1.0$), $Li_{0.20}Pr_{0.60}RhO_{3-\delta}$ (wherein $0\leq\delta\leq1.0$), $Li_{0.20}Pr_{0.60}SnO_{3-\delta}$ (wherein $0\leq\delta\leq1.0$), $Li_{0.20}Pr_{0.60}VO_{3-\delta}$ (wherein $0\leq\delta\leq1.0$), $Li_{0.20}Pr_{0.60}ReO_{3-\delta}$ (wherein $0\leq\delta\leq1.0$), $Li_{0.20}Pr_{0.60}GeO_{3-\delta}$ (wherein $0\leq\delta\leq1.0$), $Li_{0.20}Pr_{0.60}WO_{3-\delta}$ (wherein $0\leq\delta\leq1.0$), $Li_{0.20}Pr_{0.60}ZrO_{3-\delta}$ (wherein $0\leq\delta\leq1.0$), $Li_{0.20}Pr_{0.60}MoO_{3-\delta}$ (wherein $0\leq\delta\leq1.0$), $Li_{0.20}Pr_{0.60}NbO_{3-\delta}$ (wherein $0\leq\delta\leq1.0$), $Li_{0.20}Pr_{0.60}TaO_{3-\delta}$ (wherein $0\leq\delta\leq1.0$), $Li_{0.20}Pr_{0.60}HfO_{3-\delta}$ (wherein $0\leq\delta\leq1.0$), $Li_{0.20}Pr_{0.60}BiO_{3-\delta}$ (wherein $0\leq\delta\leq1.0$), $Li_{0.30}Pr_{0.57}TiO_{3-\delta}$ (wherein $0\leq\delta\leq1.0$), $Li_{0.30}Pr_{0.57}MnO_{3-\delta}$ (wherein $0\leq\delta\leq1.0$), $Li_{0.30}Pr_{0.57}NiO_{3-\delta}$ (wherein $0\leq\delta\leq1.0$), $Li_{0.30}Pr_{0.57}CrO_{3-\delta}$ (wherein $0\leq\delta\leq1.0$), $Li_{0.30}Pr_{0.57}CoO_{-\delta}$ (wherein $0\leq\delta\leq1.0$)$_3$, $Li_{0.30}Pr_{0.57}IrO_{3-\delta}$ (wherein $0\leq\delta\leq1.0$), $Li_{0.30}Pr_{0.57}RuO_{3-\delta}$ (wherein $0\leq\delta\leq1.0$), $Li_{0.30}Pr_{0.57}TiO_{3-\delta}$ (wherein $0\leq\delta\leq1.0$), $Li_{0.30}Pr_{0.57}FeO_{3-\delta}$ (wherein $0\leq\delta\leq1.0$), $Li_{0.30}Pr_{0.57}PdO_{3-\delta}$ (wherein $0\leq\delta\leq1.0$), $Li_{0.30}Pr_{0.57}PbO_{3-\delta}$ (wherein $0\leq\delta\leq1.0$), $Li_{0.30}Pr_{0.57}RhO_{3-\delta}$ (wherein $0\leq\delta\leq1.0$), $Li_{0.30}Pr_{0.57}SnO_{3-\delta}$ (wherein $0\leq\delta\leq1.0$), $Li_{0.30}Pr_{0.57}VO_{3-\delta}$ (wherein $0\leq\delta\leq1.0$), $Li_{0.30}Pr_{0.57}ReO_{3-\delta}$ (wherein $0\leq\delta\leq1.0$), $Li_{0.30}Pr_{0.57}GeO_{3-\delta}$ (wherein $0\leq\delta\leq1.0$), $Li_{0.30}Pr_{0.57}WO_{3-\delta}$ (wherein $0\leq\delta\leq1.0$), $Li_{0.30}Pr_{0.57}ZrO_{3-\delta}$ (wherein $0\leq\delta\leq1.0$), $Li_{0.30}Pr_{0.57}MoO_{3-\delta}$ (wherein $0\leq\delta\leq1.0$), $Li_{0.30}Pr_{0.57}NbO_{3-\delta}$ (wherein $0\leq\delta\leq1.0$), $Li_{0.30}Pr_{0.57}TaO_{3-\delta}$ (wherein $0\leq\delta\leq1.0$), $Li_{0.30}Pr_{0.57}HfO_{3-\delta}$ (wherein $0\leq\delta\leq1.0$), $Li_{0.30}Pr_{0.57}BiO_{3-\delta}$ (wherein $0\leq\delta\leq1.0$), $Li_{0.40}Pr_{0.53}TiO_{3-\delta}$ (wherein $0\leq\delta\leq1.0$), $Li_{0.40}Pr_{0.53}MnO_{3-\delta}$ (wherein $0\leq\delta\leq1.0$), $Li_{0.40}Pr_{0.53}NiO_{3-\delta}$ (wherein $0\leq\delta\leq1.0$), $Li_{0.40}Pr_{0.53}CrO_{3-\delta}$ (wherein $0\leq\delta\leq1.0$), $Li_{0.40}Pr_{0.53}CoO_{3-\delta}$ (wherein $0\leq\delta\leq1.0$), $Li_{0.40}Pr_{0.53}IrO_{3-\delta}$ (wherein $0\leq\delta\leq1.0$), $Li_{0.40}Pr_{0.53}RuO_{3-\delta}$ (wherein $0\leq\delta\leq1.0$), $Li_{0.40}Pr_{0.53}TiO_{3-\delta}$ (wherein $0\leq\delta\leq1.0$), $Li_{0.40}Pr_{0.53}FeO_{3-\delta}$ (wherein $0\leq\delta\leq1.0$), $Li_{0.40}Pr_{0.53}PdO_{3-\delta}$ (wherein $0\leq\delta\leq1.0$), $Li_{0.40}Pr_{0.53}PbO_{3-\delta}$ (wherein $0\leq\delta\leq1.0$), $Li_{0.40}Pr_{0.53}RhO_{3-\delta}$ (wherein $0\leq\delta\leq1.0$), $Li_{0.40}Pr_{0.53}SnO_{3-\delta}$ (wherein $0\leq\delta\leq1.0$), $Li_{0.40}Pr_{0.53}VO_{3-\delta}$ (wherein $0\leq\delta\leq1.0$), $Li_{0.40}Pr_{0.53}ReO_{3-\delta}$ (wherein $0\leq\delta\leq1.0$), $Li_{0.40}Pr_{0.53}GeO_{3-\delta}$ (wherein $0\leq\delta\leq1.0$), $Li_{0.40}Pr_{0.53}WO_{3-\delta}$ (wherein $0\leq\delta\leq1.0$), $Li_{0.40}Pr_{0.53}ZrO_{3-\delta}$ (wherein $0\leq\delta\leq1.0$), $Li_{0.40}Pr_{0.53}MoO_{3-\delta}$ (wherein $0\leq\delta\leq1.0$), $Li_{0.40}Pr_{0.53}NbO_{3-\delta}$ (wherein $0\leq\delta\leq1.0$), $Li_{0.40}Pr_{0.53}TaO_{3-\delta}$ (wherein $0\leq\delta\leq1.0$), $Li_{0.40}Pr_{0.53}HfO_{3-\delta}$ (wherein $0\leq\delta\leq1.0$), $Li_{0.40}Pr_{0.53}BiO_{3-\delta}$ (wherein $0\leq\delta\leq1.0$),
$Li_{0.45}Pr_{0.52}TiO_{3-\delta}$ (wherein $0\leq\delta\leq1.0$), $Li_{0.45}Pr_{0.52}MnO_{3-\delta}$ (wherein $0\leq\delta\leq1.0$), $Li_{0.45}Pr_{0.52}NiO_{3-\delta}$ (wherein $0\leq\delta\leq1.0$), $Li_{0.45}Pr_{0.52}CrO_{3-\delta}$ (wherein $0\leq\delta\leq1.0$), $Li_{0.45}Pr_{0.52}CoO_{3-\delta}$ (wherein $0\leq\delta\leq1.0$), $Li_{0.45}Pr_{0.52}IrO_{3-\delta}$ (wherein $0\leq\delta\leq1.0$), $Li_{0.45}Pr_{0.52}RuO_{3-\delta}$ (wherein $0\leq\delta\leq1.0$), $Li_{0.45}Pr_{0.52}TiO_{3-\delta}$ (wherein $0\leq\delta\leq1.0$), $Li_{0.45}Pr_{0.52}FeO_{3-\delta}$ (wherein $0\leq\delta\leq1.0$), $Li_{0.45}Pr_{0.52}PdO_{3-\delta}$ (wherein $0\leq\delta\leq1.0$), $Li_{0.45}Pr_{0.52}PbO_{3-\delta}$ (wherein $0\leq\delta\leq1.0$), $Li_{0.45}Pr_{0.52}RhO_{3-\delta}$ (wherein $0\leq\delta\leq1.0$), $Li_{0.45}Pr_{0.52}SnO_{3-\delta}$ (wherein $0\leq\delta\leq1.0$), $Li_{0.45}Pr_{0.5}2VO_{3-\delta}$ (wherein $0\leq\delta\leq1.0$), $Li_{0.45}Pr_{0.52}ReO_{3-\delta}$ (wherein $0\leq\delta\leq1.0$), $Li_{0.45}Pr_{0.52}GeO_{3-\delta}$ (wherein $0\leq\delta\leq1.0$), $Li_{0.45}Pr_{0.52}WO_{3-\delta}$ (wherein $0\leq\delta\leq1.0$), $Li_{0.45}Pr_{0.52}ZrO_{3-\delta}$ (wherein $0\leq\delta\leq1.0$), $Li_{0.45}Pr_{0.52}MoO_{3-\delta}$ (wherein $0\leq\delta\leq1.0$), $Li_{0.45}Pr_{0.52}NbO_{3-\delta}$ (wherein $0\leq\delta\leq1.0$), $Li_{0.45}Pr_{0.52}TaO_{3-\delta}$ (wherein $0\leq\delta\leq1.0$), $Li_{0.45}Pr_{0.52}HfO_{3-\delta}$ (wherein $0\leq\delta\leq1.0$), $Li_{0.45}Pr_{0.52}BiO_{3-\delta}$ (wherein $0\leq\delta\leq1.0$),
$Li_{0.10}Ca_{0.80}TiO_{3-\delta}$ (wherein $0\leq\delta\leq1.0$), $Li_{0.10}Ca_{0.80}MnO_{3-\delta}$ (wherein $0\leq\delta\leq1.0$), $Li_{0.10}Ca_{0.80}NiO_{3-\delta}$ (wherein $0\leq\delta\leq1.0$), $Li_{0.10}Ca_{0.80}CrO_{3-\delta}$ (wherein $0\leq\delta\leq1.0$), $Li_{0.10}Ca_{0.80}CoO_{3-\delta}$ (wherein $0\leq\delta\leq1.0$), $Li_{0.10}Ca_{0.80}IrO_{3-\delta}$ (wherein $0\leq\delta\leq1.0$), $Li_{0.10}Ca_{0.80}RuO_{3-\delta}$ (wherein $0\leq\delta\leq1.0$), $Li_{0.10}Ca_{0.80}TiO_{3-\delta}$ (wherein $0\leq\delta\leq1.0$), $Li_{0.10}Ca_{0.80}FeO_{3-\delta}$ (wherein $0\leq\delta\leq1.0$), $Li_{0.10}Ca_{0.80}PdO_{3-\delta}$ (wherein $0\leq\delta\leq1.0$), $Li_{0.10}Ca_{0.80}PbO_{3-\delta}$ (wherein $0\leq\delta\leq1.0$), $Li_{0.10}Ca_{0.80}RhO_{3-\delta}$ (wherein $0\leq\delta\leq1.0$), $Li_{0.10}Ca_{0.80}SnO_{3-\delta}$ (wherein $0\leq\delta\leq1.0$), $Li_{0.10}Ca_{0.80}VO_{3-\delta}$ (wherein $0\leq\delta\leq1.0$), $Li_{0.10}Ca_{0.80}ReO_{3-\delta}$ (wherein $0\leq\delta\leq1.0$), $Li_{0.10}Ca_{0.80}GeO_{3-\delta}$ (wherein $0\leq\delta\leq1.0$), $Li_{0.10}Ca_{0.80}WO_{3-\delta}$ (wherein $0\leq\delta\leq1.0$), $Li_{0.10}Ca_{0.80}ZrO_{3-\delta}$ (wherein $0\leq\delta\leq1.0$), $Li_{0.10}Ca_{0.80}MoO_{3-\delta}$ (wherein $0\leq\delta\leq1.0$), $Li_{0.10}Ca_{0.80}NbO_{3-\delta}$ (wherein $0\leq\delta\leq1.0$), $Li_{0.10}Ca_{0.80}TaO_{3-\delta}$ (wherein $0\leq\delta\leq1.0$), $Li_{0.10}Ca_{0.80}HfO_{3-\delta}$ (wherein $0\leq\delta\leq1.0$), $Li_{0.10}Ca_{0.80}BiO_{3-\delta}$ (wherein $0\leq\delta\leq1.0$),
$Li_{0.20}Ca_{0.60}TiO_{3-\delta}$ (wherein $0\leq\delta\leq1.0$), $Li_{0.20}Ca_{0.60}MnO_{3-\delta}$ (wherein $0\leq\delta\leq1.0$), $Li_{0.20}Ca_{0.60}NiO_{3-\delta}$ (wherein $0\leq\delta\leq1.0$), $Li_{0.20}Ca_{0.60}CrO_{3-\delta}$ (wherein $0\leq\delta\leq1.0$), $Li_{0.20}Ca_{0.60}CoO_{3-\delta}$ (wherein $0\leq\delta\leq1.0$), $Li_{0.20}Ca_{0.60}IrO_{3-\delta}$ (wherein $0\leq\delta\leq1.0$), $Li_{0.20}Ca_{0.60}RuO_{3-\delta}$ (wherein $0\leq\delta\leq1.0$), $Li_{0.20}Ca_{0.60}TiO_{3-\delta}$ (wherein $0\leq\delta\leq1.0$), $Li_{0.20}Ca_{0.60}FeO_{3-\delta}$ (wherein $0\leq\delta\leq1.0$), $Li_{0.20}Ca_{0.60}PdO_{3-\delta}$ (wherein $0\leq\delta\leq1.0$), $Li_{0.20}Ca_{0.60}PbO_{3-\delta}$ (wherein $0\leq\delta\leq1.0$), $Li_{0.20}Ca_{0.60}RhO_{3-\delta}$ (wherein $0\leq\delta\leq1.0$), $Li_{0.20}Ca_{0.60}SnO_{3-\delta}$ (wherein $0\leq\delta\leq1.0$), $Li_{0.20}Ca_{0.60}VO_{3-\delta}$ (wherein $0\leq\delta\leq1.0$), $Li_{0.20}Ca_{0.60}ReO_{3-\delta}$ (wherein $0\leq\delta\leq1.0$), $Li_{0.20}Ca_{0.60}GeO_{3-\delta}$ (wherein $0\leq\delta\leq1.0$), $Li_{0.20}Ca_{0.60}WO_{3-\delta}$ (wherein $0\leq\delta\leq1.0$), $Li_{0.20}Ca_{0.60}ZrO_{3-\delta}$ (wherein $0\leq\delta\leq1.0$), $Li_{0.20}Ca_{0.60}MoO_{3-\delta}$ (wherein $0\leq\delta\leq1.0$), $Li_{0.20}Ca_{0.60}NbO_{3-\delta}$ (wherein $0\leq\delta\leq1.0$), $Li_{0.20}Ca_{0.60}TaO_{3-\delta}$ (wherein $0\leq\delta\leq1.0$), $Li_{0.20}Ca_{0.60}HfO_{3-\delta}$ (wherein $0\leq\delta\leq1.0$), $Li_{0.20}Ca_{0.60}BiO_{3-\delta}$ (wherein $0\leq\delta\leq1.0$),
$Li_{0.25}Ca_{0.50}TiO_{3-\delta}$ (wherein $0\leq\delta\leq1.0$), $Li_{0.25}Ca_{0.50}MnO_{3-\delta}$ (wherein $0\leq\delta\leq1.0$), $Li_{0.25}Ca_{0.50}NiO_{3-\delta}$ (wherein $0\leq\delta\leq1.0$), $Li_{0.25}Ca_{0.50}CrO_{3-\delta}$ (wherein $0\leq\delta\leq1.0$), $Li_{0.25}Ca_{0.50}CoO_{3-\delta}$ (wherein $0\leq\delta\leq1.0$), $Li_{0.25}Ca_{0.50}IrO_{3-\delta}$ (wherein $0\leq\delta\leq1.0$), $Li_{0.25}Ca_{0.50}RuO_{3-\delta}$ (wherein $0\leq\delta\leq1.0$), $Li_{0.25}Ca_{0.50}TiO_{3-\delta}$ (wherein $0\leq\delta\leq1.0$), $Li_{0.25}Ca_{0.50}FeO_{3-\delta}$ (wherein $0\leq\delta\leq1.0$), $Li_{0.25}Ca_{0.50}PdO_{3-\delta}$ (wherein $0\leq\delta\leq1.0$), $Li_{0.25}Ca_{0.50}PbO_{3-\delta}$ (wherein $0\leq\delta\leq1.0$), $Li_{0.25}Ca_{0.50}RhO_{3-\delta}$ (wherein $0\leq\delta\leq1.0$), $Li_{0.25}Ca_{0.50}SnO_{3-\delta}$ (wherein $0\leq\delta\leq1.0$), $Li_{0.25}Ca_{0.50}VO_{3-\delta}$ (wherein $0\leq\delta\leq1.0$), $Li_{0.25}Ca_{0.50}ReO_{3-\delta}$ (wherein $0\leq\delta\leq1.0$), $Li_{0.25}Ca_{0.50}GeO_{3-\delta}$ (wherein $0\leq\delta\leq1.0$), $Li_{0.25}Ca_{0.50}WO_{3-\delta}$ (wherein $0\leq\delta\leq1.0$), $Li_{0.25}Ca_{0.50}ZrO_{3-\delta}$ (wherein $0\leq\delta\leq1.0$), $Li_{0.25}Ca_{0.50}MoO_{3-\delta}$ (wherein $0\leq\delta\leq1.0$), $Li_{0.25}Ca_{0.50}NbO_{3-\delta}$ (wherein $0\leq\delta\leq1.0$), $Li_{0.25}Ca_{0.50}TaO_{3-\delta}$ (wherein $0\leq\delta\leq1.0$), $Li_{0.25}Ca_{0.50}HfO_{3-\delta}$ (wherein $0\leq\delta\leq1.0$), $Li_{0.25}Ca_{0.50}BiO_{3-\delta}$ (wherein $0\leq\delta\leq1.0$),
$Li_{0.30}Ca_{0.40}TiO_{3-\delta}$ (wherein $0\leq\delta\leq1.0$), $Li_{0.30}Ca_{0.40}MnO_{3-\delta}$ (wherein $0\leq\delta\leq1.0$), $Li_{0.30}Ca_{0.40}NiO_{3-\delta}$ (wherein $0\leq\delta\leq1.0$), $Li_{0.30}Ca_{0.40}CrO_{3-\delta}$ (wherein $0\leq\delta\leq1.0$), $Li_{0.30}Ca_{0.40}CoO_{3-\delta}$ (wherein $0\leq\delta\leq1.0$), $Li_{0.30}Ca_{0.40}IrO_{3-\delta}$ (wherein $0\leq\delta\leq1.0$), $Li_{0.30}Ca_{0.40}RuO_{3-\delta}$ (wherein $0\leq\delta\leq1.0$), $Li_{0.30}Ca_{0.40}TiO_{3-\delta}$ (wherein $0\leq\delta\leq1.0$), $Li_{0.30}Ca_{0.40}FeO_{3-\delta}$ (wherein $0\leq\delta\leq1.0$), $Li_{0.30}Ca_{0.40}PdO_{3-\delta}$ (wherein $0\leq\delta\leq1.0$), $Li_{0.30}Ca_{0.40}PbO_{3-\delta}$ (wherein $0\leq\delta\leq1.0$), $Li_{0.30}Ca_{0.40}RhO_{3-\delta}$ (wherein $0\leq\delta\leq1.0$), $Li_{0.30}Ca_{0.40}SnO_{3-\delta}$ (wherein $0\leq\delta\leq1.0$), $Li_{0.30}Ca_{0.40}VO_{3-\delta}$ (wherein $0\leq\delta\leq1.0$), $Li_{0.30}Ca_{0.40}ReO_{3-\delta}$ (wherein $0\leq\delta\leq1.0$), $Li_{0.30}Ca_{0.40}GeO_{3-\delta}$ (wherein $0\leq\delta\leq1.0$), $Li_{0.30}Ca_{0.40}WO_{3-\delta}$ (wherein $0\leq\delta\leq1.0$), $Li_{0.30}Ca_{0.40}ZrO_{3-\delta}$ (wherein $0\leq\delta\leq1.0$), $Li_{0.30}Ca_{0.40}MoO_{3-\delta}$ (wherein $0\leq\delta\leq1.0$), $Li_{0.30}Ca_{0.40}NbO_{3-\delta}$ (wherein $0\leq\delta\leq1.0$), $Li_{0.30}Ca_{0.40}TaO_{3-\delta}$ (wherein $0\leq\delta\leq1.0$), $Li_{0.30}Ca_{0.40}HfO_{3-\delta}$ (wherein $0\leq\delta\leq1.0$), $Li_{0.30}Ca_{0.40}BiO_{3-\delta}$ (wherein $0\leq\delta\leq1.0$),
$Li_{0.40}Ca_{0.20}TiO_{3-\delta}$ (wherein $0\leq\delta\leq1.0$), $Li_{0.40}Ca_{0.20}MnO_{3-\delta}$ (wherein $0\leq\delta\leq1.0$), $Li_{0.40}Ca_{0.20}NiO_{3-\delta}$ (wherein $0\leq\delta\leq1.0$), $Li_{0.40}Ca_{0.20}CrO_{3-\delta}$ (wherein $0\leq\delta\leq1.0$), $Li_{0.40}Ca_{0.20}CO_{3-\delta}$ (wherein $0\leq\delta\leq1.0$), $Li_{0.40}Ca_{0.20}IrO_{3-\delta}$ (wherein $0\leq\delta\leq1.0$), $Li_{0.40}Ca_{0.20}RuO_{3-\delta}$ (wherein $0\leq\delta\leq1.0$), $Li_{0.40}Ca_{0.20}TiO_{3-\delta}$ (wherein $0\leq\delta\leq1.0$), $Li_{0.40}Ca_{0.20}FeO_{3-\delta}$ (wherein $0\leq\delta\leq1.0$), $Li_{0.40}Ca_{0.20}PdO_{3-\delta}$ (wherein $0\leq\delta\leq1.0$), $Li_{0.40}Ca_{0.20}PbO_{3-\delta}$ (wherein $0\leq\delta\leq1.0$), $Li_{0.40}Ca_{0.20}RhO_{3-\delta}$ (wherein $0\leq\delta\leq1.0$), $Li_{0.40}Ca_{0.20}SnO_{3-\delta}$ (wherein $0\leq\delta\leq1.0$), $Li_{0.40}Ca_{0.20}VO_{3-\delta}$ (wherein $0\leq\delta\leq1.0$), $Li_{0.40}Ca_{0.20}ReO_{3-\delta}$ (wherein $0\leq\delta\leq1.0$), $Li_{0.40}Ca_{0.20}GeO_{3-\delta}$ (wherein $0\leq\delta\leq1.0$), $Li_{0.40}Ca_{0.20}WO_{3-\delta}$ (wherein $0\leq\delta\leq1.0$), $Li_{0.40}Ca_{0.20}ZrO_{3-\delta}$ (wherein $0\leq\delta\leq1.0$), $Li_{0.40}Ca_{0.20}MoO_{3-\delta}$ (wherein $0\leq\delta\leq1.0$), $Li_{0.40}Ca_{0.20}NbO_{3-\delta}$ (wherein $0\leq\delta\leq1.0$), $Li_{0.40}Ca_{0.20}TaO_{3-\delta}$ (wherein $0\leq\delta\leq1.0$), $Li_{0.40}Ca_{0.20}HfO_{3-\delta}$ (wherein $0\leq\delta\leq1.0$), $Li_{0.40}Ca_{0.20}BiO_{3-\delta}$ (wherein $0\leq\delta\leq1.0$),
$Li_{0.10}Sr_{0.80}TiO_{3-\delta}$ (wherein $0\leq\delta\leq1.0$), $Li_{0.10}Sr_{0.80}MnO_{3-\delta}$ (wherein $0\leq\delta\leq1.0$), $Li_{0.10}Sr_{0.80}NiO_{3-\delta}$ (wherein $0\leq\delta\leq1.0$), $Li_{0.10}Sr_{0.80}CrO_{3-\delta}$ (wherein $0\leq\delta\leq1.0$), $Li_{0.10}Sr_{0.80}CoO_{3-\delta}$ (wherein $0\leq\delta\leq1.0$), $Li_{0.10}Sr_{0.80}IrO_{3-\delta}$ (wherein $0\leq\delta\leq1.0$), $Li_{1.10}Sr_{0.80}RuO_{3-\delta}$ (wherein $0\leq\delta\leq1.0$), $Li_{0.10}Sr_{0.80}TiO_{3-\delta}$ (wherein $0\leq\delta\leq1.0$), $Li_{0.10}Sr_{0.80}FeO_{3-\delta}$ (wherein $0\leq\delta\leq1.0$), $Li_{0.10}Sr_{0.80}PdO_{3-\delta}$ (wherein $0\leq\delta\leq1.0$), $Li_{0.10}Sr_{0.80}PbO_{3-\delta}$ (wherein $0\leq\delta\leq1.0$), $Li_{0.10}Sr_{0.80}RhO_{3-\delta}$ (wherein $0\leq\delta\leq1.0$), $Li_{0.10}Sr_{0.80}SnO_{3-\delta}$ (wherein $0\leq\delta\leq1.0$), $Li_{0.10}Sr_{0.80}VO_{3-\delta}$ (wherein $0\leq\delta\leq1.0$), $Li_{0.10}Sr_{0.80}ReO_{3-\delta}$ (wherein $0\leq\delta\leq1.0$), $Li_{0.10}Sr_{0.80}GeO_{3-\delta}$ (wherein $0\leq\delta\leq1.0$), $Li_{0.10}Sr_{0.80}WO_{3-\delta}$ (wherein $0\leq\delta\leq1.0$), $Li_{0.10}Sr_{0.80}ZrO_{3-\delta}$ (wherein $0\leq\delta\leq1.0$), $Li_{0.10}Sr_{0.80}MoO_{3-\delta}$ (wherein $0\leq\delta\leq1.0$), $Li_{0.10}Sr_{0.80}NbO_{3-\delta}$ (wherein $0\leq\delta\leq1.0$), $Li_{0.10}Sr_{0.80}TaO_{3-\delta}$ (wherein $0\leq\delta\leq1.0$), $Li_{0.10}Sr_{0.80}HfO_{3-\delta}$ (wherein $0\leq\delta\leq1.0$), $Li_{0.10}Sr_{0.80}BiO_{3-\delta}$ (wherein $0\leq\delta\leq1.0$),
$Li_{0.20}Sr_{0.60}TiO_{3-\delta}$ (wherein $0\leq\delta\leq1.0$), $Li_{0.20}Sr_{0.60}MnO_{3-\delta}$ (wherein $0\leq\delta\leq1.0$), $Li_{0.20}Sr_{0.60}NiO_{3-\delta}$ (wherein $0\leq\delta\leq1.0$), $Li_{0.20}Sr_{0.60}CrO_{3-\delta}$ (wherein $0\leq\delta\leq1.0$), $Li_{0.20}Sr_{0.60}CoO_{3-\delta}$ (wherein $0\leq\delta\leq1.0$), $Li_{0.20}Sr_{0.60}IrO_{3-\delta}$ (wherein $0\leq\delta\leq1.0$), $Li_{0.20}Sr_{0.60}RuO_{3-\delta}$ (wherein $0\leq\delta\leq1.0$), $Li_{0.20}Sr_{0.60}TiO_{3-\delta}$ (wherein $0\leq\delta\leq1.0$), $Li_{0.20}Sr_{0.60}FeO_{3-\delta}$ (wherein $0\leq\delta\leq1.0$), $Li_{0.20}Sr_{0.60}PdO_{3-\delta}$ (wherein $0\leq\delta\leq1.0$), $Li_{0.20}Sr_{0.60}PbO_{3-\delta}$ (wherein $0\leq\delta\leq1.0$), $Li_{0.20}Sr_{0.60}RhO_{3-\delta}$ (wherein $0\leq\delta\leq1.0$), $Li_{0.20}Sr_{0.60}SnO_{3-\delta}$ (wherein $0\leq\delta\leq1.0$), $Li_{0.20}Sr_{0.60}VO_{3-\delta}$ (wherein $0\leq\delta\leq1.0$), $Li_{0.20}Sr_{0.60}ReO_{3-\delta}$ (wherein $0\leq\delta\leq1.0$), $Li_{0.20}Sr_{0.60}GeO_{3-\delta}$ (wherein $0\leq\delta\leq1.0$), $Li_{0.20}Sr_{0.60}WO_{3-\delta}$ (wherein $0\leq\delta\leq1.0$), $Li_{0.20}Sr_{0.60}ZrO_{3-\delta}$ (wherein $0\leq\delta\leq1.0$), $Li_{0.20}Sr_{0.60}MoO_{3-\delta}$ (wherein $0\leq\delta\leq1.0$), $Li_{0.20}Sr_{0.60}NbO_{3-\delta}$ (wherein $0\leq\delta\leq1.0$), $Li_{0.20}Sr_{0.60}TaO_{3-\delta}$ (wherein $0\leq\delta\leq1.0$), $Li_{0.20}Sr_{0.60}HfO_{3-\delta}$ (wherein $0\leq\delta\leq1.0$), $Li_{0.20}Sr_{0.60}BiO_{3-\delta}$ (wherein $0\leq\delta\leq1.0$), Li$_{0.25}$Sr$_{0.50}$TiO$_{3-\delta}$ (wherein 0≤δ≤1.0), Li$_{0.25}$Sr$_{0.50}$MnO$_{3-\delta}$ (wherein 0≤δ≤1.0), Li$_{0.25}$Sr$_{0.50}$NiO$_{3-\delta}$ (wherein 0≤δ≤1.0), Li$_{0.25}$Sr$_{0.50}$CrO$_{3-\delta}$ (wherein 0≤δ≤1.0), Li$_{0.25}$Sr$_{0.50}$CoO$_{3-\delta}$ (wherein 0≤δ≤1.0), Li$_{0.25}$Sr$_{0.50}$IrO$_{3-\delta}$ (wherein 0≤δ≤1.0), Li$_{0.25}$Sr$_{0.50}$RuO$_{3-\delta}$ (wherein 0≤δ≤1.0), Li$_{0.25}$Sr$_{0.50}$TiO$_{3-\delta}$ (wherein 0≤δ≤1.0), Li$_{0.25}$Sr$_{0.50}$FeO$_{3-\delta}$ (wherein 0≤δ≤1.0), Li$_{0.25}$Sr$_{0.50}$PdO$_{3-\delta}$ (wherein 0≤δ≤1.0), Li$_{0.25}$Sr$_{0.50}$PbO$_{3-\delta}$ (wherein 0≤δ≤1.0), Li$_{0.25}$Sr$_{0.50}$RhO$_{3-\delta}$ (wherein 0≤δ≤1.0), Li$_{0.25}$Sr$_{0.50}$SnO$_{3-\delta}$ (wherein 0≤δ≤1.0), Li$_{0.25}$Sr$_{0.50}$VO$_{3-\delta}$ (wherein 0≤δ≤1.0), Li$_{0.25}$Sr$_{0.50}$ReO$_{3-\delta}$ (wherein 0≤δ≤1.0), Li$_{0.25}$Sr$_{0.50}$GeO$_{3-\delta}$ (wherein 0≤δ≤1.0), Li$_{0.25}$Sr$_{0.50}$WO$_{3-\delta}$ (wherein 0≤δ≤1.0), Li$_{0.25}$Sr$_{0.50}$ZrO$_{3-\delta}$ (wherein 0≤δ≤1.0), Li$_{0.25}$Sr$_{0.50}$MoO$_{3-\delta}$ (wherein 0≤δ≤1.0), Li$_{0.25}$Sr$_{0.50}$NbO$_{3-\delta}$ (wherein 0≤δ≤1.0), Li$_{0.25}$Sr$_{0.50}$TaO$_{3-\delta}$ (wherein 0≤δ≤1.0), Li$_{0.25}$Sr$_{0.50}$HfO$_{3-\delta}$ (wherein 0≤δ≤1.0), Li$_{0.25}$Sr$_{0.50}$BiO$_{3-\delta}$ (wherein 0≤δ≤1.0), Li$_{0.30}$Sr$_{0.40}$TiO$_{3-\delta}$ (wherein 0≤δ≤1.0), Li$_{0.30}$Sr$_{0.40}$MnO$_{3-\delta}$ (wherein 0≤δ≤1.0), Li$_{0.30}$Sr$_{0.40}$NiO$_{3-\delta}$ (wherein 0≤δ≤1.0), Li$_{0.30}$Sr$_{0.40}$CrO$_{3-\delta}$ (wherein 0≤δ≤1.0), Li$_{0.30}$Sr$_{0.40}$CoO$_{3-\delta}$ (wherein 0≤δ≤1.0), Li$_{0.30}$Sr$_{0.40}$IrO$_{3-\delta}$ (wherein 0≤δ≤1.0), Li$_{0.30}$Sr$_{0.40}$RuO$_{3-\delta}$ (wherein 0≤δ≤1.0), Li$_{0.30}$Sr$_{0.40}$TiO$_{3-\delta}$ (wherein 0≤δ≤1.0), Li$_{0.30}$Sr$_{0.40}$FeO$_{3-\delta}$ (wherein 0≤δ≤1.0), Li$_{0.30}$Sr$_{0.40}$PdO$_{3-\delta}$ (wherein 0≤δ≤1.0), Li$_{0.30}$Sr$_{0.40}$PbO$_{3-\delta}$ (wherein 0≤δ≤1.0), Li$_{0.30}$Sr$_{0.40}$RhO$_{3-\delta}$ (wherein 0≤δ≤1.0), Li$_{0.30}$Sr$_{0.40}$SnO$_{3-\delta}$ (wherein 0≤δ≤1.0), Li$_{0.30}$Sr$_{0.40}$VO$_{3-\delta}$ (wherein 0≤δ≤1.0), Li$_{0.30}$Sr$_{0.40}$ReO$_{3-\delta}$ (wherein 0≤δ≤1.0), Li$_{0.30}$Sr$_{0.40}$GeO$_{3-\delta}$ (wherein 0≤δ≤1.0), Li$_{0.30}$Sr$_{0.40}$WO$_{3-\delta}$ (wherein 0≤δ≤1.0), Li$_{0.30}$Sr$_{0.40}$ZrO$_{3-\delta}$ (wherein 0≤δ≤1.0), Li$_{0.30}$Sr$_{0.40}$MoO$_{3-\delta}$ (wherein 0≤δ≤1.0), Li$_{0.30}$Sr$_{0.40}$NbO$_{3-\delta}$ (wherein 0≤δ≤1.0), Li$_{0.30}$Sr$_{0.40}$TaO$_{3-\delta}$ (wherein 0≤δ≤1.0), Li$_{0.30}$Sr$_{0.40}$HfO$_{3-\delta}$ (wherein 0≤δ≤1.0), Li$_{0.30}$Sr$_{0.40}$BiO$_{3-\delta}$ (wherein 0≤δ≤1.0), Li$_{0.40}$Sr$_{0.20}$TiO$_{3-\delta}$ (wherein 0≤δ≤1.0), Li$_{0.40}$Sr$_{0.20}$MnO$_{3-\delta}$ (wherein 0≤δ≤1.0), Li$_{0.40}$Sr$_{0.20}$NiO$_{3-\delta}$ (wherein 0≤δ≤1.0), Li$_{0.40}$Sr$_{0.20}$CrO$_{3-\delta}$ (wherein 0≤δ≤1.0), Li$_{0.40}$Sr$_{0.20}$CoO$_{3-\delta}$ (wherein 0≤δ≤1.0), Li$_{0.40}$Sr$_{0.20}$IrO$_{3-\delta}$ (wherein 0≤δ≤1.0), Li$_{0.40}$Sr$_{0.20}$RuO$_{3-\delta}$ (wherein 0≤δ≤1.0), Li$_{0.40}$Sr$_{0.20}$TiO$_{3-\delta}$ (wherein 0≤δ≤1.0), Li$_{0.40}$Sr$_{0.20}$FeO$_{3-\delta}$ (wherein 0≤δ≤1.0), Li$_{0.40}$Sr$_{0.20}$PdO$_{3-\delta}$ (wherein 0≤δ≤1.0), Li$_{0.40}$Sr$_{0.20}$PbO$_{3-\delta}$ (wherein 0≤δ≤1.0), Li$_{0.40}$Sr$_{0.20}$RhO$_{3-\delta}$ (wherein 0≤δ≤1.0), Li$_{0.40}$Sr$_{0.20}$SnO$_{3-\delta}$ (wherein 0≤δ≤1.0), Li$_{0.40}$Sr$_{0.20}$VO$_{3-\delta}$ (wherein 0≤δ≤1.0), Li$_{0.40}$Sr$_{0.20}$ReO$_{3-\delta}$ (wherein 0≤δ≤1.0), Li$_{0.40}$Sr$_{0.20}$GeO$_{3-\delta}$ (wherein 0≤δ≤1.0), Li$_{0.40}$Sr$_{0.20}$WO$_{3-\delta}$ (wherein 0≤δ≤1.0), Li$_{0.40}$Sr$_{0.20}$ZrO$_{3-\delta}$ (wherein 0≤δ≤1.0), Li$_{0.40}$Sr$_{0.20}$MoO$_{3-\delta}$ (wherein 0≤δ≤1.0), Li$_{0.40}$Sr$_{0.20}$NbO$_{3-\delta}$ (wherein 0≤δ≤1.0), Li$_{0.40}$Sr$_{0.20}$TaO$_{3-\delta}$ (wherein 0≤δ≤1.0), Li$_{0.40}$Sr$_{0.20}$HfO$_{3-\delta}$ (wherein 0≤δ≤1.0), Li$_{0.40}$Sr$_{0.20}$BiO$_{3-\delta}$ (wherein 0≤δ≤1.0), Li$_{0.10}$Ba$_{0.80}$TiO$_{3-\delta}$ (wherein 0≤δ≤1.0), Li$_{0.10}$Ba$_{0.80}$MnO$_{3-\delta}$ (wherein 0≤δ≤1.0), Li$_{0.10}$Ba$_{0.80}$NiO$_{3-\delta}$ (wherein 0≤δ≤1.0), Li$_{0.10}$Ba$_{0.80}$CrO$_{3-\delta}$ (wherein 0≤δ≤1.0), Li$_{0.10}$Ba$_{0.80}$CoO$_{3-\delta}$ (wherein 0≤δ≤1.0), Li$_{0.10}$Ba$_{0.80}$IrO$_{3-\delta}$ (wherein 0≤δ≤1.0), Li$_{0.10}$Ba$_{0.80}$RuO$_{3-\delta}$ (wherein 0≤δ≤1.0), Li$_{0.10}$Ba$_{0.80}$TiO$_{3-\delta}$ (wherein 0≤δ≤1.0), Li$_{0.10}$Ba$_{0.80}$FeO$_{3-\delta}$ (wherein 0≤δ≤1.0), Li$_{0.10}$Ba$_{0.80}$PdO$_{3-\delta}$ (wherein 0≤δ≤1.0), Li$_{0.10}$Ba$_{0.80}$PbO$_{3-\delta}$ (wherein 0≤δ≤1.0), Li$_{0.10}$Ba$_{0.80}$RhO$_{3-\delta}$ (wherein 0≤δ≤1.0), Li$_{0.10}$Ba$_{0.80}$SnO$_{3-\delta}$ (wherein 0≤δ≤1.0), Li$_{0.10}$Ba$_{0.80}$VO$_{3-\delta}$ (wherein 0≤δ≤1.0), Li$_{0.10}$Ba$_{0.80}$ReO$_{3-\delta}$ (wherein 0≤δ≤1.0), Li$_{0.10}$Ba$_{0.80}$GeO$_{3-\delta}$ (wherein 0≤δ≤1.0), Li$_{0.10}$Ba$_{0.80}$WO$_{3-\delta}$ (wherein 0≤δ≤1.0), Li$_{0.10}$Ba$_{0.80}$ZrO$_{3-\delta}$ (wherein 0≤δ≤1.0), Li$_{0.10}$Ba$_{0.80}$MoO$_{3-\delta}$ (wherein 0≤δ≤1.0), Li$_{0.10}$Ba$_{0.80}$NbO$_{3-\delta}$ (wherein 0≤δ≤1.0), Li$_{0.10}$Ba$_{0.80}$TaO$_{3-\delta}$ (wherein 0≤δ≤1.0), Li$_{0.10}$Ba$_{0.80}$HfO$_{3-\delta}$ (wherein 0≤δ≤1.0), Li$_{0.10}$Ba$_{0.80}$BiO$_{3-\delta}$ (wherein 0≤δ≤1.0), Li$_{0.20}$Ba$_{0.60}$TiO$_{3-\delta}$ (wherein 0≤δ≤1.0), Li$_{0.20}$Ba$_{0.60}$MnO$_{3-\delta}$ (wherein 0≤δ≤1.0), Li$_{0.20}$Ba$_{0.60}$NiO$_{3-\delta}$ (wherein 0≤δ≤1.0), Li$_{0.20}$Ba$_{0.60}$CrO$_{3-\delta}$ (wherein 0≤δ≤1.0), Li$_{0.20}$Ba$_{0.60}$CoO$_{3-\delta}$ (wherein 0≤δ≤1.0), Li$_{0.20}$Ba$_{0.60}$IrO$_{3-\delta}$ (wherein 0≤δ≤1.0), Li$_{0.20}$Ba$_{0.60}$RuO$_{3-\delta}$ (wherein 0≤δ≤1.0), Li$_{0.20}$Ba$_{0.60}$TiO$_{3-\delta}$ (wherein 0≤δ≤1.0), Li$_{0.20}$Ba$_{0.60}$FeO$_{3-\delta}$ (wherein 0≤δ≤1.0), Li$_{0.20}$Ba$_{0.60}$PdO$_{3-\delta}$ (wherein 0≤δ≤1.0), Li$_{0.20}$Ba$_{0.60}$PbO$_{3-\delta}$ (wherein 0≤δ≤1.0), Li$_{0.20}$Ba$_{0.60}$RhO$_{3-\delta}$ (wherein 0≤δ≤1.0), Li$_{0.20}$Ba$_{0.60}$SnO$_{3-\delta}$ (wherein 0≤δ≤1.0), Li$_{0.20}$Ba$_{0.60}$VO$_{3-\delta}$ (wherein 0≤δ≤1.0), Li$_{0.20}$Ba$_{0.60}$ReO$_{3-\delta}$ (wherein 0≤δ≤1.0), Li$_{0.20}$Ba$_{0.60}$GeO$_{3-\delta}$ (wherein 0≤δ≤1.0), Li$_{0.20}$Ba$_{0.60}$WO$_{3-\delta}$ (wherein 0≤δ≤1.0), Li$_{0.20}$Ba$_{0.60}$ZrO$_{3-\delta}$ (wherein 0≤δ≤1.0), Li$_{0.20}$Ba$_{0.60}$MoO$_{3-\delta}$ (wherein 0≤δ≤1.0), Li$_{0.20}$Ba$_{0.60}$NbO$_{3-\delta}$ (wherein 0≤δ≤1.0), Li$_{0.20}$Ba$_{0.60}$TaO$_{3-\delta}$ (wherein 0≤δ≤1.0), Li$_{0.20}$Ba$_{0.60}$HfO$_{3-\delta}$ (wherein 0≤δ≤1.0), Li$_{0.20}$Ba$_{0.60}$BiO$_{3-\delta}$ (wherein 0≤δ≤1.0), Li$_{0.25}$Ba$_{0.50}$TiO$_{3-\delta}$ (wherein 0≤δ≤1.0), Li$_{0.25}$Ba$_{0.50}$MnO$_{3-\delta}$ (wherein 0≤δ≤1.0), Li$_{0.25}$Ba$_{0.50}$NiO$_{3-\delta}$ (wherein 0≤δ≤1.0), Li$_{0.25}$Ba$_{0.50}$CrO$_{3-\delta}$ (wherein 0≤δ≤1.0), Li$_{0.25}$Ba$_{0.50}$CoO$_{3-\delta}$ (wherein 0≤δ≤1.0), Li$_{0.25}$Ba$_{0.50}$IrO$_{3-\delta}$ (wherein 0≤δ≤1.0), Li$_{0.25}$Ba$_{0.50}$RuO$_{3-\delta}$ (wherein 0≤δ≤1.0), Li$_{0.25}$Ba$_{0.50}$TiO$_{3-\delta}$ (wherein 0≤δ≤1.0), Li$_{0.25}$Ba$_{0.50}$FeO$_{3-\delta}$ (wherein 0≤δ≤1.0), Li$_{0.25}$Ba$_{0.50}$PdO$_{3-\delta}$ (wherein 0≤δ≤1.0), Li$_{0.25}$Ba$_{0.50}$PbO$_{3-\delta}$ (wherein 0≤δ≤1.0), Li$_{0.25}$Ba$_{0.50}$RhO$_{3-\delta}$ (wherein 0≤δ≤1.0), Li$_{0.25}$Ba$_{0.50}$SnO$_{3-\delta}$ (wherein 0≤δ≤1.0), Li$_{0.25}$Ba$_{0.50}$VO$_{3-\delta}$ (wherein 0≤δ≤1.0), Li$_{0.25}$Ba$_{0.50}$ReO$_{3-\delta}$ (wherein 0≤δ≤1.0), Li$_{0.25}$Ba$_{0.50}$GeO$_{3-\delta}$ (wherein 0≤δ≤1.0), Li$_{0.25}$Ba$_{0.50}$WO$_{3-\delta}$ (wherein 0≤δ≤1.0), Li$_{0.25}$Ba$_{0.50}$ZrO$_{3-\delta}$ (wherein 0≤δ≤1.0), Li$_{0.25}$Ba$_{0.50}$MoO$_{3-\delta}$ (wherein 0≤δ≤1.0), Li$_{0.25}$Ba$_{0.50}$NbO$_{3-\delta}$ (wherein 0≤δ≤1.0), Li$_{0.25}$Ba$_{0.50}$TaO$_{3-\delta}$ (wherein 0≤δ≤1.0), Li$_{0.25}$Ba$_{0.50}$HfO$_3$, Li$_{0.25}$Ba$_{0.50}$BiO$_{3-\delta}$ (wherein 0≤δ≤1.0), Li$_{0.30}$Ba$_{0.40}$TiO$_{3-\delta}$ (wherein 0≤δ≤1.0), Li$_{0.30}$Ba$_{0.40}$MnO$_{3-\delta}$ (wherein 0≤δ≤1.0), Li$_{0.30}$Ba$_{0.40}$NiO$_{3-\delta}$ (wherein 0≤δ≤1.0), Li$_{0.30}$Ba$_{0.40}$CrO$_{3-\delta}$ (wherein 0≤δ≤1.0), Li$_{0.30}$Ba$_{0.40}$CoO$_{3-\delta}$ (wherein 0≤δ≤1.0), Li$_{0.30}$Ba$_{0.40}$IrO$_{3-\delta}$ (wherein 0≤δ≤1.0), Li$_{0.30}$Ba$_{0.40}$RuO$_{3-\delta}$ (wherein 0≤δ≤1.0), Li$_{0.30}$Ba$_{0.40}$TiO$_{3-\delta}$ (wherein 0≤δ≤1.0), Li$_{0.30}$Ba$_{0.40}$FeO$_{3-\delta}$ (wherein 0≤δ≤1.0), Li$_{0.30}$Ba$_{0.40}$PdO$_{3-\delta}$ (wherein 0≤δ≤1.0), Li$_{0.30}$Ba$_{0.40}$PbO$_{3-\delta}$ (wherein 0≤δ≤1.0), Li$_{0.30}$Ba$_{0.40}$RhO$_{3-\delta}$ (wherein 0≤δ≤1.0), Li$_{0.30}$Ba$_{0.40}$SnO$_{3-\delta}$ (wherein 0≤δ≤1.0), Li$_{0.30}$Ba$_{0.40}$VO$_{3-\delta}$ (wherein 0≤δ≤1.0), Li$_{0.30}$Ba$_{0.40}$ReO$_{3-\delta}$ (wherein 0≤δ≤1.0), Li$_{0.30}$Ba$_{0.40}$GeO$_{3-\delta}$ (wherein 0≤δ≤1.0), Li$_{0.30}$Ba$_{0.40}$WO$_{3-\delta}$ (wherein 0≤δ≤1.0), Li$_{0.30}$Ba$_{0.40}$ZrO$_{3-\delta}$ (wherein 0≤δ≤1.0), Li$_{0.30}$Ba$_{0.40}$MoO$_{3-\delta}$ (wherein 0≤δ≤1.0), Li$_{0.30}$Ba$_{0.40}$NbO$_{3-\delta}$ (wherein 0≤δ≤1.0), Li$_{0.30}$Ba$_{0.40}$TaO$_{3-\delta}$ (wherein 0≤δ≤1.0), Li$_{0.30}$Ba$_{0.40}$HfO$_{3-\delta}$ (wherein 0≤δ≤1.0), Li$_{0.30}$Ba$_{0.40}$BiO$_{3-\delta}$ (wherein 0≤δ≤1.0), Li$_{0.40}$Ba$_{0.20}$TiO$_{3-\delta}$ (wherein 0≤δ≤1.0), Li$_{0.40}$Ba$_{0.20}$MnO$_{3-\delta}$ (wherein 0≤δ≤1.0), Li$_{0.40}$Ba$_{0.20}$NiO$_{3-\delta}$ (wherein 0≤δ≤1.0), Li$_{0.40}$Ba$_{0.20}$CrO$_{3-\delta}$ (wherein 0≤δ≤1.0), Li$_{0.40}$Ba$_{0.20}$CoO$_{3-\delta}$ (wherein 0≤δ≤1.0), Li$_{0.40}$Ba$_{0.20}$IrO$_{3-\delta}$ (wherein 0≤δ≤1.0), Li$_{0.40}$Ba$_{0.20}$RuO$_{3-\delta}$ (wherein 0≤δ≤1.0), Li$_{0.40}$Ba$_{0.20}$TiO$_{3-\delta}$ (wherein 0≤δ≤1.0), Li$_{0.40}$Ba$_{0.20}$FeO$_{3-\delta}$ (wherein 0≤δ≤1.0), Li$_{0.40}$Ba$_{0.20}$PdO$_{3-\delta}$ (wherein 0≤δ≤1.0), Li$_{0.40}$Ba$_{0.20}$PbO$_{3-\delta}$ (wherein 0≤δ≤1.0), Li$_{0.40}$Ba$_{0.20}$RhO$_{3-\delta}$ (wherein 0≤δ≤1.0), Li$_{0.40}$Ba$_{0.20}$SnO$_{3-\delta}$ (wherein 0≤δ≤1.0), Li$_{0.40}$Ba$_{0.20}$VO$_{3-\delta}$ (wherein 0≤δ≤1.0), Li$_{0.40}$Ba$_{0.20}$ReO$_{3-\delta}$ (wherein 0≤δ≤1.0), Li$_{0.40}$Ba$_{0.20}$GeO$_{3-\delta}$ (wherein 0≤δ≤1.0), Li$_{0.40}$Ba$_{0.20}$WO$_{3-\delta}$ (wherein 0≤δ≤1.0), Li$_{0.40}$Ba$_{0.20}$ZrO$_{3-\delta}$ (wherein 0≤δ≤1.0), Li$_{0.40}$Ba$_{0.20}$MoO$_{3-\delta}$ (wherein 0≤δ≤1.0), Li$_{0.40}$Ba$_{0.20}$NbO$_{3-\delta}$ (wherein 0≤δ≤1.0), Li$_{0.40}$Ba$_{0.20}$TaO$_{3-\delta}$ (wherein 0≤δ≤1.0), Li$_{0.40}$Ba$_{0.20}$HfO$_{3-\delta}$ (wherein 0≤δ≤1.0), Li$_{0.40}$Ba$_{0.20}$BiO$_{3-\delta}$ (wherein 0≤δ≤1.0), Li$_{0.25}$La$_{0.50}$TiO$_{3-\delta}$ (wherein 0≤δ≤1.0), Li$_{0.25}$La$_{0.50}$MnO$_{3-\delta}$ (wherein 0≤δ≤1.0), Li$_{0.25}$La$_{0.50}$NiO$_{3-\delta}$ (wherein 0≤δ≤1.0), Li$_{0.25}$La$_{0.50}$CrO$_{3-\delta}$ (wherein 0≤δ≤1.0), Li$_{0.25}$La$_{0.50}$CoO$_{3-\delta}$ (wherein 0≤δ≤1.0), Li$_{0.25}$La$_{0.50}$IrO$_{3-\delta}$ (wherein 0≤δ≤1.0), Li$_{0.25}$La$_{0.50}$RuO$_{3-\delta}$ (wherein 0≤δ≤1.0), Li$_{0.25}$La$_{0.50}$TiO$_{3-\delta}$ (wherein 0≤δ≤1.0), Li$_{0.25}$La$_{0.50}$FeO$_{3-\delta}$ (wherein 0≤δ≤1.0), $Li_{0.25}La_{0.50}PdO_{3-δ}$ (wherein 0≤δ≤1.0), $Li_{0.25}La_{0.50}PbO_{3-δ}$ (wherein 0≤δ≤1.0), $Li_{0.25}La_{0.50}RhO_{3-δ}$ (wherein 0≤δ≤1.0), $Li_{0.25}La_{0.50}SnO_{3-δ}$ (wherein 0≤δ≤1.0), $Li_{0.25}La_{0.50}VO_{3-δ}$ (wherein 0≤δ≤1.0), $Li_{0.25}La_{0.50}ReO_{3-δ}$ (wherein 0≤δ≤1.0), $Li_{0.25}La_{0.50}GeO_{3-δ}$ (wherein 0≤δ≤1.0), $Li_{0.25}La_{0.50}WO_{3-δ}$ (wherein 0≤δ≤1.0), $Li_{0.25}La_{0.50}ZrO_{3-δ}$ (wherein 0≤δ≤1.0), $Li_{0.25}La_{0.50}MoO_{3-δ}$ (wherein 0≤δ≤1.0), $Li_{0.25}La_{0.50}NbO_{3-δ}$ (wherein 0≤δ≤1.0), $Li_{0.25}La_{0.50}TaO_{3-δ}$ (wherein 0≤δ≤1.0), $Li_{0.25}La_{0.50}HfO_{3-δ}$ (wherein 0≤δ≤1.0), $Li_{0.25}La_{0.50}BiO_{3-δ}$ (wherein 0≤δ≤1.0), $Li_{0.05}La_{0.82}Ti_{0.70}O_{3-δ}$ (wherein 0≤δ≤1.0),
$Li_{0.05}La_{0.82}Mn_{0.70}O_{3-δ}$ (wherein 0≤δ≤1.0),
$Li_{0.10}La_{0.80}Mn_{0.70}O_{3-δ}$ (wherein 0≤δ≤1.0),
$Li_{0.20}La_{0.77}Mn_{0.70}O_{3-δ}$ (wherein 0≤δ≤1.0),
$Li_{0.05}La_{0.82}Nb_{0.70}O_{3-δ}$ (wherein 0≤δ≤1.0),
$Li_{0.10}La_{0.80}Nb_{0.70}O_{3-δ}$ (wherein 0≤δ≤1.0),
$Li_{0.20}La_{0.77}Nb_{0.70}O_{3-δ}$ (wherein 0≤δ≤1.0),
$Li_{0.05}La_{0.82}Ta_{0.70}O_{3-δ}$ (wherein 0≤δ≤1.0),
$Li_{0.10}La_{0.80}Ta_{0.70}O_{3-δ}$ (wherein 0≤δ≤1.0),
$Li_{0.20}La_{0.77}Ta_{0.70}O_{3-δ}$ (wherein 0≤δ≤1.0),
$Li_{0.05}La_{0.82}V_{0.70}O_{3-δ}$ (wherein 0≤δ≤1.0),
$Li_{0.10}La_{0.80}V_{0.70}O_{3-δ}$ (wherein 0≤δ≤1.0),
$Li_{0.20}La_{0.77}V_{0.70}O_{3-δ}$ (wherein 0≤δ≤1.0),
$Li_{0.05}La_{0.82}W_{0.70}O_{3-δ}$ (wherein 0≤δ≤1.0),
$Li_{0.10}La_{0.80}W_{0.70}O_{3-δ}$ (wherein 0≤δ≤1.0),
$Li_{0.20}La_{0.77}W_{0.70}O_{3-δ}$ (wherein 0≤δ≤1.0),
$Li_{0.05}La_{0.82}Mo_{0.70}O_{3-δ}$ (wherein 0≤δ≤1.0),
$Li_{0.10}La_{0.80}Mo_{0.70}O_{3-δ}$ (wherein 0≤δ≤1.0),
$Li_{0.20}La_{0.77}Mo_{0.70}O_{3-δ}$ (wherein 0≤δ≤1.0),
$Li_{0.05}La_{0.82}Bi_{0.70}O_{3-δ}$ (wherein 0≤δ≤1.0),
$Li_{0.10}La_{0.80}Bi_{0.70}O_{3-δ}$ (wherein 0≤δ≤1.0),
$Li_{0.20}La_{0.77}Bi_{0.70}O_{3-δ}$ (wherein 0≤δ≤1.0),
$Li_{0.05}La_{0.82}Cr_{0.70}O_{3-δ}$ (wherein 0≤δ≤1.0),
$Li_{0.10}La_{0.80}Cr_{0.70}O_{3-δ}$ (wherein 0≤δ≤1.0), or
$Li_{0.20}La_{0.77}Cr_{0.70}O_{3-δ}$ (wherein 0≤δ≤1.0). In the foregoing perovskite compounds, an oxygen vacancy may be present, e.g., 0<δ.

For example, the perovskite compound may be $Li_{0.31}La_{0.56}TiO_3$, $Li_{0.34}La_{0.55}RuO_3$, $Li_{0.2}Ca_{0.6}Mn_{0.5}Ni_{0.5}O_3$, $Li_{0.34}La_{0.55}RuO_{3-δ}$, or $Li_{0.2}Ca_{0.6}Mn_{0.5}Ni_{0.5}O_{3-δ}$. However, embodiments are not limited thereto. Any suitable lithium-containing compound available as a perovskite compound in the art may be used.

For example, the perovskite compound may have an electronic conductivity of about $1.0 \times 10^{-9}$ S/cm or greater, e.g., about $10^{-3}$ Siemens per centimeter, and an ionic conductivity of about $2.0 \times 10^{-7}$ S/cm or greater at room temperature, e.g., at 25° C.

The perovskite compound may have an electronic conductivity of, for example, about $5.0 \times 10^{-9}$ S/cm or greater e.g., about $10^{-3}$ Siemens per centimeter, about $1.0 \times 10^{-8}$ S/cm or greater, about $5.0 \times 10^{-8}$ S/cm or greater, about $1.0 \times 10^{-7}$ S/cm or greater, about $5.0 \times 10^{-7}$ S/cm or greater, about $1.0 \times 10^{-6}$ S/cm or greater, about $5.0 \times 10^{-6}$ S/cm or greater, about $1.0 \times 10^{-5}$ S/cm or greater, about $5.0 \times 10^{-5}$ S/cm or greater, about $1.0 \times 10^{-4}$ S/cm or greater, about $5.0 \times 10^{-4}$ S/cm or greater, or about $1.0 \times 10^{-3}$ S/cm or greater at room temperature, e.g., at 25° C. The at least one perovskite compound may have an electronic conductivity of, for example, $1.0 \times 10^{-9}$ S/cm to 1.0 S/cm, $5.0 \times 10^{-9}$ S/cm to 1.0 S/cm, $1.0 \times 10^{-8}$ S/cm to 1.0 S/cm, $5.0 \times 10^{-8}$ S/cm to 1.0 S/cm, $1.0 \times 10^{-7}$ S/cm to 1.0 S/cm, $5.0 \times 10^{-7}$ S/cm to 1.0 S/cm, $1.0 \times 10^{-6}$ S/cm to 1.0 S/cm, $5.0 \times 10^{-6}$ S/cm to 1.0 S/cm, $1.0 \times 10^{-5}$ S/cm to $1.0 \times 10^{-1}$ S/cm, $5.0 \times 10^{-5}$ S/cm to 1.0 S/cm, $1.0 \times 10^{-4}$ S/cm to $1.0 \times 10^{-1}$ S/cm, $5.0 \times 10^{-4}$ S/cm to 1.0 S/cm, or $1.0 \times 10^{-3}$ S/cm to 1.0 S/cm at room temperature, e.g., at 25° C. The at least one perovskite compound may have an electronic conductivity of, for example, $1.0 \times 10^{-9}$ S/cm to $1.0 \times 10^{-1}$ S/cm, $1.0 \times 10^{-9}$ S/cm to $1.0 \times 10^{-2}$ S/cm, or $1.0 \times 10^{-9}$ S/cm to $1.0 \times 10^{-3}$ S/cm at room temperature, e.g., at 25° C. As the perovskite compound has a high electronic conductivity within these ranges, a cathode and a lithium-air battery each including the perovskite compound may have reduced internal resistance.

The perovskite compound may have an ionic conductivity of, for example, about $2.0 \times 10^{-7}$ S/cm or greater e.g., about $10^{-3}$ S/cm, about $5.0 \times 10^{-7}$ S/cm or greater, about $1.0 \times 10^{-6}$ S/cm or greater, about $5.0 \times 10^{-6}$ S/cm or greater, or about $1.0 \times 10^{-5}$ S/cm or greater at room temperature, e.g., at 25° C. The at least one perovskite compound may have an ionic conductivity of, for example, $5.0 \times 10^{-7}$ S/cm to $1.0 \times 10^{-1}$ S/cm, $1.0 \times 10^{-6}$ S/cm to $1.0 \times 10^{-1}$ S/cm, $5.0 \times 10^{-6}$ S/cm to $1.0 \times 10^{-1}$ S/cm, or $1.0 \times 10^{-5}$ S/cm to $1.0 \times 10^{-1}$ S/cm at room temperature, e.g., at 25° C. The at least one perovskite compound may have an ionic conductivity of, for example, $1.0 \times 10^{-7}$ S/cm to $1.0 \times 10^{-2}$ S/cm, $1.0 \times 10^{-7}$ S/cm or to $1.0 \times 10^{-3}$ S/cm, or $1.0 \times 10^{-7}$ S/cm to $1.0 \times 10^{-4}$ S/cm at room temperature, e.g., at 25° C. As the perovskite compound has a high ionic conductivity within these ranges, a cathode and a lithium-air battery each including the perovskite compound may have further reduced internal resistance.

In an embodiment, the lithium-containing metal oxide of the cathode may include a layered compound represented by Formula 5.

$$Li_{1+x}M_{1+y}O_{2-b}$$ Formula 5

In Formula 5, M may be at least one metal element belonging to Group 2 to Group 16 of the periodic table of the elements, b may be oxygen vacancy, 0<x<0.5, 0<y<1, and 0≤δ≤1.

The layered compound may be a compound having a layered crystal structure.

For example, the layered compound may be a compound represented by one of the following formula: $Li_aA_{1-b}B'_bD_2$ (wherein 0.90≤a≤1.8, and 0≤b≤0.5); $Li_aE_{1-b}B'_bO_{2-c}D_c$ (wherein 0.90≤a≤1.8, 0≤b≤0.5, and 0≤c≤0.05); $LiE_{2-b}B'_bO_{4-c}D_c$ (wherein 0≤b≤0.5, and 0≤c≤0.05); $Li_aNi_{1-b-c}Co_bB'_cD_α$ (wherein 0.90≤a≤1.8, 0≤b≤0.5, 0≤c≤0.05, and 0<α≤2); $Li_aNi_{1-b-c}Co_bB'_cO_{2-α}F_α$ (wherein 0.90≤a≤1.8, 0≤b≤0.5, 0≤c≤0.05, and 0<α≤2); $Li_aNi_{1-b-c}Co_bB'_cO_{2-α}F'_2$ (wherein 0.90≤a≤1.8, 0≤b≤0.5, 0≤c≤0.05, and 0<α<2); $Li_aNi_{1-b-c}Mn_bB'_cD_α$ (wherein 0.90≤a≤1.8, 0≤b≤0.5, 0≤c≤0.05, and 0<α≤2); $Li_aNi_{1-b-c}Mn_bB'_cO_{2-α}F_α$ (wherein 0.90≤a≤1.8, 0≤b≤0.5, 0≤c≤0.05, and 0<α<2); $Li_aNi_{1-b-c}Mn_bB'_cO_{2-α}F'_2$ (wherein 0.90≤a≤1.8, 0≤b≤0.5, 0≤c≤0.05, and 0<α<2); $Li_aNi_bE_cG_dO_2$ (wherein 0.90≤a≤1.8, 0≤b≤0.9, 0≤c≤0.5, and 0.001≤d≤0.1); $Li_aNi_bCo_cMn_dGeO_2$ (wherein 0.90≤a≤1.8, 0≤b≤0.9, 0≤c≤0.5, 0≤d≤0.5, and 0.001≤e≤0.1); $Li_aNiG_bO_2$ (wherein 0.90≤a≤1.8, and 0.001≤b≤0.1); $Li_aCoG_bO_2$ (wherein 0.90≤a≤1.8, and 0.001≤b≤0.1); $Li_aMnG_bO_2$ (wherein 0.90≤a≤1.8, and 0.001≤b≤0.1).

For example, the layered compound may be $LiNiO_2$, $LiCoO_2$, $LiMnO_2$, $LiNi_{1-x}Mn_xO_2$ (wherein 0<x<1), $LiNi_{1-x-y}Co_xMn_yO_2$ (wherein 0<x≤0.5 and 0<y≤0.5), $LiNi_{0.8}Co_{0.1}Mn_{0.1}O_2$, or $LiNi_{1-x-y}Co_xAl_yO_2$ (wherein 0<x≤0.5 and 0<y≤0.5). However, embodiments are not limited thereto. Any suitable lithium-containing compound available as a layered compound in the art may be used.

In an embodiment, the lithium-containing metal oxide of the cathode may include an NASICON compound represented by Formula 6.

$$Li_{1+x}A_xM_{2-x}(XO_4)_3$$ Formula 6

In Formula 6, A and M may each independently be at least one metal element belonging to Group 2 to Group 16 of the periodic table of the elements; X may be As, P, Mo, or S; and 0<x<1.0.

The NASICON compound may be a compound having an NASICON crystal structure or an NASICON-type crystal structure.

For example, the NASICON compound may be $Li_{1.3}Al_{0.3}Ti_{1.7}(PO_4)_3$, $Li_{1.3}Al_{0.3}Ge_{1.7}(PO_4)_3$, or $Li_{1.3}Al_{0.3}Zr_{1.7}(PO_4)_3$. However, embodiments are not limited thereto. Any suitable lithium-containing compound available as an NASICON compound in the art may be used.

In an embodiment, the lithium-containing metal oxide may include a LISICON compound represented by Formula 7.

$$Li_{8-c}A_aM_bO_4 \quad \text{Formula 7}$$

In Formula 11, A and M may each independently be at least one metal element belonging to Group 2 to Group 16 of the periodic table of the elements; c=ma+nb, m may be an oxidation number of A, and n may be an oxidation number of M; and 0<x<8, 0<a≤1, and 0≤b≤1.

The LISICON compound may be a compound having a LISICON crystal structure or a LISICON-type crystal structure.

For example, the LISICON compound may be $Li_4SiO_4$, $Li_{3.75}Si_{0.75}P_{0.25}O_4$, $Li_{14}Zn(GeO_4)_4Li_{3.4}V_{0.6}Ge_{0.4}O_4$, or $Li_{3.5}V_{0.5}Ti_{0.5}O_4$. However, embodiments are not limited thereto. Any suitable lithium-containing compound available as a LISICON compound in the art may be used.

In an embodiment, the lithium-containing metal oxide of the cathode may include a garnet compound represented by Formula 8.

$$Li_xA_3M_2O_{12} \quad \text{Formula 8}$$

In Formula 12, A and M may each independently be at least one metal element belonging to Group 2 to Group 16 of the periodic table of the elements, and 3.0≤x≤7.0.

The garnet compound may be a compound having a garnet crystal structure or a garnet-type crystal structure.

For example, the garnet compound may be $Li_3Tb_3Te_2O_{12}$, $Li_{4.22}Al_{0.26}La_3Zr_2WO_{12}$, $Li_5La_3Nb_2O_{12}$, $Li_6BaLa_2Ta_2O_{12}$, or $Li_7La_3Zr_2O_{12}$. However, embodiments are not limited thereto. Any suitable lithium-containing compound available as a garnet compound in the art may be used.

In an embodiment, the lithium-containing metal oxide of the cathode may include a phosphate compound represented by Formula 13 or Formula 14.

$$Li_{1\pm x}MPO_4 \quad \text{Formula 9}$$

$$Li_2MP_2O_7 \quad \text{Formula 10}$$

In Formulae 9 and 10, M may each independently be at least one metal element belonging to Group 2 to Group 16 of the periodic table of the elements, and 0≤x≤1.0.

The phosphate compound represented by Formula 9 may be an olivine compound. The olivine compound may be a compound having an olivine crystal structure or an olivine-type crystal structure.

For example, the phosphate compound may be $LiFePO_4$, $LiMnPO_4$, $LiCoPO_4$, $LiNiPO_4$, $Li_2MnP_2O_7$, or $Li_2FeP_2O_7$. However, embodiments are not limited thereto. Any suitable lithium-containing compound available as a phosphate compound in the art may be used.

In an embodiment, the lithium-containing metal oxide of the cathode may be a tavorite or triplite compound represented by Formula 11.

$$Li_{1\pm x}M(TO_4)X \quad \text{Formula 11}$$

In Formula 11, M may be at least one metal element belonging to Group 2 to Group 16 of the periodic table of the elements; T may be P or S; X may be F, O, or OH; and 0≤x≤1.0.

The tavorite compound may be a compound having a tavorite crystal structure or a tavorite-type crystal structure. The triplite compound may be a compound having a triplite crystal structure or a triplite-type crystal structure.

For example, the tavorite compound or the triplite compound may be $LiVO(PO_4)$, $LiV(PO_4)F$, $LiFe(SO_4)F$, or $Li_2Fe(PO_4)F$. However, embodiments are not limited thereto. Any suitable lithium-containing compound available as a tavorite compound or a triplite compound in the art may be used. The tavorite compounds or triplite compounds may have the same composition and have different crystal structures.

In an embodiment, the lithium-containing metal oxide of the cathode may include an anti-perovskite compound represented by Formula 12.

$$Li_xM_yOA \quad \text{Formula 12}$$

In Formula 12, M may be at least one metal element belonging to Group 2 to Group 16 of the periodic table of the elements; A may be F, Cl, Br, I, S, Se, or Te; and 2.0≤x≤3.0, and 0≤y≤1.0.

The anti-perovskite compound may be a compound having a perovskite crystal structure or a perovskite-like crystal structure, and in which the positions of cations and anions are opposite to those of a perovskite compound.

For example, the anti-perovskite compound may be $Li_3OCl$, $Li_2OHBr$, $Li_2(OH)_{0.9}F_{0.1}Cl$, or $Li_3OCl_{0.5}Br_{0.5}$. However, embodiments are not limited thereto. Any suitable lithium-containing compound available as an anti-perovskite compound in the art may be used.

In an embodiment, the lithium-containing metal oxide of the cathode may include a silicate compound represented by Formula 13.

$$Li_{2\pm x}MSiO_4 \quad \text{Formula 13}$$

In Formula 13, M may be at least one metal element belonging to Group 2 to Group 16 of the periodic table of the elements, and 0≤x≤1.0.

The silicate compound may be a crystalline compound including $SiO_4^{4-}$ anions.

For example, the silicate compound may be $Li_2MnSiO_4$ or $Li_2FeSiO_4$. However, embodiments are not limited thereto. Any suitable lithium-containing compound available as a silicate compound in the art may be used.

In an embodiment, the lithium-containing metal oxide of the cathode may include a borate compound represented by Formula 14.

$$Li_{1\pm x}MBO_3 \quad \text{Formula 14}$$

In Formula 18, M may be at least one metal element belonging to Group 2 to Group 16 of the periodic table of the elements, and 0≤x≤1.0.

The borate compound may be a crystalline compound including $BO_3^{3-}$ anions.

For example, the borate compound may be $LiFeBO_3$ or $LiCoBO_3$. However, embodiments are not limited thereto. Any suitable lithium-containing compound available as a borate compound in the art may be used.

For example, the layered compound represented by Formula 5, the NASICON compound represented by Formula 6, the LISICON compound represented by Formula 7, the garnet compound represented by Formula 8, the phosphate compound represented by Formula 9 or Formula 10, the tavorite or triplite compound represented by Formula 11, the anti-perovskite compound represented by Formula 12, the silicate compound represented by Formula 13, and/or the borate compound represented by Formula 14 may have an ionic conductivity of about $1.0 \times 10^{-8}$ S/cm or greater, e.g., about $10^{-3}$ S/cm, about $5.0 \times 10^{-8}$ S/cm or greater, about $5.0 \times 10^{-7}$ S/cm or greater, about $1.0 \times 10^{-6}$ S/cm or greater, about $5.0 \times 10^{-6}$ S/cm or greater, or about $1.0 \times 10^{-5}$ S/cm or greater at room temperature, e.g., at 25° C. The at least one of the compounds of Formula 5 to Formula 14 may have an ionic conductivity of, for example, $1.0 \times 10^{-8}$ S/cm to $1.0 \times 10^{-1}$ S/cm, $5.0 \times 10^{-8}$ S/cm to $1.0 \times 10^{-1}$ S/cm, $1.0 \times 10^{-7}$ S/cm to $1.0 \times 10^{-1}$ S/cm, $5.0 \times 10^{-7}$ S/cm to $1.0 \times 10^{-1}$ S/cm, $1.0 \times 10^{-6}$ S/cm to $1.0 \times 10^{-1}$ S/cm, $5.0 \times 10^{-6}$ S/cm to $1.0 \times 10^{-1}$ S/cm, or $1.0 \times 10^{-5}$ S/cm to $1.0 \times 10^{-1}$ S/cm at room temperature, e.g., at 25° C. The at least one of the compounds of Formula 5 to Formula 14 may have an ionic conductivity of, for example, $1.0 \times 10^{-8}$ S/cm to $1.0 \times 10^{-2}$ S/cm, $1.0 \times 10^{-8}$ S/cm or to $1.0 \times 10^{-3}$ S/cm, or $1.0 \times 10^{-8}$ S/cm to $1.0 \times 10^{-4}$ S/cm at room temperature, e.g., at 25° C. As the compounds of Formula 5 to Formula 14 have a high ionic conductivity within these ranges, a cathode and a lithium-air battery each including at least one of the compounds of Formula 5 to Formula 14 may have further reduced internal resistance. For example, the layered compound represented by Formula 5, the NASICON compound represented by Formula 6, the LISICON compound represented by Formula 7, the garnet compound represented by Formula 8, the phosphate compound represented by Formula 9 or Formula 10, the tavorite or triplite compound represented by Formula 11, the anti-perovskite compound represented by Formula 12, the silicate compound represented by Formula 13, and/or the borate compound represented by Formula 14 may have an electronic conductivity of about $1.0 \times 10^{-9}$ S/cm or greater, e.g., about $10^{-3}$ S/cm, $5.0 \times 10^{-9}$ S/cm or greater, about $1.0 \times 10^{-8}$ S/cm or greater, about $5.0 \times 10^{-8}$ S/cm or greater, about $5.0 \times 10^{-7}$ S/cm or greater, about $1.0 \times 10^{-6}$ S/cm or greater, about $5.0 \times 10^{-6}$ S/cm or greater, or about $1.0 \times 10^{-5}$ S/cm or greater at room temperature, e.g., at 25° C. The at least one of the compounds of Formula 5 to Formula 14 may have an electronic conductivity of, for example, $1.0 \times 10^{-9}$ S/cm to 1.0 S/cm, $5.0 \times 10^{-9}$ S/cm to 1.0 S/cm, $1.0 \times 10^{-8}$ S/cm to 1.0 S/cm, $5.0 \times 10^{-8}$ S/cm to 1.0 S/cm, $1.0 \times 10^{-7}$ S/cm to 1.0 S/cm, $5.0 \times 10^{-7}$ S/cm to 1.0 S/cm, $1.0 \times 10^{-6}$ S/cm to 1.0 S/cm, $5.0 \times 10^{-6}$ S/cm to 1.0 S/cm, or $1.0 \times 10^{-5}$ S/cm to 1.0 S/cm at room temperature, e.g., at 25° C. The at least one of the compounds of Formula 5 to Formula 14 may have an electronic conductivity of, for example, $1.0 \times 10^{-9}$ S/cm to $1.0 \times 10^{-1}$ S/cm, $1.0 \times 10^{-9}$ S/cm or to $1.0 \times 10^{-2}$ S/cm, or $1.0 \times 10^{-9}$ S/cm to $1.0 \times 10^{-3}$ S/cm at room temperature, e.g., at 25° C. As the compounds of Formula 5 to Formula 14 have a high electronic conductivity within these ranges, a cathode and a lithium-air battery each including at least one of the compounds of Formula 5 to Formula 14 may have further reduced internal resistance.

In an embodiment, the lithium-containing metal oxide of the cathode may be a mixed conductor having both lithium ionic conductivity and electronic conductivity at the same time. For example, the mixed conductor may have an electronic conductivity of about $1.0 \times 10^{-9}$ S/cm or greater, e.g., about $10^{-3}$ S/cm, and an ionic conductivity of about $1.0 \times 10^{-8}$ S/cm or greater, e.g., about $10^{-3}$ S/cm. For example, the mixed conductor may have an electronic conductivity of about $1.0 \times 10^{-8}$ S/cm or greater and an ionic conductivity of about $2.0 \times 10^{-7}$ S/cm or greater. For example, the mixed conductor may have an electronic conductivity of about $1.0 \times 10^{-7}$ S/cm or greater and an ionic conductivity of about $2.0 \times 10^{-7}$ S/cm or greater at room temperature, e.g., at 25° C. For example, the mixed conductor may have an electronic conductivity of about $1.0 \times 10^{-6}$ S/cm or greater and an ionic conductivity of about $2.0 \times 10^{-6}$ S/cm or greater. As the lithium-containing metal oxide according to one or more embodiments, as a mixed conductor, provides ionic conductivity and electronic conductivity at the same time, a cathode may be implemented using the lithium-containing metal oxide with neither additional conducting agent nor electrolyte.

The electronic conductivity may be determined by an eddy current method or a kelvin bridge method. The electrical conductivity can be determined according to ASTM B-193, "Standard Test Method for Resistivity of Electrical Conductor Materials," e.g., at 25° C., or according to ASTM E-1004, "Standard Test Method for Determining Electrical Conductivity Using the Electromagnetic (Eddy-Current) Method," e.g., at 25° C. Additional details may be determined by one of skill in the art without undue experimentation. Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989.

In an embodiment, the lithium-containing metal oxide of the cathode may be electrochemically stable at about 2.0 V to about 4.0 V with respect to lithium metal and may be a lithium ion conductor.

In an embodiment, the cathode may be porous. As the cathode is porous, diffusion of the air or oxygen into the cathode may be facilitated.

According to an aspect, a lithium-air battery includes: a cathode according to the above-described embodiment; an anode including lithium; and an electrolyte between the cathode and the anode.

As the lithium-air battery according to an embodiment uses the cathode including a lithium-containing metal oxide according to the above-described embodiment, the lithium-air battery may have improved structural stability and deterioration of the lithium-air battery may be suppressed.

In an embodiment, the lithium-air battery may include the cathode according to any of the above-described embodiments. The cathode may be an air electrode. For example, the cathode may be on a cathode current collector.

The cathode may include a lithium-containing metal oxide according to the above-described embodiment. For example, an amount of the lithium-containing metal oxide may be about 1 part to about 100 parts by weight, about 10 parts to about 100 parts by weight, about 50 parts to about 100 parts by weight, about 60 parts to about 100 parts by weight, about 70 parts to about 100 parts by weight, about 80 parts to about 100 parts by weight, or about 90 parts to about 100 parts by weight, with respect to 100 parts by weight of the cathode. For example, the cathode may substantially be composed of the lithium-containing metal oxide according to the above-described embodiment. The cathode, which may be obtained by sintering and/or powder pressing of the lithium-containing metal oxide, may substantially consist of the lithium-containing metal oxide. It may be possible to introduce pores into the cathode by using a pore-forming agent in manufacturing of the cathode. The cathode may be, for example, porous. The cathode may be in the form of, for example, porous pellets or a porous sheet. However, embodiments are not limited thereto. The cathode may be formed according to a desired battery shape. Since the cathode is substantially composed of the lithium-containing metal oxide according to the above-described embodiment, the cathode may have a simplified structure, and manufacturing the cathode may also be simplified. For example, the cathode may be permeable to a gas such as oxygen or the air. Accordingly, the cathode according to the embodiment is distinguished from a cathode that is substantially impervious to gas, such as oxygen or the air, and that has only ionic conductivity. Since the cathode according to an embodiment is porous and/or gas permeable, diffusion of such as oxygen, air, and the like into the cathode may be facilitated. As migration of lithium ions and/or electrons through the lithium-containing metal oxide in the cathode is facilitated, electrochemical reactions involving oxygen, lithium ions, and electrons in the cathode may be facilitated.

In an embodiment, the cathode of the lithium-air battery may further include, for example, a cathode material that is used in the related art, in addition to the lithium-containing metal oxide according to any of the above-described embodiments.

For example, the cathode may further include a conductive material. The conductive material may be, for example, porous. The porosity of the conductive material may facilitate air permeation into the cathode. The conductive material may be any suitable porous and/or conductive material available in the art, for example, may be a carbonaceous material having porosity. The carbonaceous material may be, for example, carbon black, graphite, graphene, activated carbon, carbon fiber, or the like. However, embodiments are not limited thereto. Any suitable carbonaceous material available in the art may be used. The conductive material may be, for example, a metallic material. The metallic material may be, for example, metal fibers, metal meshes, metal powder, or the like. The metal powder may be, for example, copper, silver, nickel, or aluminum powder. The conductive material may be, for example, an organic conductive material. The organic conductive material may be, for example, a polyphenylene derivative, a polythiophene derivative, or the like. The above-listed conductive materials may be used, for example, alone or in combination. The cathode may include a mixed conductor as the conductive material. The cathode may further include any of the above-listed conductive materials, in addition to the mixed conductor.

The cathode may further include, for example, a catalyst for oxidation/reduction of oxygen. The catalyst may be, for example, a precious metal-based catalyst such as platinum, gold, silver, palladium, ruthenium, rhodium, or osmium; an oxide-based catalyst such as manganese oxide, iron oxide, cobalt oxide, or nickel oxide; and an organic metal-based catalyst such as cobalt phthalocyanine. However, embodiments are not limited thereto. Any suitable catalyst available for oxidation/reduction of oxygen in the art may be used.

For example, the catalyst may be supported on a catalyst support. The catalyst support may be, for example, an oxide catalyst support, a zeolite catalyst support, a clay-based mineral catalyst support, a carbon catalyst support, or the like. The oxide catalyst support may be, for example, a metal oxide catalyst support including at least one metal of Al, Si, Zr, Ti, Ce, Pr, Sm, Eu, Tb, Tm, Yb, Sb, Bi, V, Cr, Mn, Fe, Co, Ni, Cu, Nb, Mo, or W. The oxide catalyst support may include, for example, alumina, silica, zirconium oxide, titanium dioxide, or the like. The carbon catalyst support may be a carbon black such as Ketjen black, acetylene black, channel black, and lamp black; graphite such as natural graphite, artificial black, or expandable graphite; activated carbon; or carbon fiber. However, embodiments are not limited thereto. Any suitable catalyst support available in the art may be used.

For example, the cathode may further include a binder. The binder may include, for example, a thermoplastic resin or a thermocurable resin. For example, the binder may be polyethylene, polypropylene, polytetrafluoroethylene (PTFE), polyvinylidene fluoride (PVDF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, or an ethylene-acrylic acid copolymer, which may be used alone or in a combination thereof. However, embodiments are not limited thereto. Any suitable binder available in the art may be used.

For example, the cathode may be manufactured by mixing a conductive material, a catalyst for oxidation/reduction of oxygen, and a binder together, and adding a solvent to the resulting mixture to prepare a cathode slurry, coating the cathode slurry on a surface of a base, drying the coated cathode slurry, and press-molding the cathode slurry against the base to improve a density of the electrode. The base may be, for example, a cathode current collector, a separator, or a solid electrolyte membrane. The cathode current collector may be, for example, a gas diffusion layer. The conductive material may include a mixed conductor. The catalyst for oxidation/reduction of oxygen and the binder may be omitted depending on a type of the cathode.

The lithium-air battery according to an embodiment may include an anode. The anode may include lithium. The anode may be, for example, a lithium metal thin film or a lithium metal-based alloy thin film. For example, the lithium metal-based alloy may be an alloy of lithium with, for example, aluminum, tin, magnesium, indium, calcium, titanium, or vanadium.

The lithium-air battery according to an embodiment may include an electrolyte between the cathode and the anode. The electrolyte, e.g., electrolyte membrane, may include at least one electrolyte of a liquid electrolyte, a gel electrolyte, and a solid electrolyte. The liquid electrolyte, the gel electrolyte, and the solid electrolyte are not particularly limited, and may be any suitable electrolyte available in the art.

The solid electrolyte may include at least one of a solid electrolyte including an ionically conducting inorganic material, a solid electrolyte including a polymeric ionic liquid (PIL) and a lithium salt, a solid electrolyte including the ionically conducting polymer and a lithium salt, a solid electrolyte including an electronically conducting polymer. However, embodiments are not limited thereto. Any suitable material available as a solid electrolyte in the art may be used.

The ionically conducting inorganic material may include at least one of a glassy or amorphous active metal ionic conductor, a ceramic active metal ionic conductor, and a glass-ceramic active metal ionic conductor. However, embodiments are not limited thereto. Any suitable ionically conducting inorganic material available in the art may be used. The ionically conducting inorganic material may be, for example, ionically conducting inorganic particles or a molded product of the particles in a form of sheet.

The ionically conducting inorganic material may be, for example, $BaTiO_3$, $Pb(Zr,Ti)O_3$ (PZT), $Pb_{1-x}La_xZr_{1-y}Ti_yO_3$ (PLZT, wherein $0 \leq x < 1$, $0 \leq y < 1$), $Pb(Mg_3Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al,Ga)_x(Ti,Ge)_{2-x}Si_yP_{3-y}O_{12}$ (wherein $0 \le x \le 1$ and $0 \le y \le 1$), lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$ and $0<y<2$), a $SiS_2$ ($Li_xSi_yS_z$, wherein $0<x<3$, $0<y<2$, and $0<z<4$) glass, a $P_2S_5$ ($Li_xP_yS_z$, wherein $0<x<3$, $0<y<3$, and $0<z<7$) glass, $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, a garnet ceramic ($Li_{3+x}La_3M_2O_{12}$, wherein $0 \le x \le 5$ and M=Te, Nb, or Zr), or a combination thereof.

The polymeric ionic liquid (PIL) may include, for example, a repeating unit including: i) at least one cation of an ammonium-based cation, a pyrrolidinium-based cation, a pyridinium-based cation, pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazole-based cation; and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$. For example, the PIL may include poly(diallyldimethylammonium) (TFSI), poly(1-allyl-3-methylimidazolium trifluoromethanesulfonylimide), or poly((N-Methyl-N-propylpiperidinium bis (trifluoromethanesulfonyl)imide)).

The ionically conducting polymer may include, for example, at least one ion conductive repeating unit of an ether-based monomer, an acryl-based monomer, a methacryl-based monomer, or a siloxane-based monomer.

The ionically conducting polymer may be, for example, polyethylene oxide (PEO), polyvinyl alcohol (PVA), polyvinylpyrrolidone (PVP), polysulfone, polypropylene oxide (PPO), polymethylmethacrylate, polyethylmethacrylate, polydimethylsiloxane, polyacrylic acid, polymethacrylic acid, polymethyl acrylate, polyethylacrylate, poly 2-ethylhexyl acrylate, polybutyl methacrylate, poly 2-ethylhexyl methacrylate, polydesyl acrylate, polyethylene vinyl acetate, polymeric phosphate ester, polyester sulfide, polyvinylidene fluoride (PVdF), Li-substituted Nafion, or the like. However, embodiments are not limited thereto. Any material available as an ionically conducting polymer in the art may be used.

The electronically conducting polymer may be, for example, a polyphenylene derivative, a polythiophene derivative, or the like. However, embodiments are not limited thereto. Any electronically conducting polymer available in the art may be used.

For example, the gel electrolyte may be obtained by adding a low-molecular weight solvent to the solid electrolyte disposed between the cathode and the anode. For example, the gel electrolyte may be a gel electrolyte obtained by adding a low-molecular weight organic compound such as a solvent, an oligomer and the like into a polymer, for example, a polymer electrolyte as listed above.

For example, the liquid electrolyte may include a solvent and a lithium salt. The solvent may include at least one of an organic solvent, an ionic liquid, or an oligomer. However, embodiments are not limited thereto. Any solvents available in the art that are in liquid form at room temperature (25° C.) may be used.

The organic solvent may include, for example, at least one of an ether-based solvent, a carbonate-based solvent, an ester-based solvent, or a ketone-based solvent. For example, the organic solvent may include at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethyl ether, diethyl ether, dibutyl ether, dimethoxyethane, 2-methyltetrahydrofuran, or tetrahydrofuran. However, embodiments are not limited thereto. The organic solvent may be any organic solvent available in the art that is in liquid form at room temperature.

For example, the ionic liquid (IL) may include: i) at least one cation of an ammonium-based cation, a pyrrolidinium-based cation, a pyridinium-based cation, pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazole-based cation; and ii) at least one anion of ii) $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$.

The lithium salt may include, for example, at least one of lithium bis(trifluoromethanesulfonyl)imide (LiTFSI), $LiPF_6$, $LiBF_4$, $LiAsF_6$, $LiClO_4$, $LiNO_3$, lithium bis(oxalato) borate (LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or lithium trifluoromethanesulfonate (LiTfO). However, embodiments are not limited in the art. Any material available as lithium salt in the art may be used. A concentration of the lithium salt may be, for example, about 0.01 M to about 5.0 M.

In an embodiment, the lithium-air battery may further include, for example, a separator between the cathode and the anode. The separator may be any separator having a composition durable under usage environments of a lithium-air battery. For example, the separator may be a polymeric non-woven fabric such as polypropylene non-woven fabric or polyphenylene sulfide non-woven fabric; a porous film of an olefin-based resin such as polyethylene or polypropylene; glass fiber; or a combination of at least two of these materials.

For example, the electrolyte membrane may have a structure including a separator impregnated with a solid polymer electrolyte or a liquid electrolyte. The electrolyte membrane including a separator impregnated with a solid polymer electrolyte may be prepared by arranging a solid polymer electrolyte films on one or both surfaces of the separator and then performing roll-pressing thereon at the same time. In some embodiments, the electrolyte membrane including a separator impregnated with a liquid electrolyte may be prepared by injecting the liquid electrolyte including a lithium salt into the separator.

After the anode is mounted on an inner side of a case, the electrolyte membrane may be arranged on the anode, followed by arranging the cathode on the electrolyte membrane, arranging a porous cathode current collector on the cathode, and arranging a pressing member that allows transfer of air into the air electrode (i.e., cathode) and pushing the porous cathode current collector with the pressing member to fix the cell, thereby completing manufacturing of the lithium-air battery. The case may be divided into an upper portion that contacts the anode, and a lower portion that contacts the air electrode. An insulting resin may be disposed between the upper and lower portions of the case to electrically insulate the cathode and the anode from one another.

In an embodiment, the lithium-air battery may be used as a lithium primary battery or a lithium secondary battery. The lithium-air battery may have any of various shapes, not limited to a specific shape, for example, a shape like a coin, a button, a sheet, a stack, a cylinder, a plane, or a horn. The lithium-air battery may be used in a large battery for electric vehicles.

Figure 5:
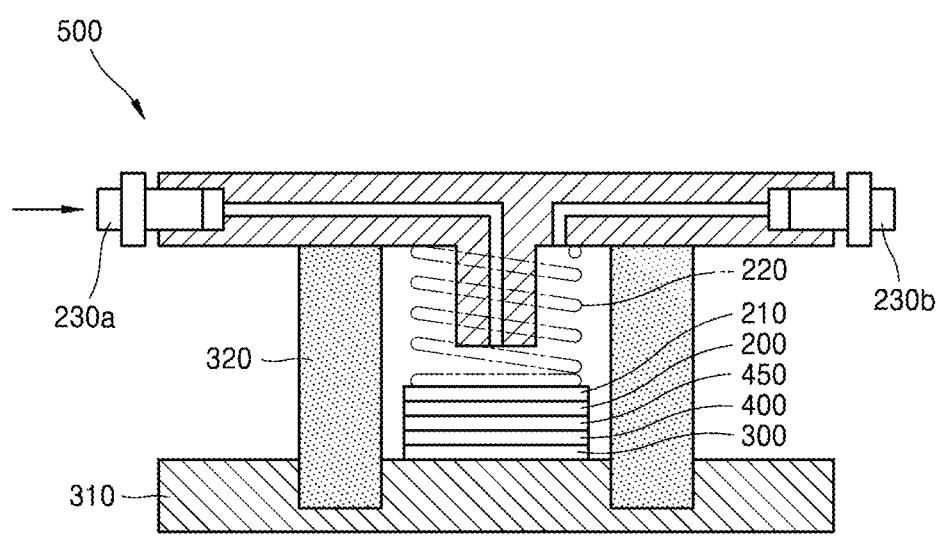
FIG. 5 is a schematic view illustrating a structure of a lithium-air battery according to an embodiment.

FIG. 5 is a schematic view of a lithium-air battery 500 according to an embodiment. Referring to FIG. 5, the lithium-air battery 500 may include a cathode 200 adjacent to a first current collector 210 and using oxygen as an active material, an anode 300 adjacent to a second current collector 310 and including lithium, and a first electrolyte membrane 400 disposed between the cathode 200 and the anode 300. The first electrolyte membrane 400 may be a separator impregnated with a liquid electrolyte. A second electrolyte membrane 450 may be disposed between the cathode 200 and the first electrolyte membrane 400. The second electrolyte membrane 450 may be a lithium ion conductive solid electrolyte membrane. The first current collector 210, which may be porous, may serve as a gas diffusion layer that allows diffusion of oxygen. A pressing member 210 that may transport air to the cathode 200 may be arranged on the first current collector 210. A case 320 made of an insulating resin may be disposed between the cathode 200 and the anode 300 to electrically insulate the cathode 200 and the anode 300 from one another. The air may be supplied into the lithium-air battery 500 through an air inlet 230a and may be discharged through an air outlet 230b. The lithium-air battery 500 may be accommodated in a stainless steel (SUS) container.

The term "air" of the lithium-air battery used herein is not limited to atmospheric air, and for convenience, may refer to a combination of gases including oxygen, or pure oxygen gas. This broad definition of "air" also applies to other terms, including "air battery" and "air electrode."

An embodiment will now be described in detail with reference to the following examples. However, these examples are only for illustrative purposes and are not intended to limit the scope of the one or more embodiments of the present inventive concept.

EXAMPLES

Preparation of Lithium-Containing Metal Oxide

Preparation Example 1: Preparation of Spinel Compound ($Li_{4.5}Ti_{4.5}Nb_{0.5}O_{12-\delta}$)

$Li_2CO_3$ as a lithium (Li) precursor, $TiO_2$ as a titanium (Ti) precursor, and $Nb_2O_5$ as a niobium (Nb) precursor were mixed in a stoichiometric ratio, followed by adding ethanol and grinding and mixing with a ball mill containing zirconia balls at about 280 rpm for about 4 hours to obtain a mixture. The obtained mixture was dried at about 90° C. for about 6 hours, and then thermally treated under the air atmosphere at about 700° C. for about 5 hours (First heat treatment). A product resulting from the first heat treatment was grinded using a ball mill and then pressed at an isostatic pressure, thereby preparing pellets. The prepared pellets were thermally treated under reducing atmosphere at about 950° C. for about 24 hours (Second heat treatment) to prepare a mixed conductor. The reducing atmosphere consisted of about 5% of hydrogen and about 95% of argon. The prepared lithium-containing metal oxide as the mixed conductor had a composition represented by $Li_{4.5}Ti_{4.5}Nb_{0.5}O_{12-\delta}$ (wherein $0<\delta\leq 3$).

Preparation Example 2: Preparation of Spinel Compound ($Li_{3.5}Ti_{4.0}Nb_{1.0}O_{12-\delta}$)

A mixed conductor was prepared in the same manner as in Preparation Example 1, except that the stoichiometric ratio of the Li precursor, the Ti precursor, and the Nb precursor was changed to correspond to $Li_{3.5}Ti_{4.0}Nb_{1.0}O_{12-\delta}$. The prepared lithium-containing metal oxide had a composition represented by $Li_{3.5}Ti_{4.0}Nb_{1.0}O_{12-\delta}$ (wherein $0<\delta\leq 3$).

Preparation Example 3: Preparation of Spinel Compound ($Li_{3.5}Ti_{4.0}Ta_{1.0}O_{12-\delta}$)

A mixed conductor was prepared in the same manner as in Preparation Example 1, except that $Ta_2O_5$ as a tantalum (Ta) precursor was used instead of the Nb precursor, and the Li precursor, the Ti precursor, and the Ta precursor were mixed in a stoichiometric ratio different from that of Preparation Example 1 to correspond to $Li_{3.5}Ti_{4.0}Ta_{1.0}O_{12-\delta}$. The prepared lithium-containing metal oxide had a composition represented by $Li_{3.5}Ti_{4.0}Ta_{1.0}O_{12-\delta}$ (wherein $0<\delta\leq 3$).

Preparation Example 4: Preparation of Spinel Compound ($Li_{4.5}Ti_{4.5}Gd_{0.5}O_{12-\delta}$)

A mixed conductor was prepared in the same manner as in Preparation Example 1, except that $Gd_2O_3$ as a gadolinium (Gd) precursor was used instead of the Nb precursor. The prepared lithium-containing metal oxide had a composition represented by $Li_{4.5}Ti_{4.5}Gd_{0.5}O_{12-\delta}$ (wherein $0<\delta\leq 3$).

Preparation Example 5: Preparation of Spinel Compound ($Li_{5.0}Ti_{4.0}Gd_{1.0}O_{12-\delta}$)

A mixed conductor was prepared in the same manner as in Preparation Example 1, except that $Gd_2O_3$ as a Gd precursor was used instead of the Nb precursor, and the Li precursor, the Ti precursor, and the Gd precursor were used in a stoichiometric ratio different from that of Preparation Example 1. The prepared lithium-containing metal oxide had a composition represented by $Li_{5.0}Ti_{4.0}Gd_{1.0}O_{12-\delta}$ (wherein $0<\delta\leq3$).

Preparation Example 6: Preparation of Spinel Compound ($Li_{4.5}Ti_{4.5}In_{0.5}O_{12-\delta}$)

A mixed conductor was prepared in the same manner as in Preparation Example 1, except that $In_2O_3$ as an indium (In) precursor was used instead of the Nb precursor. The prepared lithium-containing metal oxide had a composition represented by $Li_{4.5}Ti_{4.5}Nb_{0.5}O_{12-\delta}$ (wherein $0<\delta\leq3$).

Preparation Example 7: Preparation of Spinel Compound ($Li_{5.0}Ti_{4.0}In_{1.0}O_{12-\delta}$)

A mixed conductor was prepared in the same manner as in Preparation Example 1, except that $In_2O_3$ as an indium (In) precursor was used instead of the Nb precursor, and the Li precursor, the Ti precursor, and the In precursor were mixed in a stoichiometric ratio different from that of Preparation Example 1. The prepared lithium-containing metal oxide had a composition represented by $Li_{5.0}Ti_{4.0}In_{1.0}O_{12-\delta}$ (wherein $0<\delta\leq3$).

Preparation Example 8: Preparation of Spinel Compound ($Li_4Ti_5O_{12}$)

Commercially purchased $Li_4Ti_5O_{12}$ itself was used as a spinel compound.

Preparation Example 9: Preparation of Perovskite Compound ($Li_{0.34}La_{0.55}TiO_3$)

$Li_2CO_3$, $La_2O_3$, $TiO_2$ powder were mixed with ethanol according to the composition ratio of $Li_{0.34}La_{0.55}TiO_3$. The amount of the ethanol was about 4 parts by weight with respect to 100 parts by weight of a total weight of $Li_2CO_3$, $La_2O_3$, and $TiO_2$ powder.

The mixture was then ground and mixed in a ball-milling apparatus. The mixed product was dried and then heated at a heating rate of about 5° C./min to about 800° C., followed by first heat treatment under the air atmosphere for about 4 hours.

The powder obtained from the first thermal treatment was grinded to prepare powder having a primary particle size of about 0.3 μm. The prepared powder was pressed to form cylindrical pellets having a diameter of about 1.3 cm, a height of about 0.5 cm, and a weight of about 0.3 g. The obtained pellets were subjected to secondary heat treatment under the air atmosphere at about 1100° C. for about 24 hours to obtain a target product (i.e., mixed conductor). In the secondary heat treatment, a heating rate to 1100° C. was about 5° C./min. The prepared lithium-containing metal oxide had a composition represented by $Li_{0.34}La_{0.55}TiO_3$.

Preparation Example 10: Preparation of Perovskite Compound ($Li_{0.34}La_{0.55}RuO_{3-\delta}$)

A target product (i.e., mixed conductor) was obtained in the same manner as in Preparation Example 9, except that $RuO_2$ was used instead of $TiO_2$, and the second heat treatment was performed at about 1200° C. The prepared lithium-containing metal oxide had a composition represented by $Li_{0.34}La_{0.55}RuO_{3-\delta}$ (wherein $0<\delta\leq3$).

Preparation Example 11: Preparation of Perovskite Compound ($Li_{0.34}La_{0.55}MnO_{3-\delta}$)

A target product was obtained in the same manner as in Preparation Example 9, except that $MnO_2$ was used instead of $TiO_2$, and the second heat treatment was performed at about 1200° C. The prepared lithium-containing metal oxide had a composition represented by $Li_{0.34}La_{0.55}MnO_{3-\delta}$ (wherein $0<\delta\leq3$).

Preparation Example 12: Preparation of Perovskite Compound ($Li_{0.34}La_{0.55}NiO_{3-\delta}$)

A target product was obtained in the same manner as in Preparation Example 9, except that $Ni(OH)_2$ was used instead of $TiO_2$, and the second heat treatment was performed at about 1200° C. The prepared lithium-containing metal oxide had a composition represented by $Li_{0.34}La_{0.55}NiO_{3-\delta}$ (wherein $0<\delta\leq3$).

Preparation Example 13: Preparation of Perovskite Compound ($Li_{0.34}La_{0.55}CrO_{3-\delta}$)

A target product was obtained in the same manner as in Preparation Example 9, except that $Cr_2O_3$ was used instead of $TiO_2$, and the second heat treatment was performed at about 1200° C. The prepared lithium-containing metal oxide had a composition represented by $Li_{0.34}La_{0.55}CrO_{3-\delta}$ (wherein $0<\delta\leq3$).

Preparation Example 14: Preparation of Perovskite Compound ($Li_{0.34}La_{0.55}IrO_{3-\delta}$)

A target product was obtained in the same manner as in Preparation Example 9, except that $IrO_2$ was used instead of $TiO_2$, and the second heat treatment was performed at about 1200° C. The prepared lithium-containing metal oxide had a composition represented by $Li_{0.34}La_{0.55}IrO_{3-\delta}$ (wherein $0<\delta\leq3$).

Preparation Example 15: Preparation of Perovskite Compound ($Li_{0.34}La_{0.55}CoO_{3-\delta}$)

A target product was obtained in the same manner as in Preparation Example 9, except that $Co_2O_3$ was used instead of $TiO_2$, and the second heat treatment was performed at about 1200° C. The prepared lithium-containing metal oxide had a composition represented by $Li_{0.34}La_{0.55}CoO_{3-\delta}$ (wherein $0<\delta\leq3$).

Manufacturing of Cathode

Example 1

After grinding the lithium-containing metal oxide ($Li_{4.5}Ti_{4.5}Nb_{0.5}O_{12-\delta}$) prepared in Preparation Example 1, the obtained powder was thermally treated under the air atmosphere at about 800° C. for about 60 minutes to thereby manufacture a cathode having a weight of about 3 mg/cm² per unit area or a thickness of about 10 μm. The manufactured cathode was a porous cathode including about 20% by volume of pores.

Examples 2 to 8

Cathodes were manufactured in the same manner as in Example 1, except that the lithium-containing metal oxides prepared in Preparation Examples 2 to 8 were used, respectively.

Examples 9 to 15

Cathodes were manufactured in the same manner as in Example 1, except that the lithium-containing metal oxides prepared in Preparation Examples 9 to 15 were used, respectively, and the thermal treatment was performed at about 1000° C.

Manufacturing of Lithium-Air Battery

Example 16: Manufacturing of Lithium-Air Battery (Cathode/LATP/PEO/Li Anode)

A lithium-aluminum-titanium-phosphate (LATP) layer (having a thickness of about 250 μm, available from Ohara Corp., Japan) was arranged as a solid electrolyte membrane under the cathode ($Li_4Ti_5O_{12}$) manufactured in Example 8, followed by sintering at about 800° C. for about 60 minutes to thereby prepare a stack of cathode/solid electrolyte membrane.

A polymer electrolyte was arranged as an anode intermediate layer under the solid electrolyte membrane. The polymer electrolyte was prepared by mixing polyethylene oxide (Mn=100,000 Daltons) and lithium bis(trifluoromethylsulonly)imide (LiTFSI) as a lithium salt in an EO/Li molar ratio of 20:1.

A lithium metal foil was arranged under the polymer electrolyte, and a gas diffusion layer (GDL) (25BC, available from SGL) was attached to an upper surface of the cathode. A nickel mesh was arranged on the GDL, and then pressed with a pressing member that allows transfer of air to the cathode to fix the cell, thereby manufacturing a lithium-air battery.

Example 17: Manufacturing of Lithium-Air Battery (Cathode/PEOM-PDMS/LATP/PEO/Li Anode)

A first polymer electrolyte as a cathode intermediate layer and a second polymer electrolyte as an anode intermediate layer were arranged on upper and lower surfaces of a lithium-aluminum-titanium-phosphate (LATP) layer (having a thickness of about 250 μm, available from Ohara Corp., Japan) serving as a solid electrolyte membrane, respectively.

The first polymer electrolyte was prepared by mixing polyoxyethylene methacrylate polydimethyl siloxane (Mn=100,000 Daltons) and lithium bis(trifluoromethylsulonly)imide (LiTFSI) as a lithium salt in an EO/Li molar ratio of 20:1. The second polymer electrolyte was prepared by mixing polyethylene oxide (Mn=100,000 Daltons) and lithium bis(trifluoromethylsulonly)imide (LiTFSI) as a lithium salt in an EO/Li molar ratio of 20:1.

The cathode ($Li_{0.34}La_{0.55}TiO_3$) manufactured in Example 9 was arranged on an upper surface of the first polymer electrolyte serving as the cathode intermediate layer.

A lithium metal foil was arranged under the second polymer electrolyte serving as the anode intermediate layer, and a gas diffusion layer (GDL) (25BC, available from SGL) was attached to an upper surface of the cathode. A nickel mesh was arranged on the GDL, and then pressed with a pressing member that allows transfer of air to the cathode to fix the cell, thereby manufacturing a lithium-air battery.

Example 18: Manufacturing of Lithium-Air Battery

A lithium-air battery was manufactured in the same manner as in Example 17, except that the cathode ($Li_{0.34}La_{0.55}RuO_{3-\delta}$) manufactured in Example 10 was used.

Example 19: Manufacturing of Lithium-Air Battery

A lithium-air battery was manufactured in the same manner as in Example 17, except that the cathode ($Li_{0.34}La_{0.55}MnO_{3-\delta}$) manufactured in Example 11 was used.

Evaluation Example 1: Electronic Conductivity Evaluation

Gold (Au) sputtering was performed on both sides of the spinel compound pellets prepared in Preparation Examples 1 to 9 and the perovskite compound pellets prepared in Preparation Examples 10 to 15 to thereby complete manufacturing of ion-blocking cells. Electronic conductivities of the pellets were measured using a direct current (DC) polarization method at room temperature, e.g., at 25° C.

A time-dependent current was measured while applying a constant voltage of about 100 mV to each of the completed symmetry cells. After calculating an electronic resistance of each of the mixed conductors based on the measured current, an electronic conductivity was calculated from the electronic resistance. The obtained electronic conductivities are represented in Tables 1 and 2.

Evaluation Example 2: Ionic Conductivity Evaluation

A separator impregnated with a liquid electrolyte (1M LiTFSI in propylene carbonate (PC)) (i.e., electrolyte membrane) was disposed on both sides of the spinel compound pellets prepared in Preparation Examples 1 to 9 and the perovskite compound pellets prepared in Preparation Examples 10 to 15 and SUS current collectors are disposed on the electrolyte membranes thereby completing manufacturing of electron-blocking cells (i.e., symmetry cell). Ionic conductivities of the pellets were measured using a direct current (DC) polarization method at room temperature, e.g., at 25° C.

A time-dependent current was measured while applying a constant voltage of about 100 mV to each of the completed symmetry cells. After calculating an ionic resistance of each cell based on the measured current, an ionic resistance of each of the mixed conductors was calculated by subtraction of an ionic resistance of the solid electrolyte membrane from the ionic resistance of the cell, and an ionic conductivity was calculated from the ionic resistance. The obtained ionic conductivities are represented in Tables 1 and 2.

TABLE 1

| Example | Composition | Electronic conductivity [S/cm] | Ionic conductivity [S/cm] |
| --- | --- | --- | --- |
| Preparation Example 1 | $Li_{4.5}Ti_{4.5}Nb_{0.5}O_{12-\delta}$ | $1.4 \times 10^{-3}$ | $4.7 \times 10^{-5}$ |
| Preparation Example 2 | $Li_{3.5}Ti_{4.0}Nb_{1.0}O_{12-\delta}$ | $3.5 \times 10^{-4}$ | $2.0 \times 10^{-7}$ |
| Preparation Example 3 | $Li_{3.5}Ti_{4.0}Ta_{1.0}O_{12-\delta}$ | $1.2 \times 10^{-4}$ | $1.8 \times 10^{-7}$ |

TABLE 1-continued

| Example | Composition | Electronic conductivity [S/cm] | Ionic conductivity [S/cm] |
|---|---|---|---|
| Preparation Example 4 | $Li_{4.5}Ti_{4.5}Gd_{0.5}O_{12-\delta}$ | $2.1 \times 10^{-4}$ | $3.2 \times 10^{-7}$ |
| Preparation Example 5 | $Li_{5.0}Ti_{4.0}Gd_{1.0}O_{12-\delta}$ | $9.6 \times 10^{-6}$ | $5.1 \times 10^{-6}$ |
| Preparation Example 6 | $Li_{4.5}Ti_{4.5}In_{0.5}O_{12-\delta}$ | $7.4 \times 10^{-5}$ | $8.1 \times 10^{-7}$ |
| Preparation Example 7 | $Li_{5.0}Ti_{4.0}In_{1.0}O_{12-\delta}$ | $1.1 \times 10^{-5}$ | $2.9 \times 10^{-6}$ |
| Preparation Example 8 | $Li_4Ti_5O_{12}$ | $4.3 \times 10^{-9}$ | $6.8 \times 10^{-8}$ |

Referring to Table 1, the spinel compounds prepared in Preparation Examples 1 to 8 were found to be crystalline ionic conductors with an ionic conductivity of about $1 \times 10^8$ or greater.

The spinel compounds of Preparation Examples 1 to 7 were found to be improved in both electronic conductivity and ionic conductivity, as compared with the spinel compound used in Preparation Example 8.

TABLE 2

| Example | Composition | Electronic conductivity [S/cm] | Ionic conductivity [S/cm] |
|---|---|---|---|
| Preparation Example 9 | $Li_{0.34}La_{0.55}TiO_3$ | $3.8 \times 10^{-9}$ | $1.2 \times 10^{-5}$ |
| Preparation Example 10 | $Li_{0.34}La_{0.55}RuO_{3-\delta}$ | $5.6 \times 10^{-2}$ | $2.1 \times 10^{-5}$ |
| Preparation Example 11 | $Li_{0.34}La_{0.55}MnO_{3-\delta}$ | $2.0 \times 10^{-3}$ | $8.8 \times 10^{-5}$ |
| Preparation Example 12 | $Li_{0.34}La_{0.55}NiO_{3-\delta}$ | $2.8 \times 10^{-2}$ | $3.0 \times 10^{-6}$ |
| Preparation Example 13 | $Li_{0.34}La_{0.55}CrO_{3-\delta}$ | $2.6 \times 10^{-4}$ | $2.0 \times 10^{-6}$ |
| Preparation Example 14 | $Li_{0.34}La_{0.55}IrO_{3-\delta}$ | $4.3 \times 10^{-3}$ | $1.7 \times 10^{-5}$ |
| Preparation Example 15 | $Li_{0.34}La_{0.55}CoO_{3-\delta}$ | $4.5 \times 10^{-4}$ | $4.6 \times 10^{-6}$ |

Referring to Table 2, the perovskite compounds of Preparation Examples 9 to 15 were found to be crystalline ionic conductors with an ionic conductivity of about $1 \times 10^{-7}$ S/cm or greater.

The perovskite compounds of Preparation Examples 10 to 15 were found to have remarkably improved electronic conductivities, as compared with the perovskite compound of Preparation Example 9.

Evaluation Example 3: X-Ray Diffraction (XRD) Spectrometry

The spinel compounds of Preparation Examples 1, 2, 3, and 8 were analyzed by X-ray diffraction (XRD) spectrometry. The results are shown in FIG. 1. The XRD spectrometry was performed with Cu Kα radiation.

Referring to FIG. 1, the spinel compound ($Li_4Ti_5O_{12}$) of Preparation Example 8 exhibited a peak corresponding to a spinel crystal structure. The spinel compounds of Preparation Examples 1 to 3 also exhibited similar spectra to the spinel compound ($Li_4Ti_5O_{12}$) of Preparation Example 8.

Referring to FIG. 1, the spinel compounds of Preparation Examples 1 to 3 also exhibited a new peak at a diffraction angle (2θ) of about 23.5°±2.5° with a peak intensity ($I_b$) greater than a peak intensity ($I_a$) of the (111) crystal plane. That is, in the spinel compounds of Examples 1 to 3, a ratio ($I_a/I_b$) of a peak intensity ($I_a$) of the (111) crystal plane at a diffraction angle (2θ) of about 18°±2.5° to a peak intensity ($I_b$) at a diffraction angle (2θ) of about 23.5°±2.5° was about 1 or less.

The perovskite compounds of Preparation Examples 9 to 15 were analyzed by XRD spectrometry. The results are shown in FIG. 2. The XRD spectrometry was performed with Cu Kα radiation.

Referring to FIG. 2, the perovskite compounds of Examples 9 to 15 also exhibited a peak corresponding to a perovskite crystal structure.

Based on the XRD spectra of each of the perovskite compounds of Examples 9 to 15, a ratio ($I(46.5°±2.5°)/I(32.5°±2.5°):I_b/I_a$) of a peak intensity ($I(46.5°±2.5°):I_b$) at a diffraction angle (2θ) of 46.5°±2.5° to a peak intensity ($I(32.5°±2.5°):I_a$) at a diffraction angle (2θ) of 32.5°±2.5°, and a ratio ($I(57.5°±2.5°)/I(32.5°±2.5°):I_c/I_a$) of a peak intensity ($I(57.5°±2.5°):I_c$) at a diffraction angle (2θ) of 57.5°±2.5° to a peak intensity ($I(32.5°±2.5°):I_a$) at a diffraction angle (2θ) of 32.5°±2.5° were calculated. The results are shown in Table 3.

TABLE 3

| Example | Composition | Intensity ratio ($I_b/I_a$) | Intensity ratio ($I_c/I_a$) |
|---|---|---|---|
| Preparation Example 9 | $Li_{0.34}La_{0.55}TiO_3$ | 0.3 | 0.3 |
| Preparation Example 10 | $Li_{0.34}La_{0.55}RuO_{3-\delta}$ | 0.2 | 0.2 |
| Preparation Example 11 | $Li_{0.34}La_{0.55}MnO_{3-\delta}$ | 0.5 | 0.4 |
| Preparation Example 12 | $Li_{0.34}La_{0.55}NiO_{3-\delta}$ | 0.3 | 0.3 |
| Preparation Example 13 | $Li_{0.34}La_{0.55}CrO_{3-\delta}$ | 0.3 | 0.3 |
| Preparation Example 14 | $Li_{0.34}La_{0.55}IrO_{3-\delta}$ | 0.2 | 0.3 |
| Preparation Example 15 | $Li_{0.34}La_{0.55}CoO_{3-\delta}$ | 0.6 | 0.3 |

Referring to FIG. 2, the perovskite compound of Preparation Example 9 exhibited a peak at a diffraction angle (2θ) of 11.3°±0.5°, while no peak appeared at a diffraction angle (2θ) of 11.3°±0.5° in the XRD spectra of the perovskite compounds of Preparation Examples 10 to 15.

Evaluation Example 4: Electrochemical Stability Evaluation

After separately grinding the spinel compound of Preparation Example 8 and the perovskite compounds of Preparation Examples 9 to 11, 85% by weight of a ground compound, 10% by weight of carbon black as a conducting agent, and 5% by weight of polyvinylidene fluoride (PVDF) as a binder were mixed together in N-methyl-2-pyrrolidone (NMP) used as a solvent to prepare a slurry. The slurry was coated on an aluminum foil and then dried to manufacture a working electrode. The working electrode and a lithium metal foil as a counter electrode were assembled together with a separator disposed between the working electrode and the counter electrode, the separator impregnated with a liquid electrolyte (1M LiTFSI in propylene carbonate (PC)), thereby completing manufacturing a half-cell.

Figure 3A:
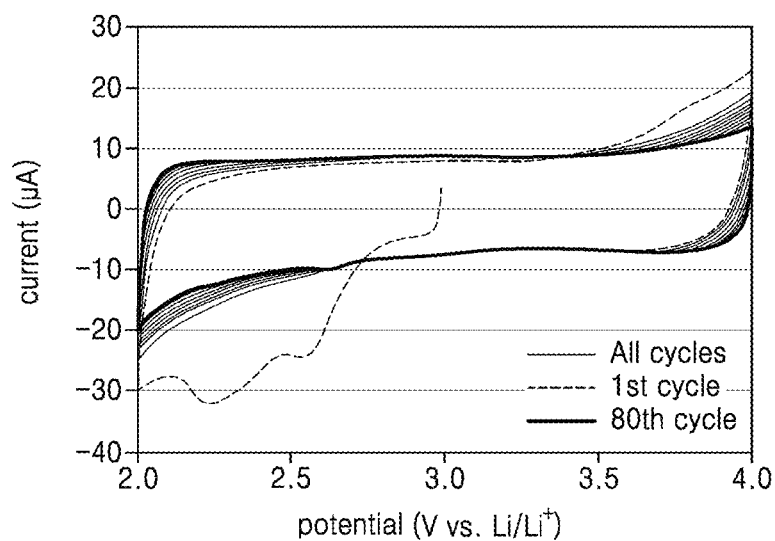
FIG. 3A is a graph of current (microamperes, μA) versus potential (volts (V) versus Li/Li$^+$) illustrating the results of cyclic voltammetry analysis of the spinel compound of Preparation Example 8.
Figure 3B:
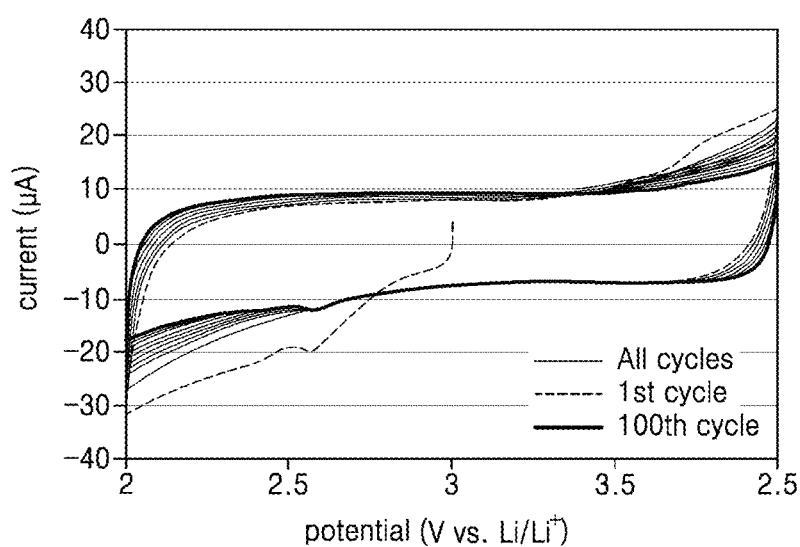
FIG. 3B is graphs of current (microamperes, μA) versus potential (volts (V) versus Li/Li$^+$) illustrating the results of cyclic voltammetry analysis of the perovskite compounds of Preparation Example 9.
Figure 3C:
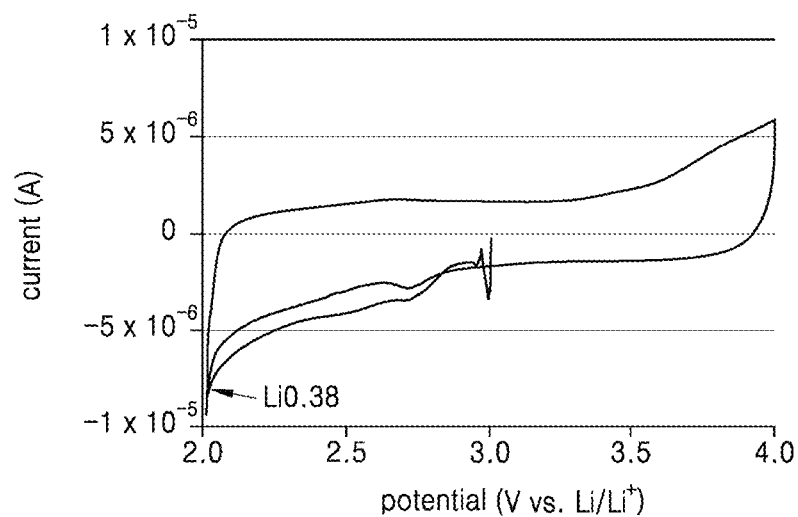
FIG. 3C to 3D are graphs of current (amperes, A) versus potential (volts (V)) illustrating the results of cyclic voltammetry analysis of the perovskite compounds of Preparation Examples 10 to 11, respectively.
Figure 3D:
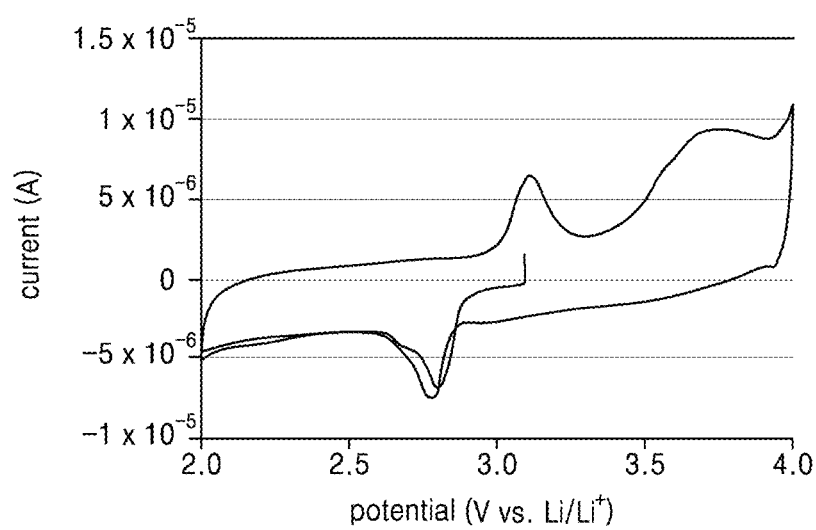

Electrochemical stability of each of the spinel compound and the perovskite compounds, each coated on the lithium metal, was evaluated by cyclic voltammetry (CV) in which a voltage in a range of about 2 V to about 4 V (with respect to Li) was applied to the half-cell at a scanning rate of about 0.1 mV/sec. The results are shown in FIGS. 3A to 3D. FIG. 3A is the results of the cyclic voltammetry on the spinel compound of Preparation Example 8, and FIGS. 3B to 3D are the results of the cyclic voltammetry on the perovskite compounds of Preparation Examples 9 to 11. As shown in FIGS. 3A to 3D, the spinel compound of Preparation Example 8 and the perovskite compounds of Preparation Examples 9 to 11 were found to be electrically stable after $1^{st}$, $80^{th}$, or $100^{th}$ scan cycle, respectively, without an overcurrent caused due to side reaction.

Evaluation Example 5: Evaluation of Charge and Discharge Characteristics of Lithium-Air Battery The lithium-air battery manufactured in Example 16 was subjected to a charge and discharge cycle of discharging with a constant current of about 0.01 mA/cm² at about 60° C. under the oxygen atmosphere at 1 atm until a voltage of 2.0 V (with respect to Li) was reached and then charging with the same current until a voltage of 4.5 V was reached. The results of the charge and discharge test after the $1^{st}$ cycle are shown in FIG. 4A.

The lithium-air batteries manufactured in Examples 17 to 19 were each subjected to a charge and discharge cycle of discharging with a constant current of about 0.01 mA/cm² until a voltage of about 2.0 V (with respect to Li) was reached and then charging with the same current until a voltage of 4.2 V was reached. The results of the charge and discharge test after the $1^{st}$ cycle are shown in FIG. 4D.

Figure 4A:
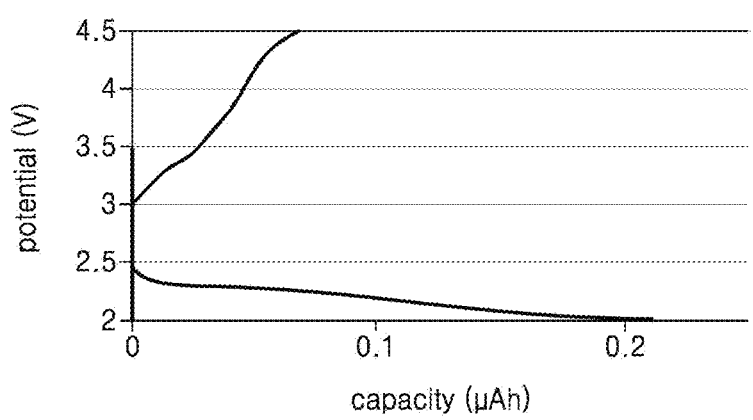
FIG. 4A is a graph of potential (volts (V)) versus capacity (microampere-hours, μAh) illustrating a charge/discharge profile of a lithium-air battery of Example 16.
Figure 4B:
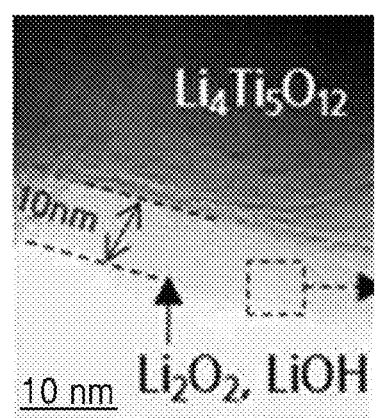
FIG. 4B is a transmission electron microscope (TEM) image of a cathode surface of a lithium-air battery of Example 16 after discharging.
Figure 4C:
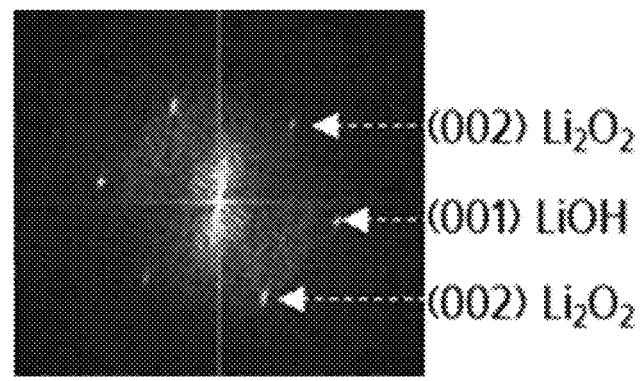
FIG. 4C is a diffraction pattern from the indicated portion of FIG. 4B.
Figure 4D:
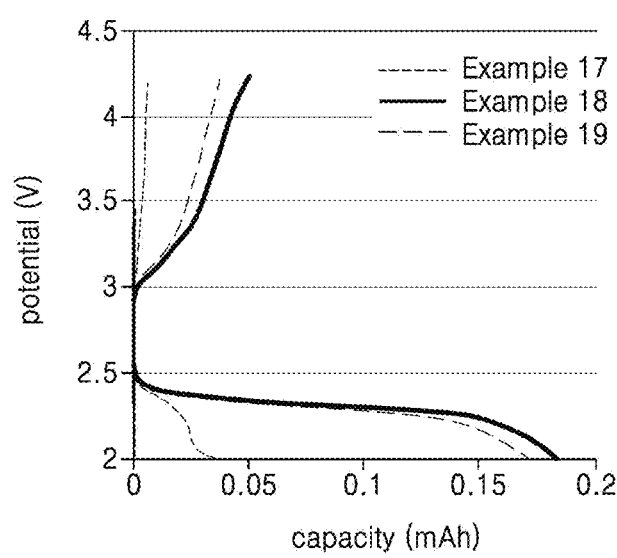
FIG. 4D is a graph of potential (volts (V)) versus capacity (milliampere-hours, mAh)) illustrating charge/discharge profiles of lithium-air batteries of Examples 17 to 19.

Referring to FIGS. 4A and 4D, the lithium-air batteries of Example 16, 17, 18, and 19, using the cathodes including the spinel compound or one of the perovskite compounds, were found to stably operate.

Referring to FIG. 4B, which is a transmission electron microscope (TEM) image of a cathode surface of the lithium-air battery of Example 16, and FIG. 4C, which is a diffraction pattern from the indicated area in FIG. 4B, it was found that lithium peroxide ($Li_2O_2$) and lithium hydrate (LiOH) as products of discharging were formed on the surface of the spinel compound ($Li_4Ti_5O_{12}$).

As described above, according to the disclosed embodiment, a cathode and a lithium-air battery may have improved chemical stability by inclusion of a lithium-containing metal oxide described in the above-described embodiment.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:
1. A cathode configured to use oxygen as a cathode active material, the cathode comprising a lithium-containing metal oxide comprising at least one of:
a spinel compound represented by Formula 1

$$Li_{1\pm x}M_{2\pm y}O_{4-\delta}$$  Formula 1 wherein, in Formula 1, M is at least one of Ni, Pd, Pb, Fe, Ir, Co, Rh, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, 0<x<1, 0<y<1, and 0<δ≤1;
a spinel compound represented by Formula 2

$$Li_{4\pm a}M_{5\pm b}O_{12-\delta}$$  Formula 2 wherein, in Formula 2, M is at least one of Ni, Pd, Pb, Fe, Ir, Co, Rh, Mn, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Pm, Sm, Gd, Tb, Dy, Ho, Er, Mg, Al, Si, Sc, Zn, Ga, Rb, Ag, Cd, In, Sb, Pt, Au, or Pb, 0<a<2, 0.3<b<5, and 0<δ≤3; or
a perovskite compound represented by Formula 3

$$Li_xA_yG_zO_{3-\delta}$$  Formula 3 wherein, in Formula 3,
A is at least one of H, Na, K, Rb, Cs, Sr, Ba, Y, La, Ce, Pr, Nd, Pm, Sm, Gd, Tb, Dy, Ho, or Er,
G is at least one of Ti, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, 0<x<1, 0<y<1, 0<x+y≤1, 0<z≤1.5, and 0<δ≤1.5,
wherein the cathode does not contain an electrolyte.
2. The cathode of claim 1, wherein the lithium-containing metal oxide is a crystalline lithium-ion conductor.
3. The cathode of claim 1, wherein the lithium-containing metal oxide further comprises at least one of a layered compound, a garnet compound, a NASICON compound of the formula $Na_{1+x}Zr_2Si_xP_{3-x}O_{12}$ wherein 0<x<3, a LISICON compound of the formula $Li_{2+2x}Zn_{1-x}GeO_4$ wherein 0<x<1, a phosphate compound, a tavorite compound, a triplite compound, an anti-perovskite compound, a silicate compound, or a borate compound.
4. The cathode of claim 1, wherein the cathode comprises a spinel compound of Formula 1 and a spinel compound of Formula 2.
5. The cathode of claim 1, wherein
M in Formula 2 is at least one of Ni, Pd, Pb, Fe, Ir, Co, Rh, Mn, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Pm, Sm, Gd, Tb, Dy, Ho, Mg, Al, Si, Sc, Zn, Ga, Rb, Ag, Cd, In, Sb, Pt, Au, or Pb.
6. The cathode of claim 4, wherein the at least one spinel compound of Formula 2 is represented by Formula 4:

$$Li_{4\pm a}Ti_{5-b}M_cO_{12-\delta}$$  Formula 4 wherein, in Formula 4,
M is at least one of Mg, Ca, Sr, Sc, Y, La, Ce, Pr, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te,
0.3<a<2, 0.3<b<2, 0.3<c<2, and 0<δ≤3.
7. The cathode of claim 4, wherein the at least one spinel compound is at least one of $Li_{4\pm x}Ti_{5-y}Mg_zO_{12-\delta}$ wherein 0.4<x≤1, 0.4<y≤1, 0.4<z≤1, and 0<δ≤3, $Li_{4\pm x}Ti_{5-y}Ca_zO_{12-\delta}$ wherein 0.4<x≤1, 0.4<y≤1, 0.4<z≤1, and 0<δ≤3, $Li_{4\pm x}Ti_{5-y}Sr_zO_{12-\delta}$ wherein 0.4<x≤1, 0.4<y≤1, 0.4<z≤1, and 0<δ≤3, $Li_{4\pm x}Ti_{5-y}Sc_zO_{12-\delta}$ wherein 0.4<x<1, 0.4<y≤1, 0.4<z≤1, and 0<δ≤3, $Li_{4\pm x}Ti_{5-y}Y_zO_{12-\delta}$ wherein 0.4<x≤1, 0.4<y≤1, 0.4<z≤1, and 0<δ≤3, $Li_{4\pm x}Ti_{5-y}La_zO_{12-\delta}$ wherein 0.4<x≤1, 0.4<y≤1, 0.4<z≤1, and 0<δ≤3, $Li_{4\pm x}Ti_{5-y}Ce_zO_{12-\delta}$ wherein 0.4<x≤1, 0.4<y≤1, 0.4<z≤1, and 0<δ≤3, $Li_{4\pm x}Ti_{5-y}Pr_zO_{12-\delta}$ wherein 0.4<x≤1, 0.4<y≤1, 0.4<z≤1, and 0<δ≤3, $Li_{4\pm x}Ti_{5-y}Sm_zO_{12-\delta}$ wherein 0.4<x≤1, 0.4<y≤1, 0.4<z≤1, and 0<δ≤3, $Li_{4\pm x}Ti_{5-y}Eu_zO_{12-\delta}$ wherein 0.4<x≤1, 0.4<y≤1, 0.4<z≤1, and 0<δ≤3, $Li_{4\pm x}Ti_{5-y}Gd_zO_{12-\delta}$ wherein 0.4<x≤1, 0.4<y≤1, $0.4<z\leq1$, and $0<\delta\leq3$, $Li_{4\pm x}Ti_{5-y}Tb_zO_{12-\delta}$ wherein $0.4<x\leq1$, $0.4<y\leq1$, $0.4<z\leq1$, and $0<\delta\leq3$, $Li_{4\pm x}Ti_{5-y}Dy_zO_{12-\delta}$ wherein $0.4<x\leq1$, $0.4<y\leq1$, $0.4<z\leq1$, and $0<\delta\leq3$, $Li_{4\pm x}Ti_{5-y}Ho_zO_{12-\delta}$ wherein $0.4<x\leq1$, $0.4<y\leq1$, $0.4<z\leq1$, and $0<\delta\leq3$, $Li_{4\pm x}Ti_{5-y}Er_zO_{12-\delta}$ wherein $0.4<x\leq1$, $0.4<y\leq1$, $0.4<z\leq1$, and $0<\delta\leq3$, $Li_{4\pm x}Ti_{5-y}Tm_zO_{12-\delta}$ wherein $0.4<x\leq1$, $0.4<y\leq1$, $0.4<z\leq1$, and $0<\delta\leq3$, $Li_{4\pm x}Ti_{5-y}Yb_zO_{12-\delta}$ wherein $0.4<x\leq1$, $0.4<y\leq1$, $0.4<z\leq1$, and $0<\delta\leq3$, $Li_{4\pm x}Ti_{5-y}Lu_zO_{12-\delta}$ wherein $0.4<x\leq1$, $0.4<y\leq1$, $0.4<z\leq1$, and $0<\delta\leq3$, $Li_{4\pm x}Ti_{5-y}Zr_zO_{12-\delta}$ wherein $0.4<x\leq1$, $0.4<y\leq1$, $0.4<z\leq1$, and $0<\delta\leq3$, $Li_{4\pm x}Ti_{5-y}Hf_zO_{12-\delta}$ wherein $0.4<x\leq1$, $0.4<y\leq1$, $0.4<z\leq1$, and $0<\delta\leq3$, $Li_{4\pm x}Ti_{5-y}V_zO_{12-\delta}$ wherein $0.4<x\leq1$, $0.4<y\leq1$, $0.4<z\leq1$, and $0<\delta\leq3$, $Li_{4\pm x}Ti_{5-y}Nb_zO_{12-\delta}$ wherein $0.4<x\leq1$, $0.4<y\leq1$, $0.4<z\leq1$, and $0<\delta\leq3$, $Li_{4\pm x}Ti_{5-y}Ta_zO_{12-\delta}$ wherein $0.4<x\leq1$, $0.4<y\leq1$, $0.4<z\leq1$, and $0<\delta\leq3$, $Li_{4\pm x}Ti_{5-y}Mo_zO_{12-\delta}$ wherein $0.4<x\leq1$, $0.4<y\leq1$, $0.4<z\leq1$, and $0<\delta\leq3$, $Li_{4\pm x}Ti_{5-y}W_zO_{12-\delta}$ wherein $0.4<x\leq1$, $0.4<y\leq1$, $0.4<z\leq1$, and $0<\delta\leq3$, $Li_{4\pm x}Ti_{5-y}Mn_zO_{12-\delta}$ wherein $0.4<x\leq1$, $0.4<y\leq1$, $0.4<z\leq1$, and $0<\delta\leq3$, $Li_{4\pm x}Ti_{5-y}Tc_zO_{12-\delta}$ wherein $0.4<x\leq1$, $0.4<y\leq1$, $0.4<z\leq1$, and $0<\delta\leq3$, $Li_{4\pm x}Ti_{5-y}Re_zO_{12-\delta}$ wherein $0.4<x\leq1$, $0.4<y\leq1$, $0.4<z\leq1$, and $0<\delta\leq3$, $Li_{4\pm x}Ti_{5-y}Fe_zO_{12-\delta}$ wherein $0.4<x\leq1$, $0.4<y\leq1$, $0.4<z\leq1$, and $0<\delta\leq3$, $Li_{4\pm x}Ti_{5-y}Ru_zO_{12-\delta}$ wherein $0.4<x\leq1$, $0.4<y\leq1$, $0.4<z\leq1$, and $0<\delta\leq3$, $Li_{4\pm x}Ti_{5-y}Os_zO_{12-\delta}$ wherein $0.4<x\leq1$, $0.4<y\leq1$, $0.4<z\leq1$, and $0<\delta\leq3$, $Li_{4\pm x}Ti_{5-y}Co_zO_{12-\delta}$ wherein $0.4<x\leq1$, $0.4<y\leq1$, $0.4<z\leq1$, and $0<\delta\leq3$, $Li_{4\pm x}Ti_{5-y}Rh_zO_{12-\delta}$ wherein $0.4<x\leq1$, $0.4<y\leq1$, $0.4<z\leq1$, and $0<\delta\leq3$, $Li_{4\pm x}Ti_{5-y}Ir_zO_{12-\delta}$ wherein $0.4<x\leq1$, $0.4<y\leq1$, $0.4<z\leq1$, and $0<\delta\leq3$, $Li_{4\pm x}Ti_{5-y}Ni_zO_{12-\delta}$ wherein $0.4<x\leq1$, $0.4<y\leq1$, $0.4<z\leq1$, and $0<\delta\leq3$, $Li_{4\pm x}Ti_{5-y}Pd_zO_{12-\delta}$ wherein $0.4<x\leq1$, $0.4<y\leq1$, $0.4<z\leq1$, and $0<\delta\leq3$, $Li_{4\pm x}Ti_{5-y}Pt_zO_{12-\delta}$ wherein $0.4<x\leq1$, $0.4<y\leq1$, $0.4<z\leq1$, and $0<\delta\leq3$, $Li_{4\pm x}Ti_{5-y}Cu_zO_{12-\delta}$ wherein $0.4<x\leq1$, $0.4<y\leq1$, $0.4<z\leq1$, and $0<\delta\leq3$, $Li_{4\pm x}Ti_{5-y}Ag_zO_{12-\delta}$ wherein $0.4<x\leq1$, $0.4<y\leq1$, $0.4<z\leq1$, and $0<\delta\leq3$, $Li_{4\pm x}Ti_{5-y}Au_zO_{12-\delta}$ wherein $0.4<x\leq1$, $0.4<y\leq1$, $0.4<z\leq1$, and $0<\delta\leq3$, $Li_{4\pm x}Ti_{5-y}Zn_zO_{12-\delta}$ wherein $0.4<x\leq1$, $0.4<y\leq1$, $0.4<z\leq1$, and $0<\delta\leq3$, $Li_{4\pm x}Ti_{5-y}Cd_zO_{12-\delta}$ wherein $0.4<x\leq1$, $0.4<y\leq1$, $0.4<z\leq1$, and $0<\delta\leq3$, $Li_{4\pm x}Ti_{5-y}Hg_zO_{12-\delta}$ wherein $0.4<x\leq1$, $0.4<y\leq1$, $0.4<z\leq1$, and $0<\delta\leq3$, $Li_{4\pm x}Ti_{5-y}Al_zO_{12-\delta}$ wherein $0.4<x\leq1$, $0.4<y\leq1$, $0.4<z\leq1$, and $0<\delta\leq3$, $Li_{4\pm x}Ti_{5-y}Ga_zO_{12-\delta}$ wherein $0.4<x\leq1$, $0.4<y\leq1$, $0.4<z\leq1$, and $0<\delta\leq3$, $Li_{4\pm x}Ti_{5-y}In_zO_{12-\delta}$ wherein $0.4<x\leq1$, $0.4<y\leq1$, $0.4<z\leq1$, and $0<\delta\leq3$, $Li_{4\pm x}Ti_{5-y}Tl_zO_{12-\delta}$ wherein $0.4<x\leq1$, $0.4<y\leq1$, $0.4<z\leq1$, and $0<\delta\leq3$, $Li_{4\pm x}Ti_{5-y}Ge_zO_{12-\delta}$ wherein $0.4<x\leq1$, $0.4<y\leq1$, $0.4<z\leq1$, and $0<\delta\leq3$, $Li_{4\pm x}Ti_{5-y}Sn_zO_{12-\delta}$ wherein $0.4<x\leq1$, $0.4<y\leq1$, $0.4<z\leq1$, and $0<\delta\leq3$, $Li_{4\pm x}Ti_{5-y}Pb_zO_{12-\delta}$ wherein $0.4<x\leq1$, $0.4<y\leq1$, $0.4<z\leq1$, and $0<\delta\leq3$, $Li_{4\pm x}Ti_{5-y}Sb_zO_{12-\delta}$ wherein $0.4<x\leq1$, $0.4<y\leq1$, $0.4<z\leq1$, and $0<\delta\leq3$, $Li_{4\pm x}Ti_{5-y}Bi_zO_{12-\delta}$ wherein $0.4<x\leq1$, $0.4<y\leq1$, $0.4<z\leq1$, and $0<\delta\leq3$, $Li_{4\pm x}Ti_{5-y}P_zO_{12-\delta}$ wherein $0.4<x\leq1$, $0.4<y\leq1$, $0.4<z\leq1$, and $0<\delta\leq3$, $Li_{4\pm x}Ti_{5-y}As_zO_{12-\delta}$ wherein $0.4<x\leq1$, $0.4<y\leq1$, $0.4<z\leq1$, and $0<\delta\leq3$, $Li_{4\pm x}Ti_{5-y}Se_zO_{12-\delta}$ wherein $0.4<x\leq1$, $0.4<y\leq1$, $0.4<z\leq1$, and $0<\delta\leq3$, or $Li_{4\pm x}Ti_{5-y}Te_zO_{12-\delta}$ wherein $0.4<x\leq1$, $0.4<y\leq1$, $0.4<z\leq1$, and $0<\delta\leq3$.

8. The cathode of claim 4, wherein the at least one spinel compound has an electronic conductivity of about $1.x\ 10^{-9}$ Siemens per centimeter to about 1.0 Siemens per centimeter, and an ionic conductivity of about $1.0\times10^{-8}$ Siemens per centimeter to about 0.1 Siemens per centimeter at 25° C.

9. The cathode of claim 1, wherein the cathode comprises a perovskite compound represented by Formula 3.

10. The cathode of claim 9, wherein, in Formula 3,
A is at least one of H, Na, K, Rb, Cs, Sr, Ba, Y, La, Ce, Pr, Nd, Pm, Sm, Gd, Tb, Dy, Ho, or Er,
G is at least one of Ti, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, and
$0.2<x\leq0.7$, $0<y\leq0.7$, $0<x+y<1$, $0<z\leq1.2$, and $0<\delta\leq1.2$.

11. The cathode of claim 9, wherein in Formula 3:
A is at least one of La, Ce, Pr, Gd, Sr, or Ba,
G is at least one of Ti, Mn, Ni, Ru, Cr, Co, Ti, Ru, Ir, Fe, Pd, Pb, Rh, Sn, V, Re, Ge, W, Zr, Mo, Nb, Ta, Hf, or Bi, and
$0.2<x\leq0.5$, $0.4<y\leq0.7$, $0<x+y<1$, $0.8<z\leq1.2$, and $0<\delta\leq1.0$.

12. The cathode of claim 9, wherein the perovskite compound comprises at least one of
$Li_{0.34}La_{0.55}TiO_{3-\delta}$ wherein $0<\delta\leq1.0$, $Li_{0.34}La_{0.55}MnO_{3-\delta}$ wherein $0<\delta\leq1.0$, $Li_{0.34}La_{0.55}NiO_{3-\delta}$ wherein $0<\delta\leq1.0$, $Li_{0.34}La_{0.55}CrO_{3-\delta}$ wherein $0<\delta\leq1.0$, $Li_{0.34}La_{0.55}CoO_{3-\delta}$ wherein $0<\delta\leq1.0$, $Li_{0.34}La_{0.55}IrO_{3-\delta}$ wherein $0<\delta\leq1.0$, $Li_{0.34}La_{0.55}RuO_{3-\delta}$ wherein $0<\delta\leq1.0$, $Li_{0.34}La_{0.55}TiO_{3-\delta}$ wherein $0<\delta\leq1.0$, $Li_{0.34}La_{0.55}FeO_{3-\delta}$ wherein $0<\delta\leq1.0$, $Li_{0.34}La_{0.55}PdO_{3-\delta}$ wherein $0<\delta\leq1.0$, $Li_{0.34}La_{0.55}PbO_{3-\delta}$ wherein $0<\delta\leq1.0$, $Li_{0.34}La_{0.55}RhO_{3-\delta}$ wherein $0<\delta\leq1.0$, $Li_{0.34}La_{0.55}SnO_{3-\delta}$ wherein $0<\delta\leq1.0$, $Li_{0.34}La_{0.55}VO_{3-\delta}$ wherein $0<\delta\leq1.0$, $Li_{0.34}La_{0.55}ReO_{3-\delta}$ wherein $0<\delta\leq1.0$, $Li_{0.34}La_{0.55}GeO_{3-\delta}$ wherein $0<\delta\leq1.0$, $Li_{0.34}La_{0.55}WO_{3-\delta}$ wherein $0<\delta\leq1.0$, $Li_{0.34}La_{0.55}ZrO_{3-\delta}$ wherein $0<\delta\leq1.0$, $Li_{0.34}La_{0.55}MoO_{3-\delta}$ wherein $0<\delta\leq1.0$, $Li_{0.34}La_{0.55}NbO_{3-\delta}$ wherein $0<\delta\leq1.0$, $Li_{0.34}La_{0.55}TaO_{3-\delta}$ wherein $0<\delta\leq1.0$, $Li_{0.34}La_{0.55}HfO_{3-\delta}$ wherein $0<\delta\leq1.0$, $Li_{0.34}La_{0.55}BiO_{3-\delta}$ wherein $0<\delta\leq1.0$,
$Li_{0.10}La_{0.63}TiO_{3-\delta}$ wherein $0<\delta\leq10$ $Li_{0.10}La_{0.63}O_{3-\delta}$ wherein $0<\delta\leq1.0$, $Li_{0.10}La_{0.63}TiO_{3-\delta}$ wherein $0<\delta\leq1.0$, $Li_{0.10}La_{0.63}CrO_{3-\delta}$ wherein $0<\delta\leq1.0$, $Li_{0.10}La_{0.63}CoO_{3-\delta}$ wherein $0<\delta\leq1.0$, $Li_{0.10}La_{0.63}IrO_{3-\delta}$ wherein $0<\delta\leq1.0$, $Li_{0.10}La_{0.63}RuO_{3-\delta}$ wherein $0<\delta\leq1.0$, $Li_{0.10}La_{0.63}TiO_{3-\delta}$ wherein $0<\delta\leq1.0$, $Li_{0.10}La_{0.63}FeO_{3-\delta}$ wherein $0<\delta\leq1.0$, $Li_{0.10}La_{0.63}PdO_{3-\delta}$ wherein $0<\delta\leq1.0$, $Li_{0.10}La_{0.63}PbO_{3-\delta}$ wherein $0<\delta\leq1.0$, $Li_{0.10}La_{0.63}RhO_{3-\delta}$ wherein $0<\delta\leq1.0$, $Li_{0.10}La_{0.63}SnO_{3-\delta}$ wherein $0<\delta\leq1.0$, $Li_{0.10}La_{0.63}VO_{3-\delta}$ wherein $0<\delta\leq1.0$, $Li_{0.10}La_{0.63}ReO_{3-\delta}$ wherein $0<\delta\leq1.0$, $Li_{0.10}La_{0.63}GeO_{3-\delta}$ wherein $0<\delta\leq1.0$, $Li_{0.10}La_{0.63}WO_{3-\delta}$ wherein $0<\delta\leq1.0$, $Li_{0.10}La_{0.63}ZrO_{3-\delta}$ wherein $0<\delta\leq1.0$, $Li_{0.10}La_{0.63}MoO_{3-\delta}$ wherein $0<\delta\leq1.0$, $Li_{0.10}La_{0.63}NbO_{3-\delta}$ wherein $0<\delta\leq1.0$, $Li_{0.10}La_{0.63}TaO_{3-\delta}$ wherein $0<\delta\leq1.0$, $Li_{0.10}La_{0.63}HfO_{3-\delta}$ wherein $0<\delta\leq1.0$, $Li_{0.10}La_{0.63}BiO_{3-\delta}$ wherein $0<\delta\leq1.0$,
$Li_{0.20}La_{0.60}TiO_{3-\delta}$ wherein $0<\delta\leq1.0$, $Li_{0.20}La_{0.60}MnO_{3-\delta}$ wherein $0<\delta\leq1.0$, $Li_{0.20}La_{0.60}NiO_{3-\delta}$ wherein $0<\delta\leq1.0$, $Li_{0.20}La_{0.60}CrO_{3-\delta}$ wherein $0<\delta\leq1.0$, $Li_{0.20}La_{0.60}CoO_{3-\delta}$ wherein $0<\delta\leq1.0$, $Li_{0.20}La_{0.60}IrO_{3-\delta}$ wherein $0<\delta\leq1.0$, $Li_{0.20}La_{0.60}RuO_{3-\delta}$ wherein $0<\delta\leq1.0$, $Li_{0.20}La_{0.60}TiO_{3-\delta}$ wherein $0<\delta\leq1.0$, $Li_{0.20}La_{0.60}FeO_{3-\delta}$ wherein $0<\delta\leq1.0$, $Li_{0.20}La_{0.60}PdO_{3-\delta}$ wherein $0<\delta\leq1.0$, $Li_{0.20}La_{0.60}PbO_{3-\delta}$ wherein $0<\delta\leq1.0$, $Li_{0.20}La_{0.60}RhO_{3-\delta}$ wherein $0<\delta\leq1.0$, $Li_{0.20}La_{0.60}SnO_{3-\delta}$ wherein $0<\delta\leq1.0$,
$Li_{0.20}La_{0.60}VO_{3-\delta}$ wherein $0<\delta\leq1.0$,
$Li_{0.20}La_{0.60}ReO_{3-\delta}$ wherein $0<\delta\leq1.0$,
$Li_{0.20}La_{0.60}GeO_{3-\delta}$ wherein $0<\delta\leq1.0$,
$Li_{0.20}La_{0.60}WO_{3-\delta}$ wherein $0<\delta\leq1.0$,
$Li_{0.20}La_{0.60}ZrO_{3-\delta}$ wherein $0<\delta\leq1.0$,
$Li_{0.20}La_{0.60}MoO_{3-\delta}$ wherein $0<\delta\leq1.0$,
$Li_{0.20}La_{0.60}NbO_{3-\delta}$ wherein $0<\delta\leq1.0$,
$Li_{0.20}La_{0.60}TaO_{3-\delta}$ wherein $0<\delta\leq1.0$,
$Li_{0.60}La_{0.60}HfO_{3-\delta}$ wherein $0<\delta\leq1.0$,
$Li_{0.20}La_{0.60}BiO_{3-\delta}$ wherein $0<\delta\leq1.0$,
$Li_{0.30}La_{0.57}TiO_{3-\delta}$ wherein $0<\delta\leq1.0$, $Li_{0.30}La_{0.57}MnO_{3-\delta}$ wherein $0<\delta\leq1.0$, $Li_{0.30}La_{0.57}NiO_{3-\delta}$ wherein $0<\delta\leq1.0$, $Li_{0.30}La_{0.57}CrO_{3-\delta}$ wherein $0<\delta\leq1.0$,
$Li_{0.30}La_{0.57}CoO_{3-\delta}$ wherein $0<\delta\leq1.0$,
$Li_{0.30}La_{0.57}IrO_{3-\delta}$ wherein $0<\delta\leq1.0$,
$Li_{0.30}La_{0.57}RuO_{3-\delta}$ wherein $0<\delta\leq1.0$,
$Li_{0.30}La_{0.57}TiO_{3-\delta}$ wherein $0<\delta\leq1.0$,
$Li_{0.30}La_{0.57}FeO_{3-\delta}$ wherein $0<\delta\leq1.0$,
$Li_{0.30}La_{0.57}PdO_{3-\delta}$ wherein $0<\delta\leq1.0$,
$Li_{0.30}La_{0.57}PbO_{3-\delta}$ wherein $0<\delta\leq1.0$,
$Li_{0.30}La_{0.57}RhO_{3-\delta}$ wherein $0<\delta\leq1.0$,
$Li_{0.30}La_{0.57}SnO_{3-\delta}$ wherein $0<\delta\leq1.0$,
$Li_{0.30}La_{0.57}VO_{3-\delta}$ wherein $0<\delta\leq1.0$,
$Li_{0.30}La_{0.57}ReO_{3-\delta}$ wherein $0<\delta\leq1.0$,
$Li_{0.30}La_{0.57}GeO_{3-\delta}$ wherein $0<\delta\leq1.0$,
$Li_{0.30}La_{0.57}WO_{3-\delta}$ wherein $0<\delta\leq1.0$,
$Li_{0.30}La_{0.57}ZrO_{3-\delta}$ wherein $0<\delta\leq1.0$,
$Li_{0.30}La_{0.57}MoO_{3-\delta}$ wherein $0<\delta\leq1.0$,
$Li_{0.30}La_{0.57}NbO_{3-\delta}$ wherein $0<\delta\leq1.0$,
$Li_{0.30}La_{0.57}TaO_{3-\delta}$ wherein $0<\delta\leq1.0$,
$Li_{0.30}La_{0.57}HfO_{3-\delta}$ wherein $0<\delta\leq1.0$,
$Li_{0.30}La_{0.57}BiO_{3-\delta}$ wherein $0<\delta\leq1.0$,
$Li_{0.40}La_{0.53}TiO_{3-\delta}$ wherein $0<\delta\leq1.0$, $Li_{0.40}La_{0.53}MnO_{3-\delta}$ wherein $0<\delta\leq1.0$, $Li_{0.40}La_{0.53}NiO_{3-\delta}$ wherein $0<\delta\leq1.0$,
$Li_{0.40}La_{0.53}CrO_{3-\delta}$ wherein $0<\delta\leq1.0$,
$Li_{0.40}La_{0.53}CoO_{3-\delta}$ wherein $0<\delta\leq1.0$,
$Li_{0.40}La_{0.53}IrO_{3-\delta}$ wherein $0<\delta\leq1.0$,
$Li_{0.40}La_{0.53}RuO_{3-\delta}$ wherein $0<\delta\leq1.0$,
$Li_{0.40}La_{0.53}TiO_{3-\delta}$ wherein $0<\delta\leq1.0$,
$Li_{0.40}La_{0.53}FeO_{3-\delta}$ wherein $0<\delta\leq1.0$,
$Li_{0.40}La_{0.53}PdO_{3-\delta}$ wherein $0<\delta\leq1.0$,
$Li_{0.40}La_{0.53}PbO_{3-\delta}$ wherein $0<\delta\leq1.0$,
$Li_{0.40}La_{0.53}RhO_{3-\delta}$ wherein $0<\delta\leq1.0$,
$Li_{0.40}La_{0.53}SnO_{3-\delta}$ wherein $0<\delta\leq1.0$,
$Li_{0.40}La_{0.53}VO_{3-\delta}$ wherein $0<\delta\leq1.0$,
$Li_{0.40}La_{0.53}ReO_{3-\delta}$ wherein $0<\delta\leq1.0$,
$Li_{0.40}La_{0.53}GeO_{3-\delta}$ wherein $0<\delta\leq1.0$,
$Li_{0.40}La_{0.53}WO_{3-\delta}$ wherein $0<\delta\leq1.0$,
$Li_{0.40}La_{0.53}ZrO_{3-\delta}$ wherein $0<\delta\leq1.0$,
$Li_{0.40}La_{0.53}MoO_{3-\delta}$ wherein $0<\delta\leq1.0$,
$Li_{0.40}La_{0.53}NbO_{3-\delta}$ wherein $0<\delta\leq1.0$,
$Li_{0.40}La_{0.53}TaO_{3-\delta}$ wherein $0<\delta\leq1.0$,
$Li_{0.40}La_{0.53}HfO_{3-\delta}$ wherein $0<\delta\leq1.0$,
$Li_{0.40}La_{0.53}BiO_{3-\delta}$ wherein $0<\delta\leq1.0$,
$Li_{0.45}La_{0.52}TiO_{3-\delta}$ wherein $0<\delta\leq1.0$, $Li_{0.45}La_{0.52}MnO_{3-\delta}$ wherein $0<\delta\leq1.0$, $Li_{0.45}La_{0.52}NiO_{3-\delta}$ wherein $0<\delta\leq1.0$, $Li_{0.45}La_{0.52}CrO_{3-\delta}$ wherein $0<\delta\leq1.0$,
$Li_{0.45}La_{0.52}CoO_{3-\delta}$ wherein $0<\delta\leq1.0$,
$Li_{0.45}La_{0.52}IrO_{3-\delta}$ wherein $0<\delta\leq1.0$,
$Li_{0.45}La_{0.52}RuO_{3-\delta}$ wherein $0<\delta\leq1.0$,
$Li_{0.45}La_{0.52}TiO_{3-\delta}$ wherein $0<\delta\leq1.0$,
$Li_{0.45}La_{0.52}FeO_{3-\delta}$ wherein $0<\delta\leq1.0$,
$Li_{0.45}La_{0.52}PdO_{3-\delta}$ wherein $0<\delta\leq1.0$,
$Li_{0.45}La_{0.52}PbO_{3-\delta}$ wherein $0<\delta\leq1.0$,
$Li_{0.45}La_{0.52}RhO_{3-\delta}$ wherein $0<\delta\leq1.0$,
$Li_{0.45}La_{0.52}SnO_{3-\delta}$ wherein $0<\delta\leq1.0$,
$Li_{0.45}La_{0.52}VO_{3-\delta}$ wherein $0<\delta\leq1.0$,
$Li_{0.45}La_{0.52}ReO_{3-\delta}$ wherein $0<\delta\leq1.0$,
$Li_{0.45}La_{0.52}GeO_{3-\delta}$ wherein $0<\delta\leq1.0$,
$Li_{0.45}La_{0.52}WO_{3-\delta}$ wherein $0<\delta\leq1.0$,
$Li_{0.45}La_{0.52}ZrO_{3-\delta}$ wherein $0<\delta\leq1.0$,
$Li_{0.45}La_{0.52}MoO_{3-\delta}$ wherein $0<\delta\leq1.0$,
$Li_{0.45}La_{0.52}NbO_{3-\delta}$ wherein $0<\delta\leq1.0$,
$Li_{0.45}La_{0.52}TaO_{3-\delta}$ wherein $0<\delta\leq1.0$,
$Li_{0.45}La_{0.52}HfO_{3-\delta}$ wherein $0<\delta\leq1.0$,
$Li_{0.45}La_{0.52}BiO_{3-\delta}$ wherein $0<\delta\leq1.0$,
$Li_{0.34}Ce_{0.55}TiO_{3-\delta}$ wherein $0<\delta\leq1.0$, $Li_{0.34}Ce_{0.55}MnO_{3-\delta}$ wherein $0<\delta\leq1.0$, $Li_{0.34}Ce_{0.55}NiO_{3-\delta}$ wherein $0<\delta\leq1.0$,
$Li_{0.34}Ce_{0.55}CrO_{3-\delta}$ wherein $0<\delta\leq1.0$,
$Li_{0.34}Ce_{0.55}CoO_{3-\delta}$ wherein $0<\delta\leq1.0$,
$Li_{0.34}Ce_{0.55}IrO_{3-\delta}$ wherein $0<\delta\leq1.0$,
$Li_{0.34}Ce_{0.55}RuO_{3-\delta}$ wherein $0<\delta\leq1.0$,
$Li_{0.34}Ce_{0.55}TiO_{3-\delta}$ wherein $0<\delta\leq1.0$,
$Li_{0.34}Ce_{0.55}FeO_{3-\delta}$ wherein $0<\delta\leq1.0$,
$Li_{0.34}Ce_{0.55}PdO_{3-\delta}$ wherein $0<\delta\leq1.0$,
$Li_{0.34}Ce_{0.55}PbO_{3-\delta}$ wherein $0<\delta\leq1.0$,
$Li_{0.34}Ce_{0.55}RhO_{3-\delta}$ wherein $0<\delta\leq1.0$,
$Li_{0.34}Ce_{0.55}SnO_{3-\delta}$ wherein $0<\delta\leq1.0$,
$Li_{0.34}Ce_{0.55}VO_{3-\delta}$ wherein $0<\delta\leq1.0$,
$Li_{0.34}Ce_{0.55}ReO_{3-\delta}$ wherein $0<\delta\leq1.0$,
$Li_{0.34}Ce_{0.55}GeO_{3-\delta}$ wherein $0<\delta\leq1.0$,
$Li_{0.34}Ce_{0.55}WO_{3-\delta}$ wherein $0<\delta\leq1.0$,
$Li_{0.34}Ce_{0.55}ZrO_{3-\delta}$ wherein $0<\delta\leq1.0$,
$Li_{0.34}Ce_{0.55}MoO_{3-\delta}$ wherein $0<\delta\leq1.0$,
$Li_{0.34}Ce_{0.55}NbO_{3-\delta}$ wherein $0<\delta\leq1.0$,
$Li_{0.34}Ce_{0.55}TaO_{3-\delta}$ wherein $0<\delta\leq1.0$,
$Li_{0.34}Ce_{0.55}HfO_{3-\delta}$ wherein $0<\delta\leq1.0$,
$Li_{0.34}Ce_{0.55}BiO_{3-\delta}$ wherein $0<\delta\leq1.0$,
$Li_{0.10}Ce_{0.63}TiO_{3-\delta}$ wherein $0<\delta\leq1.0$, $Li_{0.10}Ce_{0.63}MnO_{3-\delta}$ wherein $0<\delta\leq1.0$, $Li_{0.10}Ce_{0.63}NiO_{3-\delta}$ wherein $0<\delta\leq1.0$, $Li_{0.10}Ce_{0.63}CrO_{3-\delta}$ wherein $0<\delta\leq1.0$,
$Li_{0.10}Ce_{0.63}CoO_{3-\delta}$ wherein $0<\delta\leq1.0$,
$Li_{0.10}Ce_{0.63}IrO_{3-\delta}$ wherein $0<\delta\leq1.03$,
$Li_{0.10}Ce_{0.63}RuO_{3-\delta}$ wherein $0<\delta\leq1.0$,
$Li_{0.10}Ce_{0.63}TiO_{3-\delta}$ wherein $0<\delta\leq1.0$,
$Li_{0.10}Ce_{0.63}FeO_{3-\delta}$ wherein $0<\delta\leq1.0$,
$Li_{0.10}Ce_{0.63}PdO_{3-\delta}$ wherein $0<\delta\leq1.0$,
$Li_{0.10}Ce_{0.63}PbO_{3-\delta}$ wherein $0<\delta\leq1.0$,
$Li_{0.10}Ce_{0.63}RhO_{3-\delta}$ wherein $0<\delta\leq1.0$,
$Li_{0.10}Ce_{0.63}SnO_{3-\delta}$ wherein $0<\delta\leq1.0$,
$Li_{0.10}Ce_{0.63}VO_{3-\delta}$ wherein $0<\delta\leq1.0$,
$Li_{0.10}Ce_{0.63}ReO_{3-\delta}$ wherein $0<\delta\leq1.0$,
$Li_{0.10}Ce_{0.63}GeO_{3-\delta}$ wherein $0<\delta\leq1.0$,
$Li_{0.10}Ce_{0.63}WO_{3-\delta}$ wherein $0<\delta\leq1.0$,
$Li_{0.10}Ce_{0.63}ZrO_{3-\delta}$ wherein $0<\delta\leq1.0$,
$Li_{0.10}Ce_{0.63}MoO_{3-\delta}$ wherein $0<\delta\leq1.0$,
$Li_{0.10}Ce_{0.63}NbO_{3-\delta}$ wherein $0<\delta\leq1.0$,
$Li_{0.10}Ce_{0.63}TaO_{3-\delta}$ wherein $0<\delta\leq1.0$,
$Li_{0.10}Ce_{0.63}HfO_{3-\delta}$ wherein $0<\delta\leq1.0$,
$Li_{0.10}Ce_{0.63}BiO_{3-\delta}$ wherein $0<\delta\leq1.0$,
$Li_{0.20}Ce_{0.60}TiO_{3-\delta}$ wherein $0<\delta\leq1.0$, $Li_{0.20}Ce_{0.60}MnO_{3-\delta}$ wherein $0<\delta\leq1.0$, $Li_{0.20}Ce_{0.60}NiO_{3-\delta}$ wherein $0<\delta\leq1.0$, $Li_{0.20}Ce_{0.60}CrO_{3-\delta}$ wherein $0<\delta\leq1.0$,
$Li_{0.20}Ce_{0.60}CoO_{3-\delta}$ wherein $0<\delta\leq1.0$,
$Li_{0.20}Ce_{0.60}IrO_{3-\delta}$ wherein $0<\delta\leq1.0$,
$Li_{0.20}Ce_{0.60}RuO_{3-\delta}$ wherein $0<\delta\leq1.0$,
$Li_{0.20}Ce_{0.60}TiO_{3-\delta}$ wherein $0<\delta\leq1.0$,
$Li_{0.20}Ce_{0.60}FeO_{3-\delta}$ wherein $0<\delta\leq1.0$,
$Li_{0.20}Ce_{0.60}PdO_{3-\delta}$ wherein $0<\delta\leq1.0$,
$Li_{0.20}Ce_{0.60}PbO_{3-\delta}$ wherein $0<\delta\leq1.0$,
$Li_{0.20}Ce_{0.60}RhO_{3-\delta}$ wherein $0<\delta\leq1.0$,
$Li_{0.20}Ce_{0.60}SnO_{3-\delta}$ wherein $0<\delta\leq1.0$,
$Li_{0.20}Ce_{0.60}VO_{3-\delta}$ wherein $0<\delta\leq1.0$, Li$_{0.20}$Ce$_{0.60}$ReO$_{3-\delta}$ wherein 0<δ≤1.0,
Li$_{0.20}$Ce$_{0.60}$GeO$_{3-\delta}$ wherein 0<δ≤1.0,
Li$_{0.20}$Ce$_{0.60}$WO$_{3-\delta}$ wherein 0<δ≤1.0,
Li$_{0.20}$Ce$_{0.60}$ZrO$_{3-\delta}$ wherein 0<δ≤1.0,
Li$_{0.20}$Ce$_{0.60}$MoO$_{3-\delta}$ wherein 0<δ≤1.0,
Li$_{0.20}$Ce$_{0.60}$NbO$_{3-\delta}$ wherein 0<δ≤1.0,
Li$_{0.20}$Ce$_{0.60}$TaO$_{3-\delta}$ wherein 0<δ≤1.0,
Li$_{0.20}$Ce$_{0.60}$HfO$_{3-\delta}$ wherein 0<δ≤1.0,
Li$_{0.20}$Ce$_{0.60}$BiO$_{3-\delta}$ wherein 0<δ≤1.0,
Li$_{0.30}$Ce$_{0.57}$TiO$_{3-\delta}$ wherein 0<δ≤1.0, Li$_{0.30}$Ce$_{0.57}$MnO$_{3-\delta}$ wherein 0<δ≤1.0, Li$_{0.30}$Ce$_{0.57}$NiO$_{3-\delta}$ wherein 0<δ≤1.0, Li$_{0.30}$Ce$_{0.57}$CrO$_{3-\delta}$ wherein 0<δ≤1.0,
Li$_{0.30}$Ce$_{0.57}$CoO$_{3-\delta}$ wherein 0<δ≤1.0,
Li$_{0.30}$Ce$_{0.57}$IrO$_{3-\delta}$ wherein 0<δ≤1.0,
Li$_{0.30}$Ce$_{0.57}$RuO$_{3-\delta}$ wherein 0<δ≤1.0,
Li$_{0.30}$Ce$_{0.57}$TiO$_{3-\delta}$ wherein 0<δ≤1.0,
Li$_{0.30}$Ce$_{0.57}$FeO$_{3-\delta}$ wherein 0<δ≤1.0,
Li$_{0.30}$Ce$_{0.57}$PdO$_{3-\delta}$ wherein 0<δ≤1.0,
Li$_{0.30}$Ce$_{0.57}$PbO$_{3-\delta}$ wherein 0<δ≤1.0,
Li$_{0.30}$Ce$_{0.57}$RhO$_{3-\delta}$ wherein 0<δ≤1.0,
Li$_{0.30}$Ce$_{0.57}$SnO$_{3-\delta}$ wherein 0<δ≤1.0,
Li$_{0.30}$Ce$_{0.57}$VO$_{3-\delta}$ wherein 0<δ≤1.0,
Li$_{0.30}$Ce$_{0.57}$ReO$_{3-\delta}$ wherein 0<δ≤1.0,
Li$_{0.30}$Ce$_{0.57}$GeO$_{3-\delta}$ wherein 0<δ≤1.0,
Li$_{0.30}$Ce$_{0.57}$WO$_{3-\delta}$ wherein 0<δ≤1.0,
Li$_{0.30}$Ce$_{0.57}$ZrO$_{3-\delta}$ wherein 0<δ≤1.0,
Li$_{0.30}$Ce$_{0.57}$MoO$_{3-\delta}$ wherein 0<δ≤1.0,
Li$_{0.30}$Ce$_{0.57}$NbO$_{3-\delta}$ wherein 0<δ≤1.0,
Li$_{0.30}$Ce$_{0.57}$TaO$_{3-\delta}$ wherein 0<δ≤1.0,
Li$_{0.30}$Ce$_{0.57}$HfO$_{3-\delta}$ wherein 0<δ≤1.0,
Li$_{0.30}$Ce$_{0.57}$BiO$_{3-\delta}$ wherein 0<δ≤1.0,
Li$_{0.40}$Ce$_{0.53}$TiO$_{3-\delta}$ wherein 0<δ≤1.0, Li$_{0.40}$Ce$_{0.53}$MnO$_{3-\delta}$ wherein 0<δ≤1.0, Li$_{0.40}$Ce$_{0.53}$NiO$_{3-\delta}$ wherein 0<δ≤1.0,
Li$_{0.40}$Ce$_{0.53}$CrO$_{3-\delta}$ wherein 0<δ≤1.0,
Li$_{0.40}$Ce$_{0.53}$CoO$_{3-\delta}$ wherein 0<δ≤1.0,
Li$_{0.40}$Ce$_{0.53}$IrO$_{3-\delta}$ wherein 0<δ≤1.0,
Li$_{0.40}$Ce$_{0.53}$RuO$_{3-\delta}$ wherein 0<δ≤1.0,
Li$_{0.40}$Ce$_{0.53}$TiO$_{3-\delta}$ wherein 0<δ≤1.0,
Li$_{0.40}$Ce$_{0.53}$FeO$_{3-\delta}$ wherein 0<δ≤1.0,
Li$_{0.40}$Ce$_{0.53}$PdO$_{3-\delta}$ wherein 0<δ≤1.0,
Li$_{0.40}$Ce$_{0.53}$PbO$_{3-\delta}$ wherein 0<δ≤1.0,
Li$_{0.40}$Ce$_{0.53}$RhO$_{3-\delta}$ wherein 0<δ≤1.0,
Li$_{0.40}$Ce$_{0.53}$SnO$_{3-\delta}$ wherein 0<δ≤1.0,
Li$_{0.40}$Ce$_{0.53}$VO$_{3-\delta}$ wherein 0<δ≤1.0,
Li$_{0.40}$Ce$_{0.53}$ReO$_{3-\delta}$ wherein 0<δ≤1.0,
Li$_{0.40}$Ce$_{0.53}$GeO$_{3-\delta}$ wherein 0<δ≤1.0,
Li$_{0.40}$Ce$_{0.53}$WO$_{3-\delta}$ wherein 0<δ≤1.0,
Li$_{0.40}$Ce$_{0.53}$ZrO$_{3-\delta}$ wherein 0<δ≤1.0,
Li$_{0.40}$Ce$_{0.53}$MoO$_{3-\delta}$ wherein 0<δ≤1.0,
Li$_{0.40}$Ce$_{0.53}$NbO$_{3-\delta}$ wherein 0<δ≤1.0,
Li$_{0.40}$Ce$_{0.53}$TaO$_{3-\delta}$ wherein 0<δ≤1.0,
Li$_{0.40}$Ce$_{0.53}$HfO$_{3-\delta}$ wherein 0<δ≤1.0,
Li$_{0.40}$Ce$_{0.53}$BiO$_{3-\delta}$ wherein 0<δ≤1.0,
Li$_{0.45}$Ce$_{0.52}$TiO$_{3-\delta}$ wherein 0<δ≤1.0, Li$_{0.45}$Ce$_{0.52}$MnO$_{3-\delta}$ wherein 0<δ≤1.0, Li$_{0.45}$Ce$_{0.52}$NiO$_{3-\delta}$ wherein 0<δ≤1.0, Li$_{0.45}$Ce$_{0.52}$CrO$_{3-\delta}$ wherein 0<δ≤1.0,
Li$_{0.45}$Ce$_{0.52}$CoO$_{3-\delta}$ wherein 0<δ≤1.0,
Li$_{0.45}$Ce$_{0.52}$IrO$_{3-\delta}$ wherein 0<δ≤1.0,
Li$_{0.45}$Ce$_{0.52}$RuO$_{3-\delta}$ wherein 0<δ≤1.0,
Li$_{0.45}$Ce$_{0.52}$TiO$_{3-\delta}$ wherein 0<δ≤1.0,
Li$_{0.45}$Ce$_{0.52}$FeO$_{3-\delta}$ wherein 0<δ≤1.0,
Li$_{0.45}$Ce$_{0.52}$PdO$_{3-\delta}$ wherein 0<δ≤1.0,
Li$_{0.45}$Ce$_{0.52}$PbO$_{3-\delta}$ wherein 0<δ≤1.0,
Li$_{0.45}$Ce$_{0.52}$RhO$_{3-\delta}$ wherein 0<δ≤1.0,
Li$_{0.45}$Ce$_{0.52}$SnO$_{3-\delta}$ wherein 0<δ≤1.0,
Li$_{0.45}$Ce$_{0.52}$VO$_{3-\delta}$ wherein 0<δ≤1.0,
Li$_{0.45}$Ce$_{0.52}$ReO$_{3-\delta}$ wherein 0<δ≤1.0,
Li$_{0.45}$Ce$_{0.52}$GeO$_{3-\delta}$ wherein 0<δ≤1.0,
Li$_{0.45}$Ce$_{0.52}$WO$_{3-\delta}$ wherein 0<δ≤1.0,
Li$_{0.45}$Ce$_{0.52}$ZrO$_{3-\delta}$ wherein 0<δ≤1.0,
Li$_{0.45}$Ce$_{0.52}$MoO$_{3-\delta}$ wherein 0<δ≤1.0,
Li$_{0.45}$Ce$_{0.52}$NbO$_{3-\delta}$ wherein 0<δ≤1.0,
Li$_{0.45}$Ce$_{0.52}$TaO$_{3-\delta}$ wherein 0<δ≤1.0,
Li$_{0.45}$Ce$_{0.52}$HfO$_{3-\delta}$ wherein 0<δ≤1.0,
Li$_{0.45}$Ce$_{0.52}$BiO$_{3-\delta}$ wherein 0<δ≤1.0,
Li$_{0.34}$Pr$_{0.55}$TiO$_{3-\delta}$ wherein 0<δ≤1.0, Li$_{0.34}$Pr$_{0.55}$MnO$_{3-\delta}$ wherein 0<δ≤1.0, Li$_{0.34}$Pr$_{0.55}$NiO$_{3-\delta}$ wherein 0<δ≤1.0,
Li$_{0.34}$Pr$_{0.55}$CrO$_{3-\delta}$ wherein 0<δ≤1.0,
Li$_{0.34}$Pr$_{0.55}$CoO$_{3-\delta}$ wherein 0<δ≤1.0,
Li$_{0.34}$Pr$_{0.55}$IrO$_{3-\delta}$ wherein 0<δ≤1.0,
Li$_{0.34}$Pr$_{0.55}$RuO$_{3-\delta}$ wherein 0<δ≤1.0,
Li$_{0.34}$Pr$_{0.55}$TiO$_{3-\delta}$ wherein 0<δ≤1.0,
Li$_{0.34}$Pr$_{0.55}$FeO$_{3-\delta}$ wherein 0<δ≤1.0,
Li$_{0.34}$Pr$_{0.55}$PdO$_{3-\delta}$ wherein 0<δ≤1.0,
Li$_{0.34}$Pr$_{0.55}$PbO$_{3-\delta}$ wherein 0<δ≤1.0,
Li$_{0.34}$Pr$_{0.55}$RhO$_{3-\delta}$ wherein 0<δ≤1.0,
Li$_{0.34}$Pr$_{0.55}$SnO$_{3-\delta}$ wherein 0<δ≤1.0,
Li$_{0.34}$Pr$_{0.55}$VO$_{3-\delta}$ wherein 0<δ≤1.0,
Li$_{0.34}$Pr$_{0.55}$ReO$_{3-\delta}$ wherein 0<δ≤1.0,
Li$_{0.34}$Pr$_{0.55}$GeO$_{3-\delta}$ wherein 0<δ≤1.0,
Li$_{0.34}$Pr$_{0.55}$WO$_{3-\delta}$ wherein 0<δ≤1.0,
Li$_{0.34}$Pr$_{0.55}$ZrO$_{3-\delta}$ wherein 0<δ≤1.0,
Li$_{0.34}$Pr$_{0.55}$MoO$_{3-\delta}$ wherein 0<δ≤1.0,
Li$_{0.34}$Pr$_{0.55}$NbO$_{3-\delta}$ wherein 0<δ≤1.0,
Li$_{0.34}$Pr$_{0.55}$TaO$_{3-\delta}$ wherein 0<δ≤1.0,
Li$_{0.34}$Pr$_{0.55}$HfO$_{3-\delta}$ wherein 0<δ≤1.0,
Li$_{0.34}$Pr$_{0.55}$BiO$_{3-\delta}$ wherein 0<δ≤1.0,
Li$_{0.10}$Pr$_{0.63}$TiO$_{3-\delta}$ wherein 0<δ≤1.0, Li$_{0.10}$Pr$_{0.63}$MnO$_{3-\delta}$ wherein 0<δ≤1.0, Li$_{0.10}$Pr$_{0.63}$NiO$_{3-\delta}$ wherein 0<δ≤1.0,
Li$_{0.10}$Pr$_{0.63}$CrO$_{3-\delta}$ wherein 0<δ≤1.0,
Li$_{0.10}$Pr$_{0.63}$CoO$_{3-\delta}$ wherein 0<δ≤1.0,
Li$_{0.10}$Pr$_{0.63}$IrO$_{3-\delta}$ wherein 0<δ≤1.0,
Li$_{0.10}$Pr$_{0.63}$RuO$_{3-\delta}$ wherein 0<δ≤1.0,
Li$_{0.10}$Pr$_{0.63}$TiO$_{3-\delta}$ wherein 0<δ≤1.0,
Li$_{0.10}$Pr$_{0.63}$FeO$_{3-\delta}$ wherein 0<δ≤1.0,
Li$_{0.10}$Pr$_{0.63}$PdO$_{3-\delta}$ wherein 0<δ≤1.0,
Li$_{0.10}$Pr$_{0.63}$PbO$_{3-\delta}$ wherein 0<δ≤1.0,
Li$_{0.10}$Pr$_{0.63}$RhO$_{3-\delta}$ wherein 0<δ≤1.0,
Li$_{0.10}$Pr$_{0.63}$SnO$_{3-\delta}$ wherein 0<δ≤1.0,
Li$_{0.10}$Pr$_{0.63}$VO$_{3-\delta}$ wherein 0<δ≤1.0,
Li$_{0.10}$Pr$_{0.63}$ReO$_{3-\delta}$ wherein 0<δ≤1.0,
Li$_{0.10}$Pr$_{0.63}$GeO$_{3-\delta}$ wherein 0<δ≤1.0,
Li$_{0.10}$Pr$_{0.63}$WO$_{3-\delta}$ wherein 0<δ≤1.0,
Li$_{0.10}$Pr$_{0.63}$ZrO$_{3-\delta}$ wherein 0<δ≤1.0,
Li$_{0.10}$Pr$_{0.63}$MoO$_{3-\delta}$ wherein 0<δ≤1.0,
Li$_{0.10}$Pr$_{0.63}$NbO$_{3-\delta}$ wherein 0<δ≤1.0,
Li$_{0.10}$Pr$_{0.63}$TaO$_{3-\delta}$ wherein 0<δ≤1.0,
Li$_{0.10}$Pr$_{0.63}$HfO$_{3-\delta}$ wherein 0<δ≤1.0,
Li$_{0.10}$Pr$_{0.63}$BiO$_{3-\delta}$ wherein 0<δ≤1.0,
Li$_{0.20}$Pr$_{0.60}$TiO$_{3-\delta}$ wherein 0<δ≤1.0, Li$_{0.20}$Pr$_{0.60}$MnO$_{3-\delta}$ wherein 0<δ≤1.0, Li$_{0.20}$Pr$_{0.60}$NiO$_{3-\delta}$ wherein 0<δ≤1.0,
Li$_{0.20}$Pr$_{0.60}$CrO$_{3-\delta}$ wherein 0<δ≤1.0,
Li$_{0.20}$Pr$_{0.60}$CoO$_{3-\delta}$ wherein 0<δ≤1.0,
Li$_{0.20}$Pr$_{0.60}$IrO$_{3-\delta}$ wherein 0<δ≤1.0,
Li$_{0.20}$Pr$_{0.60}$RuO$_{3-\delta}$ wherein 0<δ≤1.0,
Li$_{0.20}$Pr$_{0.60}$TiO$_{3-\delta}$ wherein 0<δ≤1.0,
Li$_{0.20}$Pr$_{0.60}$FeO$_{3-\delta}$ wherein 0<δ≤1.0,
Li$_{0.20}$Pr$_{0.60}$PdO$_{3-\delta}$ wherein 0<δ≤1.0,
Li$_{0.20}$Pr$_{0.60}$PbO$_{3-\delta}$ wherein 0<δ≤1.0,
Li$_{0.20}$Pr$_{0.60}$RhO$_{3-\delta}$ wherein 0<δ≤1.0,
Li$_{0.20}$Pr$_{0.60}$SnO$_{3-\delta}$ wherein 0<δ≤1.0,
Li$_{0.20}$Pr$_{0.60}$VO$_{3-\delta}$ wherein 0<δ≤1.0,
Li$_{0.20}$Pr$_{0.60}$ReO$_{3-\delta}$ wherein 0<δ≤1.0,
Li$_{0.20}$Pr$_{0.60}$GeO$_{3-\delta}$ wherein 0<δ≤1.0, $Li_{0.20}Pr_{0.60}WO_{3-\delta}$ wherein $0<\delta\leq1.0$,
$Li_{0.20}Pr_{0.60}ZrO_{3-\delta}$ wherein $0<\delta\leq1.0$,
$Li_{0.20}Pr_{0.60}MoO_{3-\delta}$ wherein $0<\delta\leq1.0$,
$Li_{0.20}Pr_{0.60}NbO_{3-\delta}$ wherein $0<\delta\leq1.0$,
$Li_{0.20}Pr_{0.60}TaO_{3-\delta}$ wherein $0<\delta\leq1.0$,
$Li_{0.20}Pr_{0.60}HfO_{3-\delta}$ wherein $0<\delta\leq1.0$,
$Li_{0.20}Pr_{0.60}BiO_{3-\delta}$ wherein $0<\delta\leq1.0$,
$Li_{0.30}Pr_{0.57}TiO_{3-\delta}$ wherein $0<\delta\leq1.0$, $Li_{0.30}Pr_{0.57}MnO_{3-\delta}$ wherein $0<\delta\leq1.0$, $Li_{0.30}Pr_{0.57}NiO_{3-\delta}$ wherein $0<\delta\leq1.0$,
$Li_{0.30}Pr_{0.57}CrO_{3-\delta}$ wherein $0<\delta\leq1.0$,
$Li_{0.30}Pr_{0.57}CoO_{-\delta}$ wherein $0<\delta\leq1.03$,
$Li_{0.30}Pr_{0.57}IrO_{3-\delta}$ wherein $0<\delta\leq1.0$,
$Li_{0.30}Pr_{0.57}RuO_{3-\delta}$ wherein $0<\delta\leq1.0$,
$Li_{0.30}Pr_{0.57}TiO_{3-\delta}$ wherein $0<\delta\leq1.0$,
$Li_{0.30}Pr_{0.57}FeO_{3-\delta}$ wherein $0<\delta\leq1.0$,
$Li_{0.30}Pr_{0.57}PdO_{3-\delta}$ wherein $0<\delta\leq1.0$,
$Li_{0.30}Pr_{0.57}PbO_{3-\delta}$ wherein $0<\delta\leq1.0$,
$Li_{0.30}Pr_{0.57}RhO_{3-\delta}$ wherein $0<\delta\leq1.0$,
$Li_{0.30}Pr_{0.57}SnO_{3.3}$ wherein $0<\delta\leq1.0$, $Li_{0.30}Pr_{0.57}VO_{3.3}$ wherein $0<\delta\leq1.0$, $Li_{0.30}Pr_{0.57}ReO_{3-\delta}$ wherein $0<\delta\leq1.0$,
$Li_{0.30}Pr_{0.57}GeO_{3-\delta}$ wherein $0<\delta\leq1.0$,
$Li_{0.30}Pr_{0.57}WO_{3-\delta}$ wherein $0<\delta\leq1.0$,
$Li_{0.30}Pr_{0.57}ZrO_{3-\delta}$ wherein $0<\delta\leq1.0$,
$Li_{0.30}Pr_{0.57}MoO_{3-\delta}$ wherein $0<\delta\leq1.0$,
$Li_{0.30}Pr_{0.57}NbO_{3-\delta}$ wherein $0<\delta\leq1.0$,
$Li_{0.30}Pr_{0.57}TaO_{3-\delta}$ wherein $0<\delta\leq1.0$,
$Li_{0.30}Pr_{0.57}HfO_{3-\delta}$ wherein $0<\delta\leq1.0$,
$Li_{0.30}Pr_{0.57}BiO_{3-\delta}$ wherein $0<\delta\leq1.0$,
$Li_{0.40}Pr_{0.53}TiO_{3.3}$ wherein $0<\delta\leq1.0$, $Li_{0.40}Pr_{0.53}MnO_{3.3}$ wherein $0<\delta\leq1.0$, $Li_{0.40}Pr_{0.53}NiO_{3-6}$ wherein $0<\delta\leq1.0$,
$Li_{0.40}Pr_{0.53}CrO_{3-\delta}$ wherein $0<\delta\leq1.0$,
$Li_{0.40}Pr_{0.53}CoO_{3-\delta}$ wherein $0<\delta\leq1.0$,
$Li_{0.40}Pr_{0.53}IrO_{3-\delta}$ wherein $0<\delta\leq1.0$,
$Li_{0.40}Pr_{0.53}RuO_{3-\delta}$ wherein $0<\delta\leq1.0$,
$Li_{0.40}Pr_{0.53}TiO_{3.3}$ wherein $0<\delta\leq1.0$, $Li_{0.40}Pr_{0.53}FeO_{3.3}$ wherein $0<\delta\leq1.0$, $Li_{0.40}Pr_{0.53}PdO_{3-\delta}$ wherein $0<\delta\leq1.0$,
$Li_{0.40}Pr_{0.53}PbO_{3-\delta}$ wherein $0<\delta\leq1.0$,
$Li_{0.40}Pr_{0.53}RhO_{3-\delta}$ wherein $0<\delta\leq1.0$,
$Li_{0.40}Pr_{0.53}SnO_{3.3}$ wherein $0<\delta\leq1.0$, $Li_{0.40}Pr_{0.53}VO_{3.3}$ wherein $0<\delta\leq1.0$, $Li_{0.40}Pr_{0.53}ReO_{3-\delta}$ wherein $0<\delta\leq1.0$,
$Li_{0.40}Pr_{0.53}GeO_{3-\delta}$ wherein $0<\delta\leq1.0$,
$Li_{0.40}Pr_{0.53}WO_{3-\delta}$ wherein $0<\delta\leq1.0$,
$Li_{0.40}Pr_{0.53}ZrO_{3-\delta}$ wherein $0<\delta\leq1.0$,
$Li_{0.40}Pr_{0.53}MoO_{3-\delta}$ wherein $0<\delta\leq1.0$,
$Li_{0.40}Pr_{0.53}NbO_{3-\delta}$ wherein $0<\delta\leq1.0$,
$Li_{0.40}Pr_{0.53}TaO_{3-\delta}$ wherein $0<\delta\leq1.0$,
$Li_{0.40}Pr_{0.53}HfO_{3-\delta}$ wherein $0<\delta\leq1.0$,
$Li_{0.40}Pr_{0.53}BiO_{3-\delta}$ wherein $0<\delta\leq1.0$, $Li_{0.45}Pr_{0.52}TiO_{3-\delta}$ wherein $0<\delta\leq1.0$, $Li_{0.45}Pr_{0.52}MnO_{3-\delta}$ wherein $0<\delta\leq1.0$, $Li_{0.45}Pr_{0.52}NiO_{3-\delta}$ wherein $0<\delta\leq1.0$,
$Li_{0.45}Pr_{0.52}CrO_{3-\delta}$ wherein $0<\delta\leq1.0$,
$Li_{0.45}Pr_{0.52}CoO_{3-\delta}$ wherein $0<\delta\leq1.0$,
$Li_{0.45}Pr_{0.52}IrO_{3-\delta}$ wherein $0<\delta\leq1.0$,
$Li_{0.45}Pr_{0.52}RuO_{3-\delta}$ wherein $0<\delta\leq1.0$,
$Li_{0.45}Pr_{0.52}TiO_{3-\delta}$ wherein $0<\delta\leq1.0$,
$Li_{0.45}Pr_{0.52}FeO_{3-\delta}$ wherein $0<\delta\leq1.0$,
$Li_{0.45}Pr_{0.52}PdO_{3-\delta}$ wherein $0<\delta\leq1.0$,
$Li_{0.45}Pr_{0.52}PbO_{3-\delta}$ wherein $0<\delta\leq1.0$,
$Li_{0.45}Pr_{0.52}RhO_{3-\delta}$ wherein $0<\delta\leq1.0$,
$Li_{0.45}Pr_{0.52}SnO_{3.3}$ wherein $0<\delta\leq1.0$, $Li_{0.45}Pr_{0.52}VO_{3.3}$ wherein $0<\delta\leq1.0$, $Li_{0.45}Pr_{0.52}ReO_{3-\delta}$ wherein $0<\delta\leq1.0$,
$Li_{0.45}Pr_{0.52}GeO_{3-\delta}$ wherein $0<\delta\leq1.0$,
$Li_{0.45}Pr_{0.52}WO_{3-\delta}$ wherein $0<\delta\leq1.0$,
$Li_{0.45}Pr_{0.52}ZrO_{3-\delta}$ wherein $0<\delta\leq1.0$,
$Li_{0.45}Pr_{0.52}MoO_{3-\delta}$ wherein $0<\delta\leq1.0$,
$Li_{0.45}Pr_{0.52}NbO_{3-\delta}$ wherein $0<\delta\leq1.0$,
$Li_{0.45}Pr_{0.52}TaO_{3-\delta}$ wherein $0<\delta\leq1.0$,
$Li_{0.45}Pr_{0.52}HfO_{3-\delta}$ wherein $0<\delta\leq1.0$,
$Li_{0.45}Pr_{0.52}BiO_{3-\delta}$ wherein $0<\delta\leq1.0$,
$Li_{0.10}Sr_{0.80}TiO_{3-\delta}$ wherein $0<\delta\leq1.0$, $Li_{0.10}Sr_{0.80}MnO_{3-\delta}$ wherein $0<\delta\leq1.0$, $Li_{0.10}Sr_{0.80}NiO_{3-\delta}$ wherein $0<\delta\leq1.0$,
$Li_{0.10}Sr_{0.80}CrO_{3-\delta}$ wherein $0<\delta\leq1.0$,
$Li_{0.10}Sr_{0.80}CoO_{3-\delta}$ wherein $0<\delta\leq1.0$,
$Li_{0.10}Sr_{0.80}IrO_{3-\delta}$ wherein $0<\delta\leq1.0$,
$Li_{0.10}Sr_{0.80}RuO_{3-\delta}$ wherein $0<\delta\leq1.0$,
$Li_{0.10}Sr_{0.80}TiO_{3-\delta}$ wherein $0<\delta\leq1.0$,
$Li_{0.10}Sr_{0.80}FeO_{3-\delta}$ wherein $0<\delta\leq1.0$,
$Li_{0.10}Sr_{0.80}PdO_{3-\delta}$ wherein $0<\delta\leq1.0$,
$Li_{0.10}Sr_{0.80}PbO_{3-\delta}$ wherein $0<\delta\leq1.0$,
$Li_{0.10}Sr_{0.80}RhO_{3-\delta}$ wherein $0<\delta\leq1.0$,
$Li_{0.10}Sr_{0.80}SnO_{3-\delta}$ wherein $0<\delta\leq1.0$,
$Li_{0.10}Sr_{0.80}VO_{3-\delta}$ wherein $0<\delta\leq1.0$,
$Li_{0.10}Sr_{0.80}ReO_{3-\delta}$ wherein $0<\delta\leq1.0$,
$Li_{0.10}Sr_{0.80}GeO_{3-\delta}$ wherein $0<\delta\leq1.0$,
$Li_{0.10}Sr_{0.80}WO_{3-\delta}$ wherein $0<\delta\leq1.0$,
$Li_{0.10}Sr_{0.80}ZrO_{3-\delta}$ wherein $0<\delta\leq1.0$,
$Li_{0.10}Sr_{0.80}MoO_{3-\delta}$ wherein $0<\delta\leq1.0$,
$Li_{0.10}Sr_{0.80}NbO_{3-\delta}$ wherein $0<\delta\leq1.0$,
$Li_{0.10}Sr_{0.80}TaO_{3-\delta}$ wherein $0<\delta\leq1.0$,
$Li_{0.10}Sr_{0.80}HfO_{3-\delta}$ wherein $0<\delta\leq1.0$,
$Li_{0.10}Sr_{0.80}BiO_{3-\delta}$ wherein $0<\delta\leq1.0$,
$Li_{0.20}Sr_{0.60}TiO_{3-\delta}$ wherein $0<\delta\leq1.0$, $Li_{0.20}Sr_{0.60}MnO_{3-\delta}$ wherein $0<\delta\leq1.0$, $Li_{0.20}Sr_{0.60}NiO_{3-\delta}$ wherein $0<\delta\leq1.0$,
$Li_{0.20}Sr_{0.60}CrO_{3-\delta}$ wherein $0<\delta\leq1.0$,
$Li_{0.20}Sr_{0.60}CoO_{3-\delta}$ wherein $0<\delta\leq1.0$,
$Li_{0.20}Sr_{0.60}IrO_{3-\delta}$ wherein $0<\delta\leq1.0$,
$Li_{0.20}Sr_{0.60}RuO_{3-\delta}$ wherein $0<\delta\leq1.0$,
$Li_{0.20}Sr_{0.60}TiO_{3-\delta}$ wherein $0<\delta\leq1.0$,
$Li_{0.20}Sr_{0.60}FeO_{3-\delta}$ wherein $0<\delta\leq1.0$,
$Li_{0.20}Sr_{0.60}PdO_{3-\delta}$ wherein $0<\delta\leq1.0$,
$Li_{0.20}Sr_{0.60}PbO_{3-\delta}$ wherein $0<\delta\leq1.0$,
$Li_{0.20}Sr_{0.60}RhO_{3-\delta}$ wherein $0<\delta\leq1.0$,
$Li_{0.20}Sr_{0.60}SnO_{3-\delta}$ wherein $0<\delta\leq1.0$,
$Li_{0.20}Sr_{0.60}VO_{3-\delta}$ wherein $0<\delta\leq1.0$,
$Li_{0.20}Sr_{0.60}ReO_{3-\delta}$ wherein $0<\delta\leq1.0$,
$Li_{0.20}Sr_{0.60}GeO_{3-\delta}$ wherein $0<\delta\leq1.0$,
$Li_{0.20}Sr_{0.60}WO_{3.3}$ wherein $0<\delta\leq1.0$, $Li_{0.20}Sr_{0.60}ZrO_{3-\delta}$ wherein $0<\delta\leq1.0$, $Li_{0.20}Sr_{0.60}MoO_{3-\delta}$ wherein $0<\delta\leq1.0$, $Li_{0.20}Sr_{0.60}NbO_{3-\delta}$ wherein $0<\delta\leq1.0$,
$Li_{0.20}Sr_{0.60}TaO_{3-\delta}$ wherein $0<\delta\leq1.0$,
$Li_{0.20}Sr_{0.60}HfO_{3.3}$ wherein $0<\delta\leq1.0$, $Li_{0.20}Sr_{0.60}BiO_{3-\delta}$ wherein $0<\delta\leq1.0$,
$Li_{0.25}Sr_{0.50}TiO_{3-\delta}$ wherein $0<\delta\leq1.0$, $Li_{0.25}Sr_{0.50}MnO_{3-\delta}$ wherein $0<\delta\leq1.0$, $Li_{0.25}Sr_{0.50}NiO_{3-\delta}$ wherein $0<\delta\leq1.0$,
$Li_{0.25}Sr_{0.50}CrO_{3-\delta}$ wherein $0<\delta\leq1.0$,
$Li_{0.25}Sr_{0.50}CoO_{3-\delta}$ wherein $0<\delta\leq1.0$,
$Li_{0.25}Sr_{0.50}IrO_{3-\delta}$ wherein $0<\delta\leq1.0$,
$Li_{0.25}Sr_{0.50}RuO_{3-\delta}$ wherein $0<\delta\leq1.0$,
$Li_{0.25}Sr_{0.50}TiO_{3-\delta}$ wherein $0<\delta\leq1.0$,
$Li_{0.25}Sr_{0.50}FeO_{3-\delta}$ wherein $0<\delta\leq1.0$,
$Li_{0.25}Sr_{0.50}PdO_{3-\delta}$ wherein $0<\delta\leq1.0$,
$Li_{0.25}Sr_{0.50}PbO_{3-\delta}$ wherein $0<\delta\leq1.0$,
$Li_{0.25}Sr_{0.50}RhO_{3-\delta}$ wherein $0<\delta\leq1.0$,
$Li_{0.25}Sr_{0.50}SnO_{3-\delta}$ wherein $0<\delta\leq1.0$,
$Li_{0.25}Sr_{0.50}VO_{3-\delta}$ wherein $0<\delta\leq1.0$,
$Li_{0.25}Sr_{0.50}ReO_{3-\delta}$ wherein $0<\delta\leq1.0$,
$Li_{0.25}Sr_{0.50}GeO_{3-\delta}$ wherein $0<\delta\leq1.0$,
$Li_{0.25}Sr_{0.50}WO_{3-\delta}$ wherein $0<\delta\leq1.0$,
$Li_{0.25}Sr_{0.50}ZrO_{3-\delta}$ wherein $0<\delta\leq1.0$,
$Li_{0.25}Sr_{0.50}MoO_{3-\delta}$ wherein $0<\delta\leq1.0$,
$Li_{0.25}Sr_{0.50}Nb_{3-\delta}$ wherein $0<\delta\leq1.0$, $Li_{0.25}Sr_{0.50}TaO_{3-\delta}$ wherein $0<\delta\leq1.0$, $Li_{0.25}Sr_{0.50}HfO_{3-\delta}$ wherein $0<\delta\leq1.0$, $Li_{0.25}Sr_{0.50}BiO_{3-\delta}$ wherein $0<\delta\leq1.0$, $Li_{0.30}Sr_{0.40}TiO_{3-\delta}$ wherein $0<\delta\leq1.0$, $Li_{0.30}Sr_{0.40}MnO_{3-\delta}$ wherein $0<\delta\leq1.0$, $Li_{0.30}Sr_{0.40}NiO_{3-\delta}$ wherein $0<\delta\leq1.0$, $Li_{0.30}Sr_{0.40}CrO_{3-\delta}$ wherein $0<\delta\leq1.0$, $Li_{0.30}Sr_{0.40}CoO_{3-\delta}$ wherein $0<\delta\leq1.0$, $Li_{0.30}Sr_{0.40}IrO_{3-\delta}$ wherein $0<\delta\leq1.0$, $Li_{0.30}Sr_{0.40}RuO_{3-\delta}$ wherein $0<\delta\leq1.0$, $Li_{0.30}Sr_{0.40}TiO_{3-\delta}$ wherein $0<\delta\leq1.0$, $Li_{0.30}Sr_{0.40}FeO_{3-\delta}$ wherein $0<\delta\leq1.0$, $Li_{0.30}Sr_{0.40}PdO_{3-\delta}$ wherein $0<\delta\leq1.0$, $Li_{0.30}Sr_{0.40}PbO_{3-\delta}$ wherein $0<\delta\leq1.0$, $Li_{0.30}Sr_{0.40}RhO_{3-\delta}$ wherein $0<\delta\leq1.0$, $Li_{0.30}Sr_{0.40}SnO_{3-\delta}$ wherein $0<\delta\leq1.0$, $Li_{0.30}Sr_{0.40}VO_{3-\delta}$ wherein $0<\delta\leq1.0$, $Li_{0.30}Sr_{0.40}ReO_{3-\delta}$ wherein $0<\delta\leq1.0$, $Li_{0.30}Sr_{0.40}GeO_{3-\delta}$ wherein $0<\delta\leq1.0$, $Li_{0.30}Sr_{0.40}WO_{3-\delta}$ wherein $0<\delta\leq1.0$, $Li_{0.30}Sr_{0.40}ZrO_{3-\delta}$ wherein $0<\delta\leq1.0$, $Li_{0.30}Sr_{0.40}MoO_{3-\delta}$ wherein $0<\delta\leq1.0$, $Li_{0.30}Sr_{0.40}Nb_{3-\delta}$ wherein $0<\delta\leq1.0$, $Li_{0.30}Sr_{0.40}TaO_{3-\delta}$ wherein $0<\delta\leq1.0$, $Li_{0.30}Sr_{0.40}HfO_{3-\delta}$ wherein $0<\delta\leq1.0$, $Li_{0.30}Sr_{0.40}BiO_{3-\delta}$ wherein $0<\delta\leq1.0$, $Li_{0.40}Sr_{0.20}TiO_{3-\delta}$ wherein $0<\delta\leq1.0$, $Li_{0.40}Sr_{0.20}MnO_{3-\delta}$ wherein $0<\delta\leq1.0$, $Li_{0.40}Sr_{0.20}NiO_{3-\delta}$ wherein $0<\delta\leq1.0$, $Li_{0.40}Sr_{0.20}CrO_{3-\delta}$ wherein $0<\delta\leq1.0$, $Li_{0.40}Sr_{0.20}CoO_{3-\delta}$ wherein $0<\delta\leq1.0$, $Li_{0.40}Sr_{0.20}IrO_{3-\delta}$ wherein $0<\delta\leq1.0$, $Li_{0.40}Sr_{0.20}RuO_{3-\delta}$ wherein $0<\delta\leq1.0$, $Li_{0.40}Sr_{0.20}TiO_{3-\delta}$ wherein $0<\delta\leq1.0$, $Li_{0.40}Sr_{0.20}FeO_{3-\delta}$ wherein $0<\delta\leq1.0$, $Li_{0.40}Sr_{0.20}PdO_{3-\delta}$ wherein $0<\delta\leq1.0$, $Li_{0.40}Sr_{0.20}PbO_{3-\delta}$ wherein $0<\delta\leq1.0$, $Li_{0.40}Sr_{0.20}RhO_{3-\delta}$ wherein $0<\delta\leq1.0$, $Li_{0.40}Sr_{0.20}SnO_{3-\delta}$ wherein $0<\delta\leq1.0$, $Li_{0.40}Sr_{0.20}VO_{3-\delta}$ wherein $0<\delta\leq1.0$, $Li_{0.40}Sr_{0.20}ReO_{3-\delta}$ wherein $0<\delta\leq1.0$, $Li_{0.40}Sr_{0.20}GeO_{3-\delta}$ wherein $0<\delta\leq1.0$, $Li_{0.40}Sr_{0.20}WO_{3-\delta}$ wherein $0<\delta\leq1.0$, $Li_{0.40}Sr_{0.20}ZrO_{3-\delta}$ wherein $0<\delta\leq1.0$, $Li_{0.40}Sr_{0.20}MoO_{3-\delta}$ wherein $0<\delta\leq1.0$, $Li_{0.40}Sr_{0.20}NbO_{3-\delta}$ wherein $0<\delta\leq1.0$, $Li_{0.40}Sr_{0.20}TaO_{3-\delta}$ wherein $0<\delta\leq1.0$, $Li_{0.40}Sr_{0.20}HfO_{3-\delta}$ wherein $0<\delta\leq1.0$, $Li_{0.40}Sr_{0.20}BiO_3$ wherein $0<\delta\leq1.0$, $Li_{0.10}Ba_{0.80}TiO_{3-\delta}$ wherein $0<\delta\leq1.0$, $Li_{0.10}Ba_{0.80}MnO_{3-\delta}$ wherein $0<\delta\leq1.0$, $Li_{0.10}Ba_{0.80}NiO_{3-\delta}$ wherein $0<\delta\leq1.0$, $Li_{0.10}Ba_{0.80}CrO_{3-\delta}$ wherein $0<\delta\leq1.0$, $Li_{0.10}Ba_{0.80}CoO_{3-\delta}$ wherein $0<\delta\leq1.0$, $Li_{0.10}Ba_{0.80}IrO_{3-\delta}$ wherein $0<\delta\leq1.0$, $Li_{0.10}Ba_{0.80}RuO_{3-\delta}$ wherein $0<\delta\leq1.0$, $Li_{0.10}Ba_{0.80}TiO_{3-\delta}$ wherein $0<\delta\leq1.0$, $Li_{0.10}Ba_{0.80}FeO_{3-\delta}$ wherein $0<\delta\leq1.0$, $Li_{0.10}Ba_{0.80}PdO_{3-\delta}$ wherein $0<\delta\leq1.0$, $Li_{0.10}Ba_{0.80}PbO_{3-\delta}$ wherein $0<\delta\leq1.0$, $Li_{0.10}Ba_{0.80}RhO_{3-\delta}$ wherein $0<\delta\leq1.0$, $Li_{0.10}Ba_{0.80}SnO_{3-\delta}$ wherein $0<\delta\leq1.0$, $Li_{0.10}Ba_{0.80}VO_{3-\delta}$ wherein $0<\delta\leq1.0$, $Li_{0.10}Ba_{0.80}ReO_{3-\delta}$ wherein $0<\delta\leq1.0$, $Li_{0.10}Ba_{0.80}GeO_{3-\delta}$ wherein $0<\delta\leq1.0$, $Li_{0.10}Ba_{0.80}WO_{3-\delta}$ wherein $0<\delta\leq1.0$, $Li_{0.10}Ba_{0.80}ZrO_{3-\delta}$ wherein $0<\delta\leq1.0$, $Li_{0.10}Ba_{0.80}MoO_{3-\delta}$ wherein $0<\delta\leq1.0$, $Li_{0.10}Ba_{0.80}Nb_{3-\delta}$ wherein $0<\delta\leq1.0$, $Li_{0.10}Ba_{0.80}TaO_{3-\delta}$ wherein $0<\delta\leq1.0$, $Li_{0.10}Ba_{0.80}HfO_{3-\delta}$ wherein $0<\delta\leq1.0$, $Li_{0.10}Ba_{0.80}BiO_{3-\delta}$ wherein $0<\delta\leq1.0$, $Li_{0.20}Ba_{0.60}TiO_{3-\delta}$ wherein $0<\delta\leq1.0$, $Li_{0.20}Ba_{0.60}MnO_{3-\delta}$ wherein $0<\delta\leq1.0$, $Li_{0.20}Ba_{0.60}NiO_{3-\delta}$ wherein $0<\delta\leq1.0$, $Li_{0.20}Ba_{0.60}CrO_{3-\delta}$ wherein $0<\delta\leq1.0$, $Li_{0.20}Ba_{0.60}CoO_{3-\delta}$ wherein $0<\delta\leq1.0$, $Li_{0.20}Ba_{0.60}IrO_{3-\delta}$ wherein $0<\delta\leq1.0$, $Li_{0.20}Ba_{0.60}RuO_{3-\delta}$ wherein $0<\delta\leq1.0$, $Li_{0.20}Ba_{0.60}TiO_{3-\delta}$ wherein $0<\delta\leq1.0$, $Li_{0.20}Ba_{0.60}FeO_{3-\delta}$ wherein $0<\delta\leq1.0$, $Li_{0.20}Ba_{0.60}PdO_{3-\delta}$ wherein $0<\delta\leq1.0$, $Li_{0.20}Ba_{0.60}PbO_{3-\delta}$ wherein $0<\delta\leq1.0$, $Li_{0.20}Ba_{0.60}RhO_{3-\delta}$ wherein $0<\delta\leq1.0$, $Li_{0.20}Ba_{0.60}SnO_{3-\delta}$ wherein $0<\delta\leq1.0$, $Li_{0.20}Ba_{0.60}VO_{3-\delta}$ wherein $0<\delta\leq1.0$, $Li_{0.20}Ba_{0.60}ReO_{3-\delta}$ wherein $0<\delta\leq1.0$, $Li_{0.20}Ba_{0.60}GeO_{3-\delta}$ wherein $0<\delta\leq1.0$, $Li_{0.20}Ba_{0.60}WO_{3-\delta}$ wherein $0<\delta\leq1.0$, $Li_{0.20}Ba_{0.60}ZrO_{3-\delta}$ wherein $0<\delta\leq1.0$, $Li_{0.20}Ba_{0.60}MoO_{3-\delta}$ wherein $0<\delta\leq1.0$, $Li_{0.20}Ba_{0.60}NbO_{3-\delta}$ wherein $0<\delta\leq1.0$, $Li_{0.20}Ba_{0.60}TaO_{3-\delta}$ wherein $0<\delta\leq1.0$, $Li_{0.20}Ba_{0.60}HfO_{3-\delta}$ wherein $0<\delta\leq1.0$, $Li_{0.20}Ba_{0.60}BiO_{3-\delta}$ wherein $0<\delta\leq1.0$, $Li_{0.25}Ba_{0.50}TiO_{3-\delta}$ wherein $0<\delta\leq1.0$, $Li_{0.25}Ba_{0.50}MnO_{3-\delta}$ wherein $0<\delta\leq1.0$, $Li_{0.25}Ba_{0.50}NiO_{3-\delta}$ wherein $0<\delta\leq1.0$, $Li_{0.25}Ba_{0.50}CrO_{3-\delta}$ wherein $0<\delta\leq1.0$, $Li_{0.25}Ba_{0.50}CoO_{3-\delta}$ wherein $0<\delta\leq1.0$, $Li_{0.25}Ba_{0.50}IrO_{3-\delta}$ wherein $0<\delta\leq1.0$, $Li_{0.25}Ba_{0.50}RuO_{3-\delta}$ wherein $0<\delta\leq1.0$, $Li_{0.25}Ba_{0.50}TiO_{3-\delta}$ wherein $0<\delta\leq1.0$, $Li_{0.25}Ba_{0.50}FeO_{3-\delta}$ wherein $0<\delta\leq1.0$, $Li_{0.25}Ba_{0.50}PdO_{3-\delta}$ wherein $0<\delta\leq1.0$, $Li_{0.25}Ba_{0.50}PbO_{3-\delta}$ wherein $0<\delta\leq1.0$, $Li_{0.25}Ba_{0.50}RhO_{3-\delta}$ wherein $0<\delta\leq1.0$, $Li_{0.25}Ba_{0.50}SnO_{3-\delta}$ wherein $0<\delta\leq1.0$, $Li_{0.25}Ba_{0.50}VO_{3-\delta}$ wherein $0<\delta\leq1.0$, $Li_{0.25}Ba_{0.50}ReO_{3-\delta}$ wherein $0<\delta\leq1.0$, $Li_{0.25}Ba_{0.50}GeO_{3-\delta}$ wherein $0<\delta\leq1.0$, $Li_{0.25}Ba_{0.50}WO_{3-\delta}$ wherein $0<\delta\leq1.0$, $Li_{0.25}Ba_{0.50}ZrO_{3-\delta}$ wherein $0<\delta\leq1.0$, $Li_{0.25}Ba_{0.50}MoO_{3-\delta}$ wherein $0<\delta\leq1.0$, $Li_{0.25}Ba_{0.50}NbO_{3-\delta}$ wherein $0<\delta\leq1.0$, $Li_{0.25}Ba_{0.50}TaO_{3-\delta}$ wherein $0<\delta\leq1.0$, $Li_{0.25}Ba_{0.50}HfO_3$, $Li_{0.25}Ba_{0.50}BiO_{3-\delta}$ wherein $0<\delta\leq1.0$, $Li_{0.30}Ba_{0.40}TiO_{3-\delta}$ wherein $0<\delta\leq1.0$, $Li_{0.30}Ba_{0.40}MnO_{3-\delta}$ wherein $0<\delta\leq1.0$, $Li_{0.30}Ba_{0.40}NiO_{3-\delta}$ wherein $0<\delta\leq1.0$, $Li_{0.30}Ba_{0.40}CrO_{3-\delta}$ wherein $0<\delta\leq1.0$, $Li_{0.30}Ba_{0.40}CoO_{3-\delta}$ wherein $0<\delta\leq1.0$, $Li_{0.30}Ba_{0.40}IrO_{3-\delta}$ wherein $0<\delta\leq1.0$, $Li_{0.30}Ba_{0.40}RuO_{3-\delta}$ wherein $0<\delta\leq1.0$, $Li_{0.30}Ba_{0.40}TiO_{3-\delta}$ wherein $0<\delta\leq1.0$, $Li_{0.30}Ba_{0.40}FeO_{3-\delta}$ wherein $0<\delta\leq1.0$, $Li_{0.30}Ba_{0.40}PdO_{3-\delta}$ wherein $0<\delta\leq1.0$, $Li_{0.30}Ba_{0.40}PbO_{3-\delta}$ wherein $0<\delta\leq1.0$, $Li_{0.30}Ba_{0.40}RhO_{3-\delta}$ wherein $0<\delta\leq1.0$, $Li_{0.30}Ba_{0.40}SnO_{3-\delta}$ wherein $0<\delta\leq1.0$, $Li_{0.30}Ba_{0.40}VO_{3-\delta}$ wherein $0<\delta\leq1.0$, $Li_{0.30}Ba_{0.40}ReO_{3-\delta}$ wherein $0<\delta\leq1.0$, $Li_{0.30}Ba_{0.40}GeO_{3-\delta}$ wherein $0<\delta\leq1.0$, $Li_{0.30}Ba_{0.40}WO_{3-\delta}$ wherein $0<\delta\leq1.0$, $Li_{0.30}Ba_{0.40}ZrO_{3-\delta}$ wherein $0<\delta\leq1.0$, $Li_{0.30}Ba_{0.40}MoO_{3-\delta}$ wherein $0<\delta\leq1.0$, $Li_{0.30}Ba_{0.40}NbO_{3-\delta}$ wherein $0<\delta\leq1.0$, $Li_{0.30}Ba_{0.40}TaO_{3-\delta}$ wherein $0<\delta\leq1.0$, $Li_{0.30}Ba_{0.40}HfO_{3-\delta}$ wherein $0<\delta\leq1.0$, $Li_{0.30}Ba_{0.40}BiO_{3-\delta}$ wherein $0<\delta\leq1.0$, $Li_{0.40}Ba_{0.20}TiO_{3-\delta}$ wherein $0<\delta\leq1.0$, $Li_{0.40}Ba_{0.20}MnO_{3-\delta}$ wherein $0<\delta\leq1.0$, $Li_{0.40}Ba_{0.20}NiO_3$ wherein $0<\delta\leq1.0$, $Li_{0.40}Ba_{0.20}CrO_{3-\delta}$ wherein $0<\delta\leq1.0$, $Li_{0.40}Ba_{0.20}CoO_{3-\delta}$ wherein $0<\delta\leq1.0$,
$Li_{0.40}Ba_{0.20}IrO_{3-\delta}$ wherein $0<\delta\leq1.0$,
$Li_{0.40}Ba_{0.20}RuO_{3-\delta}$ wherein $0<\delta\leq1.0$,
$Li_{0.40}Ba_{0.20}TiO_{3-\delta}$ wherein $0<\delta\leq1.0$,
$Li_{0.40}Ba_{0.20}FeO_{3-\delta}$ wherein $0<\delta\leq1.0$,
$Li_{0.40}Ba_{0.20}PdO_{3-\delta}$ wherein $0<\delta\leq1.0$,
$Li_{0.40}Ba_{0.20}PbO_{3-\delta}$ wherein $0<\delta\leq1.0$,
$Li_{0.40}Ba_{0.20}RhO_{3-\delta}$ wherein $0<\delta\leq1.0$,
$Li_{0.40}Ba_{0.20}SnO_{3-\delta}$ wherein $0<\delta\leq1.0$,
$Li_{0.40}Ba_{0.20}VO_{3-\delta}$ wherein $0<\delta\leq1.0$,
$Li_{0.40}Ba_{0.20}ReO_{3-\delta}$ wherein $0<\delta\leq1.0$,
$Li_{0.40}Ba_{0.20}GeO_{3-\delta}$ wherein $0<\delta\leq1.0$,
$Li_{0.40}Ba_{0.20}WO_{3-\delta}$ wherein $0<\delta\leq1.0$,
$Li_{0.40}Ba_{0.20}ZrO_{3-\delta}$ wherein $0<\delta\leq1.0$,
$Li_{0.40}Ba_{0.20}MoO_{3-\delta}$ wherein $0<\delta\leq1.0$,
$Li_{0.40}Ba_{0.20}NbO_{3-\delta}$ wherein $0<\delta\leq1.0$,
$Li_{0.40}Ba_{0.20}TaO_{3-\delta}$ wherein $0<\delta\leq1.0$,
$Li_{0.40}Ba_{0.20}HfO_{3-\delta}$ wherein $0<\delta\leq1.0$,
$Li_{0.40}Ba_{0.20}BiO_{3-\delta}$ wherein $0<\delta\leq1.0$,
$Li_{0.25}La_{0.50}TiO_{3-\delta}$ wherein $0<\delta\leq1.0$, $Li_{0.25}La_{0.50}MnO_{3-\delta}$ wherein $0<\delta\leq1.0$, $Li_{0.25}La_{0.50}NiO_{3-\delta}$ wherein $0<\delta\leq1.0$,
$Li_{0.25}La_{0.50}CrO_{3-\delta}$ wherein $0<\delta\leq1.0$,
$Li_{0.25}La_{0.50}CoO_{3-\delta}$ wherein $0<\delta\leq1.0$,
$Li_{0.25}La_{0.50}IrO_{3-\delta}$ wherein $0<\delta\leq1.0$,
$Li_{0.25}La_{0.50}RuO_{3-\delta}$ wherein $0<\delta\leq1.0$,
$Li_{0.25}La_{0.50}TiO_{3-\delta}$ wherein $0<\delta\leq1.0$,
$Li_{0.25}La_{0.50}FeO_{3-\delta}$ wherein $0<\delta\leq1.0$,
$Li_{0.25}La_{0.50}PdO_{3-\delta}$ wherein $0<\delta\leq1.0$,
$Li_{0.25}La_{0.50}PbO_{3-\delta}$ wherein $0<\delta\leq1.0$,
$Li_{0.25}La_{0.50}RhO_{3-\delta}$ wherein $0<\delta\leq1.0$,
$Li_{0.25}La_{0.50}SnO_{3-\delta}$ wherein $0<\delta\leq1.0$,
$Li_{0.25}La_{0.50}VO_{3-\delta}$ wherein $0<\delta\leq1.0$,
$Li_{0.25}La_{0.50}ReO_{3-\delta}$ wherein $0<\delta\leq1.0$,
$Li_{0.25}La_{0.50}GeO_{3-\delta}$ wherein $0<\delta\leq1.0$,
$Li_{0.25}La_{0.50}WO_{3-\delta}$ wherein $0<\delta\leq1.0$,
$Li_{0.25}La_{0.50}ZrO_{3-\delta}$ wherein $0<\delta\leq1.0$,
$Li_{0.25}La_{0.50}MoO_{3-\delta}$ wherein $0<\delta\leq1.0$,
$Li_{0.25}La_{0.50}NbO_{3-\delta}$ wherein $0<\delta\leq1.0$,
$Li_{0.25}La_{0.50}TaO_{3.3}$ wherein $0<\delta\leq1.0$,
$Li_{0.25}La_{0.50}HfO_{3.3}$ wherein $0<\delta\leq1.0$,
$Li_{0.25}La_{0.50}BiO_{3-\delta}$ wherein $0<\delta\leq1.0$,
$Li_{0.05}La_{0.82}Ti_{0.70}O_{3-\delta}$ wherein $0<\delta\leq1.0$,
$Li_{0.05}La_{0.82}Mn_{0.70}O_{3-\delta}$ wherein $0<\delta\leq1.0$,
$Li_{0.10}La_{0.80}Mn_{0.70}O_{3-\delta}$ wherein $0<\delta\leq1.0$,
$Li_{0.20}La_{0.77}Mn_{0.70}O_{3-\delta}$ wherein $0<\delta\leq1.0$,
$Li_{0.05}La_{0.82}Nb_{0.70}O_{3-\delta}$ wherein $0<\delta\leq1.0$,
$Li_{0.10}La_{0.80}Nb_{0.70}O_{3-\delta}$ wherein $0<\delta\leq1.0$,
$Li_{0.20}La_{0.77}Nb_{0.70}O_{3-\delta}$ wherein $0<\delta\leq1.0$,
$Li_{0.05}La_{0.82}Ta_{0.70}O_{3-\delta}$ wherein $0<\delta\leq1.0$,
$Li_{0.10}La_{0.80}Ta_{0.70}O_{3-\delta}$ wherein $0<\delta\leq1.0$,
$Li_{0.20}La_{0.77}Ta_{0.70}O_{3-\delta}$ wherein $0<\delta\leq1.0$,
$Li_{0.05}La_{0.82}V_{0.70}O_{3-\delta}$ wherein $0<\delta\leq1.0$,
$Li_{0.10}La_{0.80}V_{0.70}O_{3-\delta}$ wherein $0<\delta\leq1.0$,
$Li_{0.20}La_{0.77}V_{0.70}O_{3-\delta}$ wherein $0<\delta\leq1.0$,
$Li_{0.05}La_{0.82}W_{0.70}O_{3-\delta}$ wherein $0<\delta\leq1.0$,
$Li_{0.10}La_{0.80}W_{0.70}O_{3-\delta}$ wherein $0<\delta\leq1.0$,
$Li_{0.20}La_{0.77}W_{0.70}O_{3-\delta}$ wherein $0<\delta\leq1.0$,
$Li_{0.05}La_{0.82}Mo_{0.70}O_{3-\delta}$ wherein $0<\delta\leq1.0$,
$Li_{0.10}La_{0.80}Mo_{0.70}O_{3-\delta}$ wherein $0<\delta\leq1.0$,
$Li_{0.20}La_{0.77}Mo_{0.70}O_{3.3}$ wherein $0<\delta\leq1.0$,
$Li_{0.05}La_{0.82}Bi_{0.70}O_{3-\delta}$ wherein $0<\delta\leq1.0$,
$Li_{0.10}La_{0.80}Bi_{0.70}O_{3.3}$ wherein $0<\delta\leq1.0$,
$Li_{0.20}La_{0.77}Bi_{0.70}O_{3-\delta}$ wherein $0<\delta\leq1.0$,
$Li_{0.05}La_{0.82}Cr_{0.70}O_{3-\delta}$ wherein $0<\delta\leq1.0$,
$Li_{0.10}La_{0.80}Cr_{0.70}O_{3-\delta}$ wherein $0<\delta\leq1.0$, or
$Li_{0.20}La_{0.77}Cr_{0.70}O_{3-\delta}$ wherein $0<\delta\leq1.0$.

13. The cathode of claim 9, wherein the perovskite compound has an electronic conductivity of about $1.0\times10^{-9}$ Siemens per centimeter or to about 1.0 Siemens per centimeter, and an ionic conductivity of about $2.0\times10^{-7}$ Siemens per centimeter or to about 0.1 Siemens per centimeter at 25° C.

14. The cathode of claim 1, wherein the lithium-containing metal oxide further comprises at least one of a layered compound represented by Formula 5, an NASICON compound represented by Formula 6, a LISICON compound represented by Formula 7, a garnet compound represented by Formula 8, a phosphate compound represented by Formula 9 or Formula 10, a tavorite or triplite compound represented by Formula 11, an anti-perovskite compound represented by Formula 12, a silicate compound represented by Formula 13, or a borate compound represented by Formula 14:

$$Li_{1\pm x}M_{1\pm y}O_{2-\delta} \quad \text{Formula 5}$$

wherein, in Formula 5, M is at least one metal element belonging to Group 2 to Group 16 of the periodic table of the elements, $0<x<0.5$, $0<y<1$, and $0\leq\delta\leq1$, $$Li_{1+x}A_xM_{2-x}(XO_4)_3 \quad \text{Formula 6}$$

wherein, in Formula 6, A and M are each independently at least one metal element belonging to Group 2 to Group 16 of the periodic table of the elements, X is As, P, Mo, or S, and $0<x<1.0$, $$Li_{8-c}A_aM_bO_4 \quad \text{Formula 7}$$

wherein, in Formula 7, A and M are each independently at least one metal element belonging to Group 2 to Group 16 of the periodic table of the elements, c is (ma+nb), wherein m is an oxidation number of A, and n is an oxidation number of M,
$0<x<8$, $0<a\leq1$, and $0\leq b\leq1$, $$Li_xA_3M_2O_{12} \quad \text{Formula 8}$$

wherein, in Formula 8, A and M are each independently at least one metal element belonging to Group 2 to Group 16 of the periodic table of the elements, and $3.0\leq x\leq 7.0$, $$Li_{1\pm x}MPO_4 \quad \text{Formula 9}$$

$$Li_2MP_2O_7 \quad \text{Formula 10}$$

wherein M in Formulas 9 and 10, is each independently at least one metal element belonging to Group 2 to Group 16 of the periodic table of the elements, and
$0\leq x\leq 1.0$, $$Li_{1\pm x}M(TO_4)X \quad \text{Formula 11}$$

wherein, in Formula 11,
M is at least one metal element belonging to Group 2 to Group 16 of the periodic table of the elements, T is P or S, X is F, O, or OH, and $0\leq x\leq 1.0$, $$Li_xM_yOA \quad \text{Formula 12}$$

wherein, in Formula 12, M is at least one metal element belonging to Group 2 to Group 16 of the periodic table of the elements, A is F, Cl, Br, I, S, Se, or Te, $2.0<x<3.0$, and $0<y<1.0$, $$Li_{2\pm x}MSiO_4 \quad \text{Formula 13}$$

wherein, in Formula 13, M is at least one metal element belonging to Group 2 to Group 16 of the periodic table of the elements, and $0\leq x\leq 1.0$, $$Li_{1\pm x}MBO_3 \quad \text{Formula 14}$$

wherein, in Formula 14,
M is at least one metal element belonging to Group 2 to Group 16 of the periodic table of the elements, and
$0\leq x\leq 1.0$.

15. The cathode of claim 14, wherein the lithium-containing metal oxide has an ionic conductivity of about $1.0 \times 10^{-8}$ Siemens per centimeter to 0.1 Siemens per centimeter at 25° C.

16. The cathode of claim 1, wherein the lithium-containing metal oxide is a mixed conductor.

17. The cathode of claim 1, wherein the lithium-containing metal oxide is electrochemically stable at a voltage of about 2.0 V to about 4.0 V with respect to lithium metal.

18. The cathode of claim 1, wherein the cathode is porous.

19. A lithium-air battery comprising:
the cathode according to claim 1;
an anode including lithium; and
an electrolyte between the cathode and the anode.

20. The lithium-air battery of claim 19, wherein the electrolyte comprises a solid electrolyte.

21. A method of manufacturing an air battery cathode, the method comprising:
providing a precursor mixture; and
heat-treating the mixture to provide the cathode of claim 1.

22. The cathode of claim 14, wherein the lithium-containing metal oxide has an ionic conductivity of about $6.8 \times 10^{-8}$ Siemens per centimeter to $8.8 \times 10^{-5}$ Siemens per centimeter at 25° C.

* * * * *